(12) United States Patent
Matoba

(10) Patent No.: US 7,310,164 B2
(45) Date of Patent: *Dec. 18, 2007

(54) PRINTER, PRINTING CONTROL APPARATUS AND PRINTING SYSTEM USING UNIQUE JOB IDENTIFIERS, AND CONTROL METHOD THEREFOR

(75) Inventor: Toru Matoba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/590,825

(22) Filed: Nov. 1, 2006

(65) Prior Publication Data

US 2007/0103703 A1    May 10, 2007

Related U.S. Application Data

(62) Division of application No. 10/127,495, filed on Apr. 23, 2002, now Pat. No. 7,158,253, which is a division of application No. 08/412,319, filed on Mar. 29, 1995, now Pat. No. 6,437,869.

(30) Foreign Application Priority Data

| Mar. 31, 1994 | (JP) | ................................. | 6-063406 |
| Mar. 28, 1995 | (JP) | ................................. | 7-069001 |
| Mar. 28, 1995 | (JP) | ................................. | 7-069003 |
| Mar. 28, 1995 | (JP) | ................................. | 7-069004 |

(51) Int. Cl.
*G06K 15/00* (2006.01)
*G06F 15/00* (2006.01)

(52) U.S. Cl. ....................... 358/1.15; 358/1.1

(58) Field of Classification Search ................. 358/1.1, 358/1.5, 1.9, 1.11–1.18, 400, 407, 468, 474, 358/500

See application file for complete search history.

(56) References Cited

U.S. PATENT DOCUMENTS

| 4,348,084 A | 9/1982 | Kitagishi et al. ........... 359/745 |
| 4,558,928 A | 12/1985 | Imaizumi .................... 359/745 |
| 4,610,514 A | 9/1986 | Nakamura ................... 359/746 |
| 5,128,878 A | 7/1992 | Gore et al. ................. 345/502 |

(Continued)

FOREIGN PATENT DOCUMENTS

EP         0 366 425         5/1990

(Continued)

*Primary Examiner*—Gabriel Garcia
(74) *Attorney, Agent, or Firm*—Fitzpatrick, Cella, Harper & Scinto

(57) ABSTRACT

When a command for the status response is issued from a host computer to a printer, a data-receipt administration portion adds, to the received command, an ID peculiar to each command, and stores the commands and the peculiar ID; and a data-transmission administration portion immediately returns the ID added to the command to the host computer. A printer-language analyzing portion analyzes the received command, while a status-response processing portion produces information that must be responded to the command. The produced response information is, together with the previously-stored ID added to the corresponding command, returned from the data-transmission administration portion to the host computer. The host computer collates the previous-received ID and the ID received together with the response information with each other so that the command and the corresponding response can be made correspond to each other.

3 Claims, 42 Drawing Sheets

U.S. PATENT DOCUMENTS

| | | |
|---|---|---|
| 5,179,637 A | 1/1993 | Nardozzi .................... 358/1.15 |
| 5,220,674 A | 6/1993 | Morgan et al. ............. 709/223 |
| 5,537,626 A | 7/1996 | Kraslavsky et al. ........... 710/8 |
| 5,706,411 A | 1/1998 | McCormick et al. ...... 358/1.14 |
| 5,940,582 A | 8/1999 | Akabori et al. ............ 358/1.13 |
| 6,048,115 A | 4/2000 | Unishi et al. ................. 400/74 |
| 6,437,869 B1* | 8/2002 | Matoba ..................... 358/1.13 |
| 7,158,253 B2* | 1/2007 | Matoba ..................... 358/1.15 |
| 2002/0048034 A1* | 4/2002 | Matoba ..................... 358/1.13 |
| 2003/0161001 A1 | 8/2003 | Ueda et al. ................ 358/1.15 |
| 2003/0184807 A1 | 10/2003 | Tsuchitoi ................... 358/1.18 |

FOREIGN PATENT DOCUMENTS

| | | |
|---|---|---|
| EP | 0 578 262 | 1/1994 |
| JP | 02-144372 | 6/1990 |
| WO | 90/12359 | 10/1990 |

* cited by examiner

FIG. 2

HOST COMPUTER → PRINTER APPRATUS (1) DEMAND FOR RESPONSE INDICATING COMPLETION OF PAGE DISCHARGE →
ADMINISTRATION ID "1339"

(1") 「1339」 ←

(2) DEMAND FOR RESPONSE INDICATING NUMBER OF FONTS LARGER THAN 12 POINTS →
ADMINISTRATION ID "1340"

(2") 「1340」 ←

(3) DEMAND FOR RESPONSE INDICATING WHETHER OR NOT ON-LINE STATE →
ADMINISTRATION ID "1341"

(3") 「1341」 ←

(3') 「1341・STATUS ONLINE=OK」 ←

(2') 「1340:NUMBER OF FONTS LARGER THAN 12 POINTS IS 34」 ←

(1') 「1339:PAGE DISCHARGE COMPLETED」 ←

↓ TIME PASSES

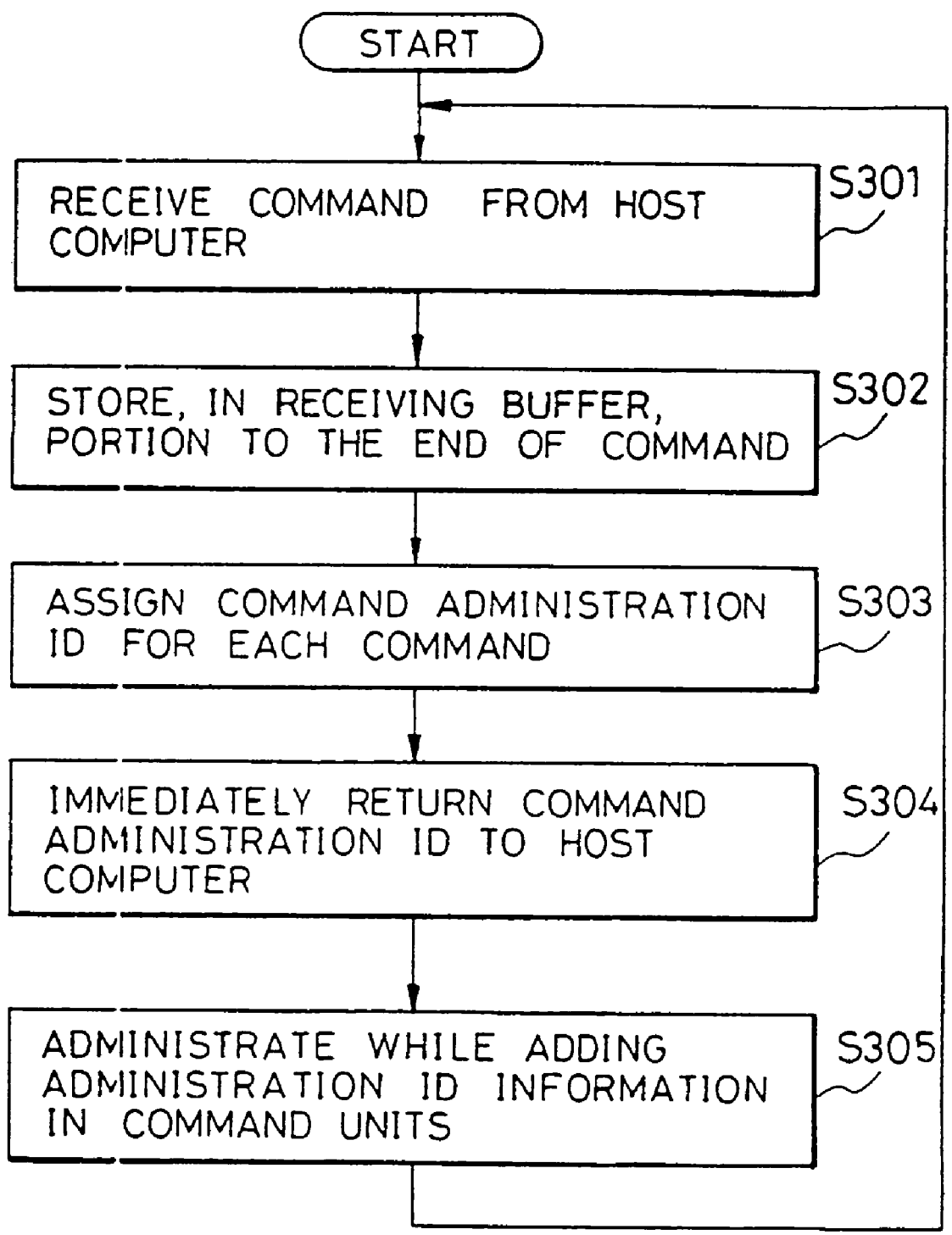

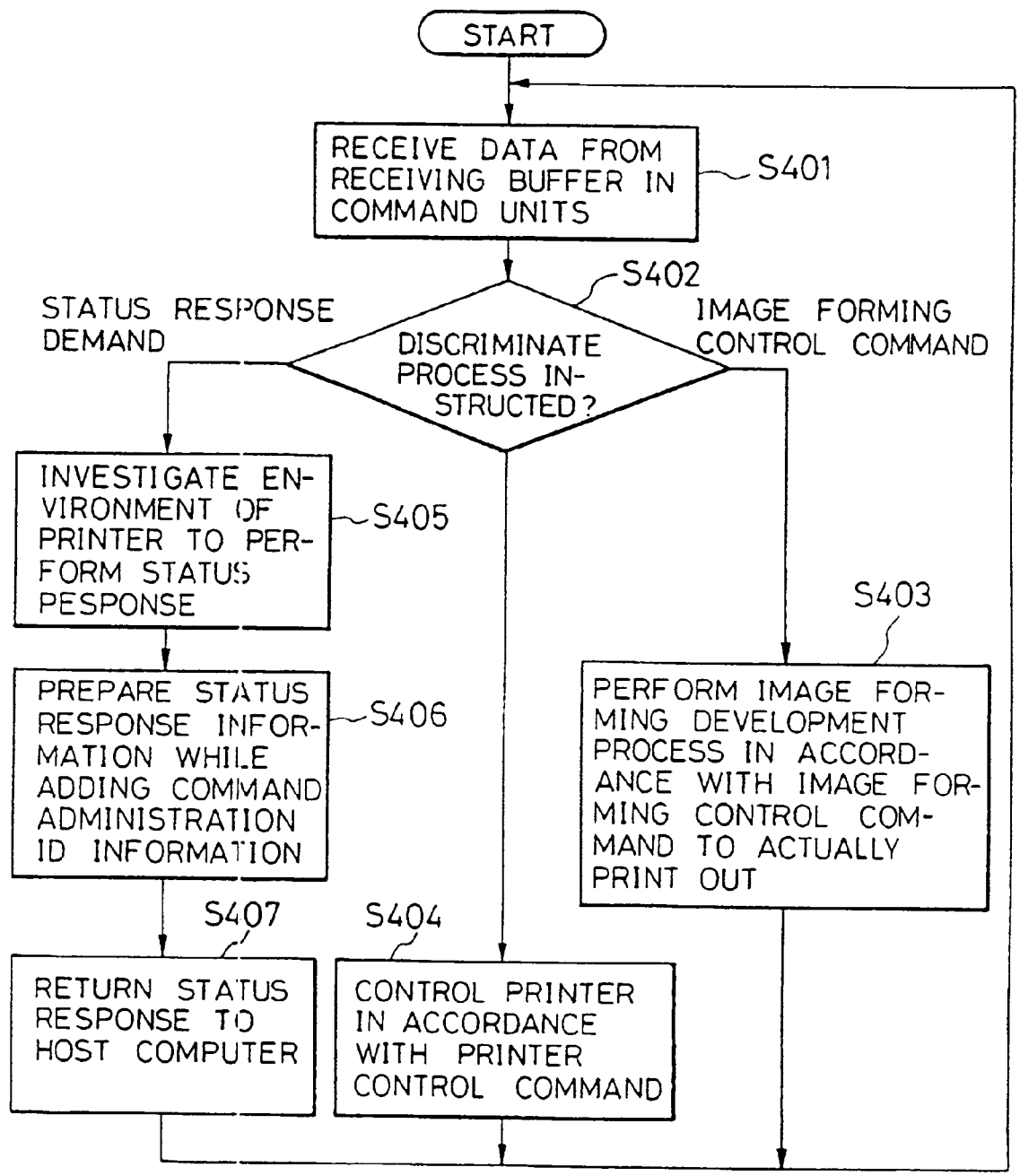

FIG. 15

| HOST COMPUTER | PRINTER APPARATUS |

(1) DEMAND FOR RESPONSE INDICATING COMPLETION OF PAGE DISCHARGE → 16:25:43

(1") 16:25:43

(2) DEMAND FOR RESPONSE INDICATING NUMBER OF FONTS LARGER THAN 12 POINTS → 16:25:50

(2") 16:25:50

(3) DEMAND FOR RESPONSE INDICATING WHETHER OR NOT ON-LINE STATE → 16:26:03

(3") 16:26:03

(3') 16:26:03: STATUS ONLINE = OK (2') 16:25:50: NUMBER OF FONTS LARGER THAN 12 POINTS IS 34

(1') 16:25:43: PAGE DISCHARGE COMPLETED

TIME PASSES

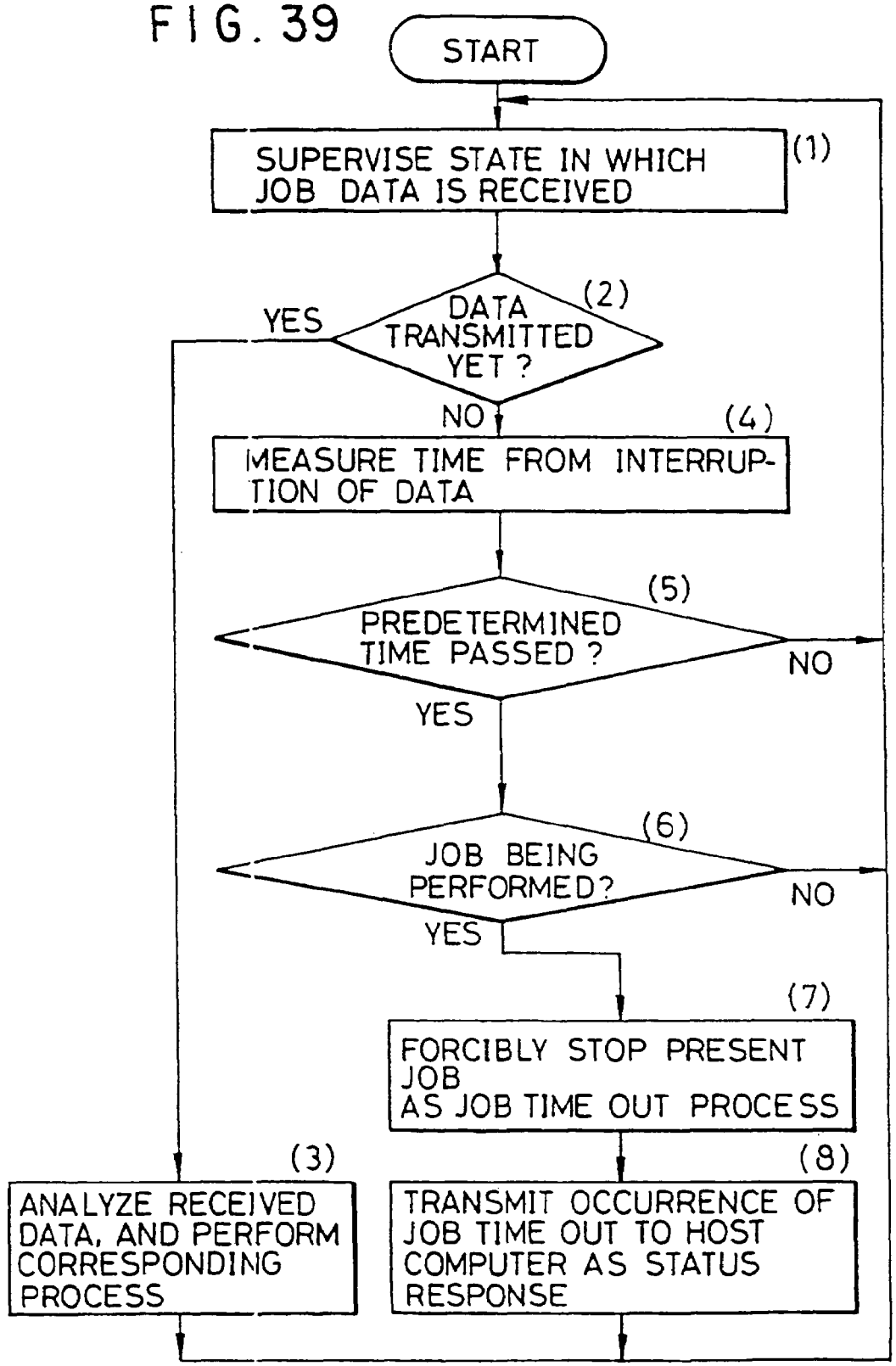

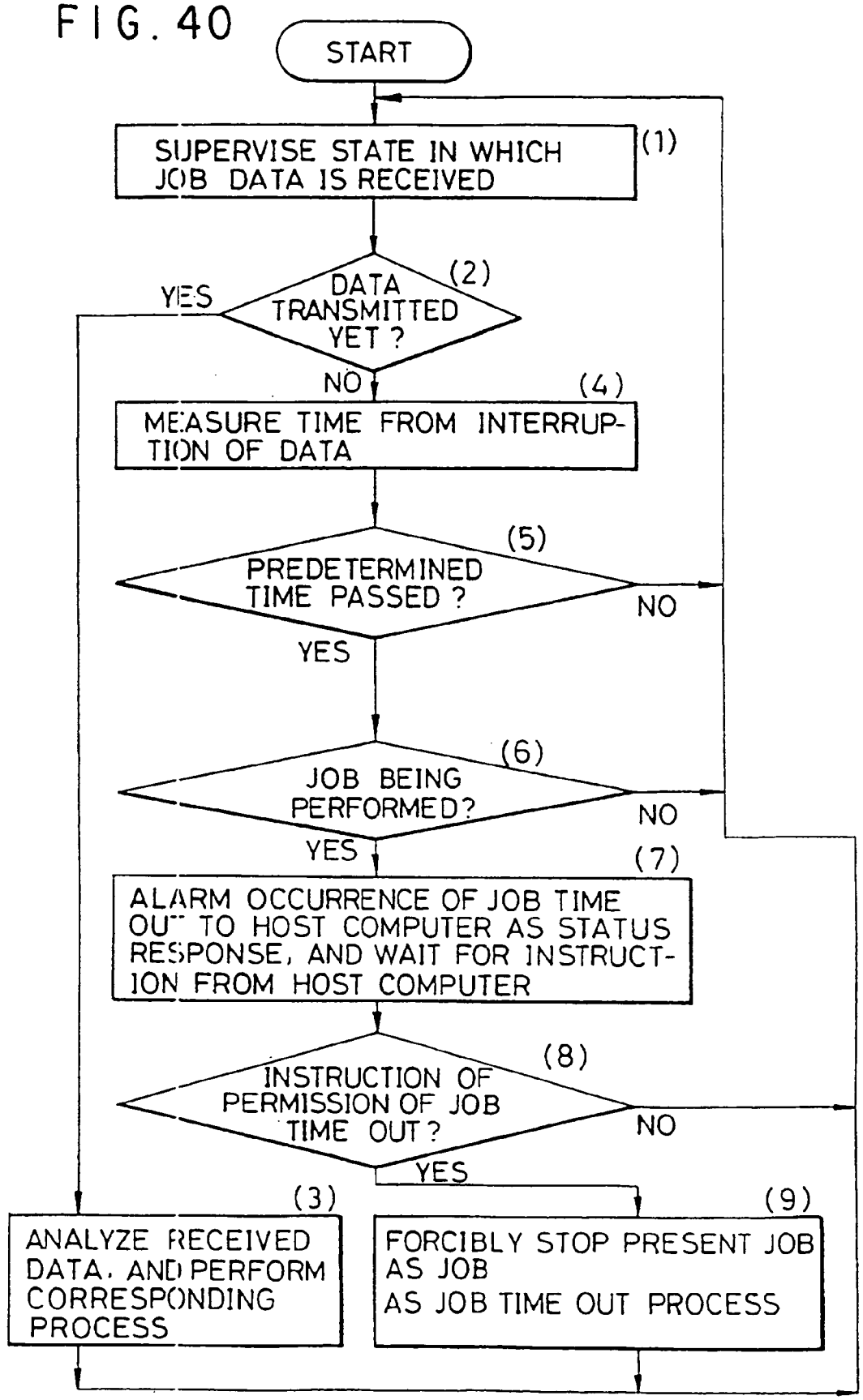

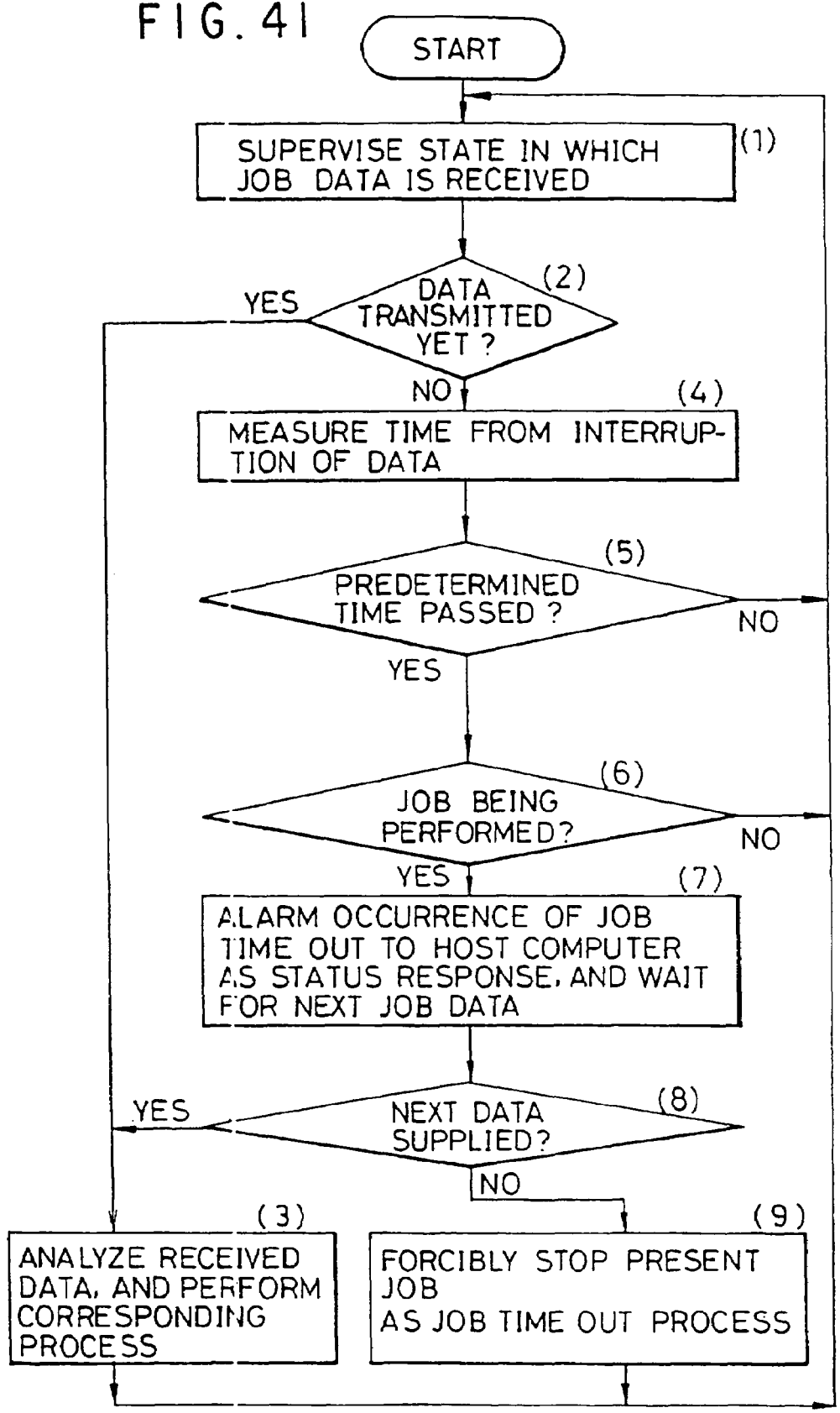

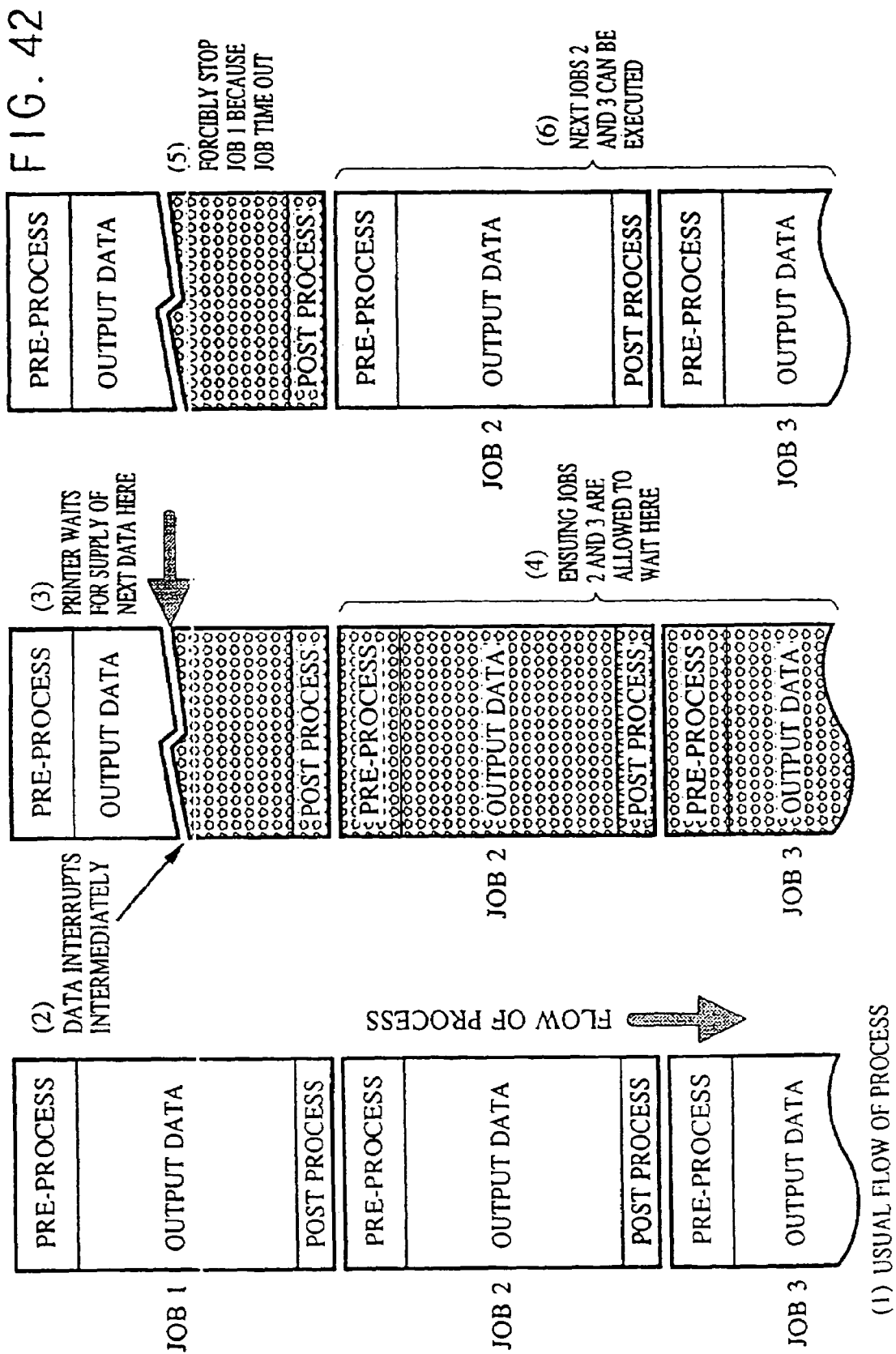

PRINTER, PRINTING CONTROL APPARATUS AND PRINTING SYSTEM USING UNIQUE JOB IDENTIFIERS, AND CONTROL METHOD THEREFOR

This application is a divisional of application Ser. No. 10/127,495, filed Apr. 23, 2002, now U.S. Pat. No. 7,158,253; which is a divisional of application Ser. No. 08/412,319, filed Mar. 29, 1995, now U.S. Pat. No. 6,437,869.

BACKGROUND OF THE INVENTION

1. Field of the Invention

The present invention relates to a printer apparatus and a control method therefore in which data received from, for example, a host computer, is analyzed so that an output process is performed.

2. Related Background Art

In a conventional printer apparatus characters, graphics and/or images are formed in accordance with a command issued from a host computer so as to output a document or to control the printer apparatus, such as printer initialization.

Another conventional printer apparatus has a function for responding to a host computer through a bidirectional interface in accordance with a command transmitted from a host computer. The response provides information indicating the state of the printer apparatus, the set environment of the printer apparatus, the progress of the document output and font to be used.

The foregoing function for transmitting various information items about the printer apparatus to the host computer is called, for example, a "status response".

A variety of bidirectional interfaces have been used in the status response, as exemplified by a known RS-232C, Bi-Centronics, Ethernet and the like, developed recently.

In recent printer apparatuses, any of the foregoing bidirectional interfaces have been employed as a standard interface in place of the conventional mono-directional interface.

It is considered that a printer system performing the status response by means of the foregoing bidirectional interface will be widely used.

Use of the status response function will enable the host computer to recognize the state of the connected printer.

For example, a status response indicating whether or not the printer apparatus is able to print out data at present, or information supply indicating occurrence of a problem, such as wanting of paper or paper jamming, will eliminate a necessity for a user to go to the position at which the printer apparatus is located, to confirm the state of the printer apparatus, even if the printer apparatus is located remotely from the host computer.

If information about fonts which can be used with the printer apparatus, about type of graphics which can be formed, and about the printer languages which can be executed, is status-responded, the information serves as instructions to use a proper font and to form an image by using a printer language when document data to be output is processed.

With the conventional mono directional-interface printer apparatus, the host computer cannot recognize whether or not the printer apparatus has correctly formed an image and whether or not the printing operation is stopped due to a problem after the host computer has transmitted data to the printer apparatus. When data is processed, the host computer must process image data to be formed on an assumption of the fonts and image-forming functions of the printer apparatus. Therefore, it is considered that a system, using both a bidirectional interface and the status response function and causing the host computer to acquire information of the printer apparatus to perform administration, will be usually used.

In a case where the status response is performed by using the bidirectional interface, a command for the status response is issued from the host computer to the printer apparatus.

The printer apparatus analyzes the language in the command to recognize that the command orders a status response, followed by examining information about the subject printer apparatus. Obtained information is described in a format of data to be transferred, and the information is transmitted to the host computer.

The host computer receives the information, and analyzes data so as to recognize the state of the printer apparatus.

As described above, the interface between the host computer and the printer apparatus is established in two directions, one of which runs from the host computer to the printer apparatus, and another of which runs from the printer apparatus to the host computer.

The foregoing two-directional data communication is performed by a method determined depending upon the method of the bidirectional communication. For example, a method is employed in which transmission and reception are performed at individual timings, or a method is employed in which either of the transmission or the reception can be performed at a time, and switching is performed between transmission and reception as the need arises.

In the printer apparatus, a major portion of the data communication is shared by transmission of data from the host computer to the printer apparatus.

Therefore, greater importance is placed on data transference from the host computer to the printer apparatus than transference from the printer apparatus to the host computer, and the data flow is intended to be performed efficiently by adjusting the algorithm of the interface and the hardware.

As a result transmission and reception are not always performed at the same timing. For example, in a case where output data including a status response has been transmitted, the structure, in which the output process is given priority, sometimes inhibits return of the status response until the output data is processed to a certain extent. To perform the response, receipt of the output data must be temporarily stopped, or a portion of the performance of the CPU must be used to perform the response operation. As a result, an efficient printing process cannot be performed.

The transmitting and receiving portion of the host computer has a similar problem.

Generally, the process for the host computer to receive a response from the printer apparatus has lower priority than that given to the process for transmitting output data. Also the transference rate of the operation of receiving data from the printer is usually lower than that of the operation of transmitting data to the printer.

As described above, the usual printer apparatuses focus on data transfer from the host computer to the printer apparatus, and the response is given low priority. Therefore, even if a command for the status response is issued, its response is not always returned immediately.

To prevent delay due to the difference in the processing speed and processing timing among the host computer, the interface for transmitting/receiving data and the printer apparatus, a data buffer is generally disposed at each contact.

For example, a data buffer, called a "receiving buffer" is provided to adjust data transference from the host computer to the printer apparatus through the interface, the receiving buffer being disposed at the inlet port of the printer apparatus. Data transmitted through the interface is temporarily stored in the foregoing buffer. Since the foregoing storage process is performed in synchronization with the processing speed and the processing timing for the interface, load on the interface can be reduced, and thus the process can be performed under the most proper condition for the interface.

Also the printer apparatus is able to receive data from the receiving buffer at the processing-speed and processing timing thereof. Thus, the printer apparatus is able to perform the process thereof under the most proper condition.

However, the temporal storage of data inhibits immediately processing of data transmitted from the host computer, but causes a somewhat long time to take place before start of the process.

Even if the host computer issues a command for the status response, command data is temporarily stored in the receiving buffer or the like, and then the printer apparatus sequentially reads the buffers. When the printer apparatus receives the command data, the process is started.

Therefore, the presence of a buffer of the foregoing type in a data conveyance passage will cause a certain time to be taken from the issue of the command for the status response to the receipt of the response.

A status response process to be performed in the printer apparatus will now be described.

It sometimes takes a long time to take information of a response depending upon the contents of the response. An assumption is made that a command for the status response is issued to take information of all characters of included fonts by searching the all characters. The foregoing process sometimes takes several seconds though the period depends upon the state of the included fonts.

An assumption is made that a command for the status response has been issued with which if the state of the printer apparatus is changed, then the change is communicated to the host computer.

For example, a command for the status response is, during a document output, issued with which if all pages have been completely output, then the output must be communicated to the host computer.

In the foregoing case, a time difference of tens of seconds to several minutes sometimes takes place from issue of the command for the status response to completion of discharge of all pages and return of the response.

Since the transmission of output data from the host computer cannot be stopped even if the response is not returned, the timing of the command for the status response and that of the status response are completely shifted.

As described above, the status response is not always returned immediately after the host computer has issued the command for the status response.

The status response is sometimes returned immediately, while the same is returned after several seconds to several minutes or longer. Therefore, the host computer must wait for the return, followed by analyzing the contents of the return to recognize the state of the printer.

In a case of the conventional printer apparatus which does not use the status response frequently, a somewhat time delay can be allowed in the printing system.

However, information interchange to and from the printer apparatus using the status response will be performed frequently and widely used.

The shift of the timing between the transmission and the response causes a critical problem to arise. An assumption is made that a printer system is present in which a printer apparatus is required to transmit a variety of status responses. FIG. 7 is a zigzag chart showing exchange of messages between the host computer and the printer of a system of the foregoing type. A portion of statuses takes a long time to check corresponding information or a portion of the same is not returned if a certain state of the printer is not changed, depending upon the type of the statuses.

Referring to FIG. 7, an assumption is made here that the host computer issues, in document output data, the following three commands for status response to the printer in the sequential order below: (1) "notify discharge of the page, which is being printed", (2) "send information about the number of fonts among the fonts included in the printer apparatus that are larger than 12 points", and (3) send information whether or not the printer apparatus is able to receive data at present.

The printer apparatus sequentially analyzes the supplied commands to perform corresponding status responses, output of the document and control of the printer apparatus.

Although the status response with respect to the command (1) is intended to be performed in the foregoing sequential order, the response cannot be performed immediately because the page is being printed out.

As a result, performing of the foregoing response is caused to wait for the completion of the page discharge. Since the processing efficiency is unsatisfactory if all processes are stopped in the foregoing waiting state, the operation proceeds to a next command process.

In order to return the status response with respect to the command (2), fonts in a large data volume included in the printer apparatus must be retrieved to search the font meeting the specified conditions. The foregoing retrieval takes a certainly long time, though the time depends upon the quantity of the fonts. If other processes are stopped to perform the foregoing retrieval process, the processing efficiency deteriorates.

In a case of a system capable of performing a parallel process, a next command process can be performed during the retrieval process.

Then, a status response with respect to the command (3) is performed. The foregoing status required to be responded is a simple status that inquires whether or not the printer apparatus is able to receive data. Therefore, the response can immediately be performed. Since the contents of the response are used to discriminate that data can immediately be transmitted at present, it becomes useless if it is not returned immediately.

The printer apparatus immediately returns the response with respect to the command (3) to the host computer (process (3')).

After a certain time has passed, the font retrieval required in the command (2) is completed. Then, the status response with respect to the command (2) is returned to the host computer (process (2')).

After a certain time has passed, the page discharge is completed, and a status response with respect to the command (1) is returned (process (1')).

As described above, the sequential order and timing at which the status responses are returned from the printer apparatus are not always the same as the sequential order and timing at which the host computer has issued the commands for status response. Therefore, the host computer must discriminate to what command the returned response relates.

If simple responses "OK" and "34" are received, it is difficult to recognize the commands to which the foregoing responses correspond.

To overcome the foregoing problem, a conventional discrimination method has been known, in which information in the form of a character string or the like indicating the command to which the response corresponds is added to the status response to be returned.

For example, the status response with respect to a command (3) inquiring whether or not the printer apparatus is able to receive data is formed into a form "STATUS ONLINE=OK".

As a result, discrimination can be performed that the state "ONLINE", which is whether or not the printer status is in a state where data can be received, is permitted, that is, "OK".

Since added information in the form of an individual character string is assigned to each content of the response, the host computer is able to detect the command, to which the returned response corresponds by simultaneously discriminating the foregoing character string.

Also in a case where any of the status responses is received, added information indicating the contents enables the command, to which the response corresponds, to be detected even if the sequential order and the timing of the return are out of order.

However, unsolved problems remain.

Although the foregoing method enables the status responses for different items to be identified, a problem arises in a case where the same status response for the same item is repeatedly demanded, a problem arises in determining to what command for the status response the returned response corresponds.

Although to what item the response corresponds is described in the returned information in the form of the character string or the like, in the case where the status responses relate to the same item, a further discrimination cannot be performed because the information for identifying the item is the same.

An assumption is made here that the host computer intends to register font data into a printer apparatus. FIG. 8 shows an example of message communication between the host computer and the printer in the foregoing case. Referring to FIG. 8, the host computer instructs a storage unit in the printer to perform a preparation operation, such as securing a region for registering font data, which will be then performed, and to perform an initialization operation (process (1)).

In accordance with the foregoing command, the printer apparatus causes the storage unit to perform the preparation process. After it has been completed, the printer apparatus returns status response "STATUS FONT-DOWNLOAD=OK" to the host computer so that completion of the preparation is communicated (process (2)). In accordance with the foregoing information, the host computer starts registering font data into the printer apparatus (process (3)). However, it is possible that the status response (2) does not correspond to font registration declaration in command (1), but is a response to another font registration declaration command (4) issued in another process or the like.

Even if the correct status response indicating completion of the preparation of font registration corresponding to the command (1) is the status response (5), which will be then returned, they are the status responses relating to the same item, causing information expressed by a character string or the like to be made the same. Therefore, the two status responses cannot be distinguished.

Although the preparation has not been completed, registration of fonts into different storage regions fails. Also a previous registration intended in another process fails.

In recent years, a system has been used widely in which one printer apparatus is simultaneously used by a plurality of host computers, processes and users.

In an environment of the foregoing type, disorder of the foregoing type takes place frequently.

Even if the two timings are the same, disorder of the sequential order of the returns of the status responses and the timing of the commands for status response prevents smooth information exchange between the host computer and the printer apparatus using complicated status responses. In this case, constitution of an advanced printer system, in which the control of a host computer and that of a printer are integrated, encounters a problem.

The operation of an output of a document will now be described specifically.

In a case where one document is printed, output data transmitted from a host computer or the like to the printer apparatus is usually formed as shown in FIG. 25. A set of output data is called a "job".

Initially, start of data output job is declared (process (1)), with which supply of output data to the printer apparatus is notified.

Then, the environment of the printer is initialized (process (2)). There is a possibility that the environment of the printer has been changed variously due to data supplied previously. If new data is processed in the foregoing state, the process is sometimes undesirably affected by the changed environment, and a desired printing operation cannot sometimes be performed. Therefore, the environment of the printer is initialized prior to starting the output process so that the influence of the previous process is eliminated.

Then, the environment of the printer for use in the output operation which will now be started is set (process (3)). For example, the size of paper to be printed out is set, and the font for use in the printing operation is downloaded from the host computer to be registered. The foregoing previous preparation enables an ensuing printing process to be performed correctly.

A sequence of the processes (1) to (3) are collectively called a previous process of the job.

Then, a printing out process is performed (process (4)). Data output is usually performed in such a manner that data for forming images of characters, graphics or images is described, after data for one page has been described, a discharge command is issued. By repeating the foregoing process for the pages to be output, a document consisting of a plurality of pages can be printed.

After instruction to print all pages has been completed, a post process is performed such that the environment of the used printer is restored (process (5)) in such a manner that the changed environment of the printer is restored, and the used font, which has been registered, is deleted. Thus, the environment is arranged for another output, data of which will be supplied later.

Finally, job completion of the output data is declared (process (6)). As a result, the printer apparatus recognizes completion of one data process.

A sequence of the processes (5) and (6) are collectively called a post process for the job.

The foregoing process is a general example, and there sometimes are cases where the respective processes cannot clearly be divided because of somewhat complexity. For example, the initialization in process (2) is undesirably and automatically performed simultaneously with the start declaration in process (1), or the post process in process (5) is omitted. However, it can be considered that the process is schematically constituted as described above.

A sequence of processes (1) to (6) is generally called a "job" (or a "printing job"). When one document is output from the host computer, the printer apparatus usually processes data in the job units. By receiving the job start declaration (1) and other previous processes, the environment for performing the printing job is arranged, and then the printer apparatus starts the job process. By receiving the job completion declaration (6) and the post processes, the subject job is completed, followed by receiving a next job.

In a case where a plurality of jobs are output from the host computer, a plurality of jobs corresponding to the document output are sequentially transmitted. The printer apparatus sequentially processes and prints out the supplied plural jobs in job units.

Also in a case of a network or the like where a plurality of computers are connected and a plurality of users respectively perform document outputs, the printer apparatus sequentially processes, in job units, and prints out the plural jobs supplied from respective data sources.

As described above, the foregoing printer system, in job units, processes the outputs from a plurality of host computers, users, and documents so that disorder is prevented.

Then, status response process in each stage of the job will now be described.

In a stage (process (3)) of setting the environment of the printer shown in FIG. 7, information, such as the present environment items for the printer and set values that can be set to the items must be recognized to set the environment of the printer.

In an example case where printing is performed on large-size paper, data to be described becomes considerably different depending upon whether the maximum paper size for the printer is A3 size or B4 size. It is probable that the size is different depending upon the type and version of the printer. Also it is probable that the printer is adapted to only B4 size or smaller. Even if the printer is adaptable to the A3 size, the loaded unit, such as a paper cassette, sometimes inhibits the printing operation with A3 paper.

The type of fonts included in the printer apparatus is also important information to describe a document. In an example case where characters having a size of 72 points are intended to be printed, correct printing cannot be performed if the foregoing font is not included in the printer. Depending on the situation, required fonts must be downloaded from the host computer so as to be registered into the printer.

If the printer apparatus has a function of receiving compressed data, image data or the like, the quantity of which is large, can be transmitted while compressing data, and therefore time required to transfer data can be shortened significantly. If the foregoing convenient function is provided, the host computer takes an excessively long time to perform the process if it does not know the function.

Since, for example, the contents of the description of output data are frequently changed due to the state of the printer apparatus, the state of the printer must be investigated. In order to investigate the state, a status response is used. The status response enables all information of the printer apparatus, such as the size of paper and the type of the font, that can be used, and the empty capacity of the RAM, to be obtained. By recognizing the state and the performance of the printer, output data can be described in the most proper form, and thus the performance of the printer can be attained.

In a stage of, for example, output of each page (process (4)), the state of the printer, which is always changed as time passes, is transmitted to the host computer by means of the status response.

If paper runs out during output, a status response "STATUS PAPER-OUT", indicating running out of paper, is transmitted to the host computer. In response to the status response, the host computer displays an alarm of paper out for a user on a screen of a computer or the like. If printing could not be performed correctly due to any problem, a status response requiring again transmitting data is sent in order to again perform the printing operation. Even if the printing operation is being performed, intermediate state, for example, the page to which printing has been progressed, is notified.

By transmitting information, such as the environment and performance of the printer and state of the same, that is always changed as the time passes, the host computer is enabled to recognize the state of the printer.

While understanding the concept of the job and example use of the status response, problems experienced with the conventional printer apparatus will now be described. An example case will now be described about a status response used when a job for outputting a plurality of documents is performed (see FIG. 26).

Initially, the operation in the host computer will now be described. An assumption is made here that a host computer or the like intends to output a plurality of output jobs from the printer apparatus. In a case where a plurality of documents are output, the host computer sequentially processes the document output processes.

Initially, the first document is output. Start of the job is declared with respect to the printer, the environment of the printer is initialized, and a previous process, for example, setting of the environment of the printer, is performed to output document (process (1)).

Then, the host computer reads the contents of the document, to be output, from a document file or the like to judge a proper layout of the characters, graphics and images in accordance with the read contents, followed by converting the contents of the image to be formed into a printer language description format. Then, the converted contents are, as output data, transmitted to the printer apparatus (process (2)).

After output data for all pages has been transferred, the host computer restores the environment of the printer, and performs the post process, such as declaration of the job completion (process (3)). Thus, the output of the first document, that is, Job 1, has been completed for the host computer.

Then, the host computer starts output of a next document, that is, Job 2 (process (4)). Also the Job 2 is performed similarly to the Job 1. If the document output is continued, Job 3 and Job 4 are performed similarly.

Then, process to be performed by the printer apparatus will now be described.

When data of the previous process (1) has been received from the host computer, the environment of the printer is initialized, and the required environment is set (process (1')).

At this time, information about the size of paper, that can be used, and information about the empty memory capacity in the printer are notified to the host computer by the foregoing status responses. In accordance with the foregoing information, the host computer adjusts output data to cause a most proper printing process to be performed.

Since the foregoing status response is usually immediately returned from the printer apparatus when the host computer requires, the process (1) for the host computer and the process (1') for the printer apparatus are made substantially synchronous.

Then, output data in process (2) is received from the host computer. The printer apparatus analyzes the supplied output data to form images of characters, graphics or images. Then, a page break command is received, and paper, on which the image has been formed, is discharged (process (2')).

At this time, the foregoing status response causes information about the page which has been discharged and that about the state of the printer, such as shortage of paper, to be transmitted to the host computer whenever one page is discharged. The host computer receives the information so as to recognize the state of the printer apparatus.

However, the output process to be performed by the printer apparatus takes a certainly long time because a long time takes to develop characters and graphics or the output speed for the printer engine is limited. Accordingly, there is sometimes a case where the host computer has completed the output data processing process (process (2)) and the process for transferring data to the printer, but the printer apparatus is performing the image forming and developing process (process (2')) and the page output process.

As compared with the data processing and transfer process in the host computer that are usually completed in several seconds, the image forming and output process in the printer apparatus takes tens of seconds in a shortest case, and sometimes takes several minutes in a slowest case.

Recently, to overcome the difference in the processing speed, a large-capacity receiving buffer is provided for the printer apparatus to forcibly store data transmitted from the host computer in order to make the host computer quickly free from the printing process. Therefore, the process to be performed by the host computer is completed further quickly, thus causing the difference in the processing speed from that of the printer apparatus to be made considerable.

As described above, in the image forming and output process, the process (2) for the host computer and the process (2') for the printer apparatus usually are not performed at the same timing. In the foregoing stage, the process in the printer apparatus tends to be delayed.

The delay taken place in the printer apparatus causes the command of the post process (process (3)) commanded by the host computer not to be processed immediately, but the command is temporarily stored in the receiving buffer. After the image forming and output process (process (2')) for the printer apparatus has been completed, the post process is performed (process (3')).

Also output data of a next job (process (4)) in the host computer is usually and temporarily stored in the receiving buffer, but is not immediately processed by the printer apparatus. The foregoing process is performed after the previous job has been completed.

Therefore, a state is frequently realized where although the host computer is performing a next job, the printer apparatus is outputting the previous job. The delay of the process timing between the host computer and the printer apparatus raises a critical problem in the status response.

An assumption is made here that when the host computer is performing the output data processing and transferring process in Job 2, the printer apparatus is in the image forming and output process in Job 1.

The printer apparatus transmits, to the host computer, information, such as "discharge of the third page has been completed" as status response whenever one page is discharged. This means "discharge of the third page" in the "Job 3". In the conventional status response, only information "the present page" has been returned. Therefore, there is a possibility that the host computer erroneously recognizes such that the foregoing process is "the third page" in the "Job 2", which is being processed by the host computer.

When the information about the type of the registered fonts required in the Job 2 is responded by the printer apparatus for example, the host computer has already processed the Job 3. Thus, there is a risk that disorder takes place in any status response, as well the page discharge state.

Recently, an environment, in which one printer apparatus is commonly used by a plurality of host computers, processes and users, has been widely employed. In the foregoing environment, disorder of the foregoing type takes place frequently.

Even if the two timings are the same, disorder of the timing of the commands for status response and the returns of the status responses in a plurality of jobs inhibits information exchange between the host computer and the printer apparatus using complicated status responses. In this case, constitution of an advanced printer system, in which the control of a host computer and that of a printer are integrated, encounters a problem.

As described above, the conventional printer apparatus has no means for identifying the job in which a status response is made when the status response is transmitted to the host computer. Therefore, disorder takes place in the host computer, and thus the host computer cannot easily recognize the state of the printer.

In a contrary case where a plurality of jobs are sequentially processed as described above, a problem rises in the job process if each job data is not prepared in a correct job format. Thus, critical disorder takes place in the overall printing process.

A case will now be considered in which a job for outputting a plurality of documents is processed as follows (see FIG. 42).

An assumption is made here that document data of three jobs, Job 1, Job 2 and Job 3, has been transmitted from the host computer or the like. The printer apparatus sequentially receives the job data to one by one analyze their contents to perform corresponding document output processes (process (1)).

The foregoing job data is arranged to be described in the foregoing job format. The printer apparatus analyzes the job data in accordance with the foregoing description rule.

If data has been interrupted during the Job 1 for example (process (2)).

Although the printer apparatus continues its process to the point of the interruption, the printer apparatus cannot determine the ensuing process.

The foregoing interruption of job data takes place due to various reasons.

For example, the following cases can be considered: the performance of the interface, which is performing data transfer, causes the supply of ensuing data to take a long time; the printer apparatus is busy in performing operations and therefore data receipt is temporarily stopped; and the processing speed in the host computer is too slow to process data in time.

The foregoing problems are basically overcome due to a time lapse. When each problem is overcome, ensuing job data is again transmitted.

Other cases can be considered that a communication line is disconnected, and therefore job data cannot be transmitted; a problem arises in the host computer, and thus processing of job data is stopped; and the host computer disregards the job data format and ends the job process without formal job completion declaration.

The foregoing factors are not usual cases but are caused from special reasons, such as accidents. Therefore, the foregoing problems cannot be overcome even if the time passes, and the job process cannot be again performed.

If interruption of job data takes place, the printer apparatus waits for supply of job data from the host computer (process (3)).

If data supply delays occurring due to the low performance of the interface, the delay can usually be overcome in several seconds.

If ensuing job data is transmitted after a certain time, it is analyzed and processed. Thus, a document can be output without problem.

However, in the case where processing of job data has been stopped in the host computer, no ensuing job data is supplied thought it is waited for.

However, the printer apparatus continuously waits for the supply of job data because it cannot discriminate the reason why the job data has been interrupted.

Since the printing process in Job 1 is being performed in the waiting period, next Job 2 and Job 3 cannot be performed (process (4)).

That is, all job processes are stopped in the foregoing state, and a waiting state is realized.

Thus, smooth operation is prevented, and the efficiency deteriorates.

Accordingly, a means called "job time out" has been employed.

In the job time out process, time taken from the moment the job data has been interrupted is measured.

Even if following job data is not supplied after a predetermined time has passed, a discrimination is performed that the job cannot be continued due to a problem, followed by forcibly stopping the job (process (5)).

By performing the job time out process, the interrupted Job 1 is ended here, followed by starting the Job 2 and Job 3 (process (6)).

That is, the Job 1, that is considered impossible to be again performed, is abandoned, and its process is stopped so as to make effective the ensuing Job 1 and Job 2.

Thus, in a printer apparatus in which a plurality of job data items are processed, even if a partial problem takes place in a job, all of following jobs are not stopped, but the partial job encountered the problem is omitted, and other jobs can be performed.

Note that the lapse time for use in the discrimination in the job time out process must be proper length.

If the time is too short, the job is ended even in a case where the delay takes place due to the performance of the interface, and even job data, that can be correctly output, can be canceled.

If the time is too long, a long time takes to wait for the supply, causing the printing efficiency to deteriorate.

The length of the discrimination period must be determined considerably precisely because it depends upon the performances of the printer apparatus, host computer, and the interface.

To properly set the time, considerably sufficient experience and knowledge are required and it is usually determined to a relatively proper value.

Since interruption of job data takes place under a variety of conditions, it is impossible to determine the perfectly proper discrimination time.

Therefore, even if any proper discrimination time is employed, there remains a risk that a temporal interruption of job data due to a long time lapse accidentally took place is erroneously discriminated to be interruption of job data that cannot be overcome.

A case will now be described in which a job, that can be continued, is ended by the printer apparatus.

If a job is forcibly stopped due to job time out, the page, which has been left in the printer, and on which an image is being formed thereon, is discharged in the foregoing state or the image forming process is canceled.

Also data, such as fonts, downloaded and registered from the host computer for use in the printing operation, is generally deleted.

Furthermore, the set environment, such as the size of the paper and the number of lines per page are restored to the default state.

As a result of the foregoing forcible stop of the job, the environment and the like used in the job are completely reset in order to perform a next job.

An assumption is made here that following job data is supplied at a moment the job time out process is substantially ended.

Since the host computer does not know that the printer apparatus has been reset due to the forcible job completion process, the host computer prepares following job data, and transfers the same as the continuation of the job data, which has been transferred.

However, the subject job process has been ended in the printer apparatus, and the registered fonts required to perform the job, the environment of the printer and intermediately formed image data are cleared.

However, the job data processed by the host computer is described on an assumption that the foregoing factors are left in the printer apparatus.

For example, the registered font pattern is intended to be used, a command for ordering the paper size is omitted upon a consideration that it has been ordered yet, and following images are formed upon a consideration that the pages, on which images have been formed yet, are left.

However, the foregoing factors have been cleared in the printer apparatus, thus causing the document output to be made disordered. Depending upon the situation, following setting of the printer is changed to an incorrect state, thus raising a risk that following jobs encounters a problem that correct images cannot be formed, as well the job, which is being processed.

As described above, in the conventional job time out process, even if the job is forcibly stopped due to job time out, information cannot be communicated between the host computer and the printer apparatus. As a result, there arises a problem in that a most proper job time out process cannot be performed.

SUMMARY OF THE INVENTION

In the viewpoint above, an object of the present invention is to provide a printer apparatus and a method of controlling the same, in which the host computer is able to accurately and reliably recognize the state of the printer apparatus.

In order to achieve the foregoing object, according one aspect of the present invention, there is provided a printer apparatus for performing a printing process in accordance with process demands from a data source, comprising: receiving means for receiving process demands; assigning means for assigning a peculiar identifier to each process demand received by the receiving means; identifier returning means for returning, to a data source, the identifiers assigned by the assigning means; and information returning means for returning, to the data source, information, which is a response indicating completion of the process, the demand of which has been received by the receiving means, the information being returned together with the identifier assigned to the process demand.

According to another aspect of the present invention, there is provided a printer system in which a data source and a printer are connected to each other, comprising: a data source including identifier generating means for generating an identifier peculiar to each process demand, and transmitting means for transmitting the process demand together with the identifier; and a printer apparatus including receiving means for receiving the process demand from the data source together with the peculiar identifier to the process demand, identifier returning means for returning, to the data source, a response to the process demand, received from the receiving means, together with the identifier peculiar to the process demand, and information returning means for returning information indicating completion of the process demanded with the process demand together with the identifier peculiar to the process demand.

According to another aspect of the present invention, there is provided a printer system in which a data source and a printer are connected to each other, comprising: a data source including first time measuring means for measuring time, time storing means for storing time at which a process demand has been generated, and transmitting means for transmitting the process demand; and a printer apparatus including receiving means for receiving the process demand from the data source, second time measuring means for measuring time, and returning means for returning, to the data source, information indicating completion of the process, the demand of which has been received by the receiving means, together with time, at which the process demand has been received by the receiving means.

According to another aspect of the present invention, there is provided a method of controlling a printer apparatus for performing a printing process in accordance with a process demand from a data source, comprising the steps of: receiving process demands; assigning an identifier peculiar to each of process demands received in the receiving step; returning, to the data source, identifiers assigned in the assigning step; and returning, to the data source, information indicating completion of the process, the demand of which has been received in the receiving step, together with the identifier assigned to the process demand.

According to another aspect of the present invention, there is provided a method of controlling a printer system, in which a data source and a printer are connected to each other, comprising the steps of: generating an identifier peculiar to each of process demands; transmitting the process demand together with the identifier; receiving the process demand transmitted in the transmitting step together with the peculiar identifier; returning the identifier in such a manner that a response indicating completion of a process, the process demand of which has been received in the receiving step, is returned to the data source together with the identifier peculiar to the process; and returning information of a response to the process demand together with the identifier peculiar to the process demand.

According to another aspect of the present invention, there is provided a method of controlling a printer system, in which a data source and a printer are connected to each other, comprising the steps of: storing time, at which a process demand has been generated, by reading the time from a first timer; transmitting the process demand; receiving the process demand transmitted in the transmitting step; and returning, to the data source, response information indicating completion of the process demand received in the receiving step in such a manner that time, at which the process demand has been received in the receiving step, is read, and the read time is also returned when the response information is returned.

In order to achieve the foregoing object, according to one aspect of the present invention, there is provided a printer apparatus that analyzes output data received from a host computer to perform an output process, comprising: means that receives output data from the host computer to administrate one set of the output data as a unit of one job; means that automatically assigns administration ID information to each job, adds the administration ID to the job to perform administration, and immediately transmits the administration ID information assigned to one received job to the host computer; means that analyzes a printer-language command described in the job to instruct an image forming and output process, a printer apparatus control process and a process of responding status to the host computer; means for performing printing out, control in accordance with the command to form and output an image and the apparatus control command; means for investigating a state of the printer apparatus and a state of a document output in accordance with the command for the status response issued to the host computer; means for generating status response data in which the administration ID information assigned to the job, which is being performed, is added to information of a result of the investigation; and means for transmitting the status response to the host computer through a bidirectional interface.

According to another aspect of the present invention, there is provided a printer apparatus that analyzes output data received from a host computer to perform an output process, comprising: means that receives output data from the host computer to administrate one set of the output data as a unit of one job; means that receives administration ID information for one job from the host computer and that adds the administration ID information to the job in the job units to perform administration; means that analyzes a printer-language command of the job to instruct an image forming and output process, a printer apparatus control process and a process of responding status to the host computer; means for performing printing out and control in accordance with the command to form and output an image and the apparatus control command; means for investigating a state of the printer apparatus and a state of a document output in accordance with the command for the status response issued to the host computer; means for generating status response data in which the administration ID information assigned to the job, which is being performed, is added to information of a result of the investigation; and means for transmitting the status response to the host computer through a bidirectional interface.

According to another aspect of the present invention, there is provided a printer apparatus that analyzes output data received from a host computer to perform an output process, comprising: means that receives output data from the host computer to administrate one set of the output data as a unit of one job; means that adds an administration ID to each job to administrate the jobs; means that analyzes a printer-language command described in the job to instruct an image forming and output process, a printer apparatus control process and a process of responding status to the host computer; means for performing printing out and control in accordance with the command to form and output an image and the apparatus control command; means for investigating the state of the printer apparatus and the state of a document output in accordance with the command for the status response issued to the host computer; means for generating status response data in which the administration ID information assigned to the job, which is being performed, is added to the investigated status; means for discriminating whether or not the investigated status must be transmitted to all jobs in place of transmitting the same to each job; means for adding information indicating importance to the status response that must be transmitted to all jobs; and means for transmitting the status response to the host computer through a bidirectional interface.

According to another aspect of the present invention, there is provided a printer apparatus that analyzes output data received from a host computer to perform an output process, comprising: means that receives output data from the host computer to administrate one set of the output data as a unit of one job; means that adds an administration ID to each job to administrate the jobs; means that analyzes a printer-language command described in the job to instruct an image forming and output process, a printer apparatus control process and a process of responding status to the host computer; means for performing printing out and control in accordance with the command to form and output an image and the apparatus control command; means for investigating the state of the printer apparatus and the state of a document output in accordance with the command for the status response issued to the host computer; means for generating status response data in which the administration ID information assigned to the job, which is being performed, is added to the investigated status; means for discriminating whether or not the investigated status is not information that must be transmitted to all jobs, but is information peculiar to each job; means for adding information indicating peculiar status to a status response that may be transmitted to each job; and means for transmitting the status response to the host computer through a bidirectional interface.

According to another aspect of the present invention, there is provided a printer apparatus that analyzes output data received from a host computer to perform an output process, comprising: means that receives output data from the host computer to administrate one set of the output data as a unit of one job; means that adds an administration ID to each job to administrate the jobs; means that analyzes a printer-language command described in the job to instruct an image forming and output process, a printer apparatus control process and a process of responding status to the host computer; means for performing printing out and control in accordance with the command to form and output an image or the apparatus control command; means for investigating the state of the printer apparatus and the state of a document output in accordance with the command for the status response issued to the host computer; means for generating status response data in which the administration ID information assigned to the job, which is being performed, is added to the investigated status; means for discriminating whether or not the investigated status must be transmitted to all jobs in place of transmitting the same to each job, or discriminating whether or not the investigated status is not information that must be transmitted to all jobs, but is information peculiar to each job; means for adding information indicating importance to the status response that must be transmitted to all jobs, or for adding information indicating peculiar status to the status response that may be transmitted to each job; and means for transmitting the status response to the host computer through a bidirectional interface.

According to another aspect of the present invention, there is provided a printer apparatus that analyzes output data received from a host computer to perform an output process, comprising: means that receives output data from the host computer to administrate one set of the output data as a unit of one job; means that analyzes a printer-language command described in the job to instruct an image forming and output process, a printer apparatus control process and a process of responding status to the host computer; means for performing printing out and control in accordance with the command to form and output an image and the apparatus control command; means for investigating the state of the printer apparatus and the state of a document output in accordance with the command for the status response issued to the host computer so as to issue status response data; means that supervises a state where each job data is received to measure time taken from interruption of the job data; means for forcibly stopping the job as job time out if the job data interrupts for a predetermined time; means having a structure that if job time out takes place, then a status response indicating generation of the job time out is issued; and means for transmitting the status response to the host computer through a bidirectional interface.

According to another aspect of the present invention, there is provided a printer apparatus that analyzes output data received from a host computer to perform an output process, comprising: means that receives output data from the host computer to administrate one set of the output data as a unit of one job; means that analyzes a printer-language command described in the job to instruct an image forming and output process, a printer apparatus control process and a process of responding status to the host computer; means for performing printing out and control in accordance with the command to form and output an image and the apparatus control command; means for investigating the state of the printer apparatus and the state of a document output in accordance with the command for the status response issued to the host computer so as to issue status response data; means that supervises a state where each job data is received to measure time taken from interruption of the job data; means that discriminates that job time out takes place if job data interrupts for a predetermined time, and that issues a status response for inquiring whether or not the job may be forcibly stopped; means that forcibly stops the job if a response permits the job time out process to be performed, and that continues the job if the response inhibits the job time out to be performed; and means for transmitting the status response to the host computer through a bidirectional interface.

According to another aspect of the present invention, there is provided a printer apparatus that analyzes output data received from a host computer to perform an output process, comprising: means that receives output data from the host computer to administrate one set of the output data as a unit of one job; means that analyzes a printer-language command described in the job to instruct an image forming and output process, a printer apparatus control process and a process of responding status to the host computer; means for performing printing out and control in accordance with the command to form and output an image and the apparatus control command; means for investigating the state of the printer apparatus and the state of a document output in accordance with the command for the status response issued to the host computer so as to issue status response data; means that supervises a state where each job data is received to measure time taken from interruption of the job data; means that discriminates that job time out takes place if job data interrupts for a predetermined time, and that issues a status response for alarming that the job will be forcibly stopped; means that continues the job if the host computer immediately transmits following job data, and that forcibly stops the job if the host computer does not transmit following job data; and means for transmitting the status response to the host computer through a bidirectional interface.

Other and further objects, features and advantages of the invention will be evident from the following detailed description of the preferred embodiments in conjunction with the attached drawings.

BRIEF DESCRIPTION OF THE DRAWINGS

FIG. 2 is a schematic view showing an improved status response process according to the first embodiment;

FIG. 3 is a flow chart showing the operation of a data-receipt administration portion of the printer apparatus according to the first embodiment;

FIG. 4 is a flow chart showing the operation of a command process in the printer apparatus according to the first embodiment;

FIG. 15 is a schematic view showing an improved status response process according to the fifth embodiment;

FIG. 39 is a flow chart showing the operation of a command process in a printer apparatus according to the eleventh embodiment of the present invention;

FIG. 40 is a flow chart showing the operation of a command process according to a twelfth embodiment of the present invention;

FIG. 41 is flow chart showing the operation of a command process according to a thirteenth embodiment of the present invention; and FIG. 42 is a schematic view showing an example of a job time out process.

DESCRIPTION OF THE PREFERRED EMBODIMENTS

First Embodiment

A first embodiment of the present invention will now be described with reference to the drawings.

Figure 1:
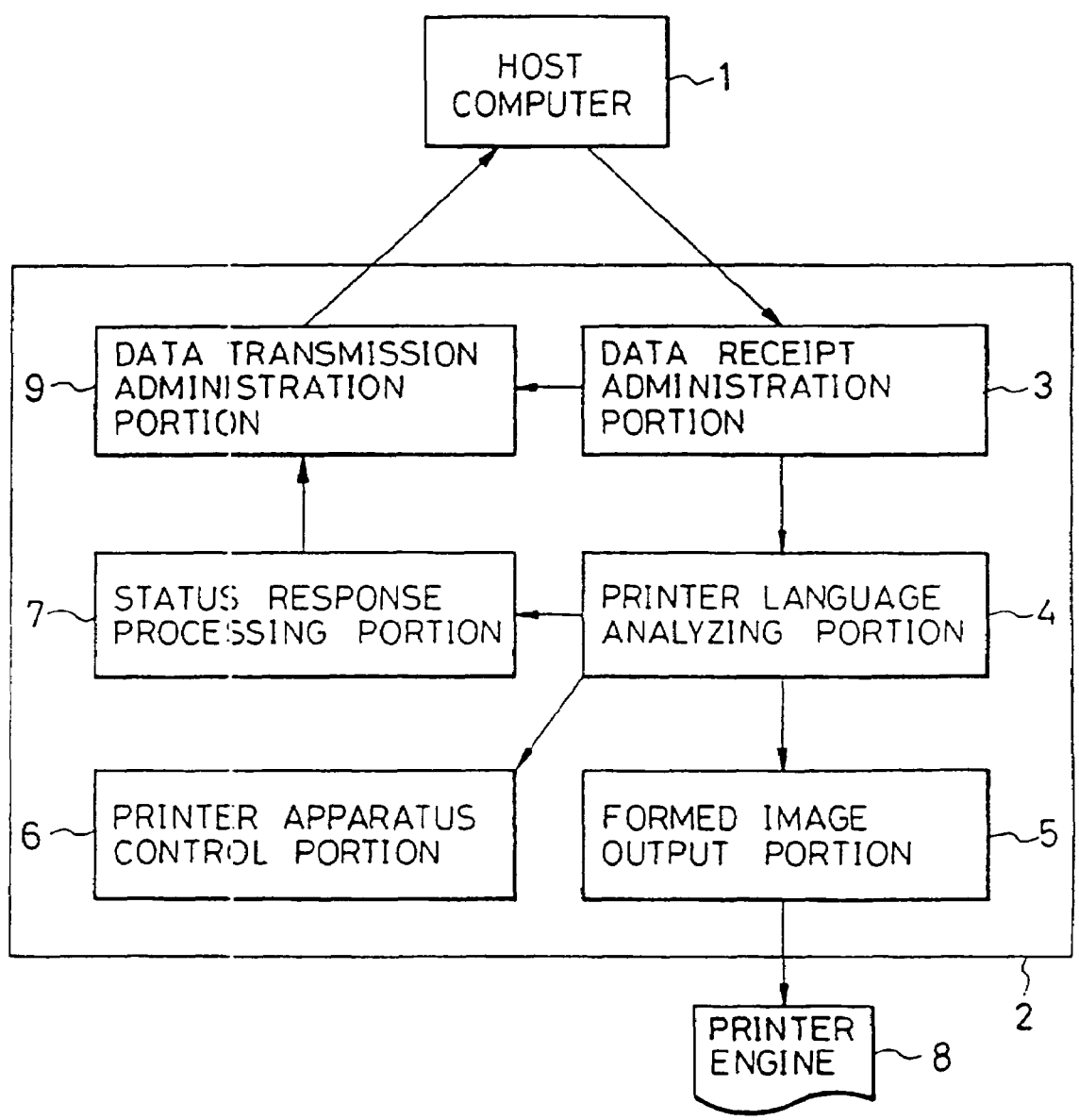
FIG. 1 is block diagram showing the structure of a page printer apparatus according to first and second embodiments of the present invention.

FIG. 1 is a block diagram showing the structure of a printer apparatus according to this embodiment.

In this embodiment, the description will be made about a page printer.

Referring to FIG. 1, reference numeral 1 represents a host computer, which generates output data, such as characters and graphics, and a variety of control commands, and which generates a command for the status response for recognizing a variety of information items of the printer apparatus, in order to input the foregoing data and commands to a printer apparatus 2 which is the main portion of an output apparatus.

The host computer 1 and the printer apparatus 2 are connected to each other through a bidirectional interface so that data can be transferred from the host computer 1 to the printer apparatus 2, and data can be returned from the printer apparatus 2 to the host computer 1.

In the printer apparatus 2, reference numeral 3 represents a data-receipt administration portion that receives data, such as characters and graphics, the various control commands and the command for the status response, which are supplied from the host computer 1, so as to administrate the data and commands. The data-receipt administration portion 3 has a receiving buffer for receiving and temporarily storing data from the host computer 1.

When the data-receipt administration portion 3 receives data or a control command or a command for the status response from the host computer 1, the data-receipt administration portion 3 automatically assigns administration ID to each command.

The administration ID acts to distinguish a command from another command and is, for example, a number given in accordance with the sequential order of command receipt or individual characters. Even if the contents of the commands are the same, all administration IDs must be different from one another. The administration ID assigned to each command is, as command administration ID information, added to each command of received data, and administration of the commands is performed.

Simultaneously, the data-receipt administration portion 3 immediately returns, to the host computer 1, the command administration ID information through a bidirectional interface.

The command administration ID information is immediately returned in the sequential order of the command receipt.

Reference numeral 4 represents a printer-language analyzing portion that analyzes the detailed contents of a command, and that instructs the corresponding control to be performed in accordance with the contents of the command.

The printer-language analyzing portion 4 sequentially receives the commands stored in the data-receipt administration portion 3, and investigates the contents of the commands in accordance with the description rule of the printer language so as to discriminate what process is demanded to be performed.

If a result of the discrimination indicates a command for forming characters, graphics or images, the printer language analyzing portion 4 commands an image-forming and output portion 5 to form and output an image.

If the result indicates a command for controlling the printer apparatus 2, the printer-language analyzing portion 4 commands a printer-apparatus control portion 6 to perform a corresponding control.

If the result requires a status response, the printer language analyzing portion 4 issues, to a status-response processing portion 7, a command for a status response.

Reference numeral 5 represents the image-forming and output portion that forms and develops characters or images, to be printed out from the printer apparatus 2, so as to output the formed and developed characters or images.

In the image-forming and output portion 5, a corresponding character pattern is formed, or a graphic is calculated or formed, or image data is developed in accordance with the image-forming and output command from the printer language analyzing portion 4, and transmits, to the printer engine 8, the developed data to be output.

The printer engine 8 is an apparatus, such as a laser beam printer engine, that uses a procedure of an electrophotographic method or the like to perform a printing out process in accordance with the developed image received from the image-forming and output portion 5.

Reference numeral 6 represents the printer-apparatus control portion that controls and administrates the printer apparatus 2, such that it selects paper to be used and initializes the printer apparatus 2, in accordance with the printer-apparatus control command from the printer-language analyzing portion 4.

Reference numeral 7 represents a status-response processing portion that investigates the corresponding environment of the printer apparatus 2 in accordance with the command for the status response from the printer-language analyzing portion 4.

A variety of contents are investigated, for example, information about various fonts, contents of image forming functions, whether or not data can be received, the status of the printer apparatus 2 and the state of progress of the printing out process.

The status-response processing portion 7 investigates the various environments of the printer apparatus 2 so as to prepare status response information, which indicates the contents of the investigated environment, the status response information being formed into a character string or the like.

At this time, the printer apparatus 2 adds, to the response information, administration ID information, assigned by the data-receipt administration portion 3 to the command for the status response, which has caused the foregoing response.

Then, the status response information is transmitted to a data-transmission administration portion 9.

When the data-transmission administration portion 9 has received the status response information returned from the status-response processing portion 7, the data-transmission administration portion 9 temporarily stores it in a transmitting buffer or the like to return a status response, to which the administration ID has been added, to the host computer 1 at proper timing for the bidirectional interface.

Figure 7:
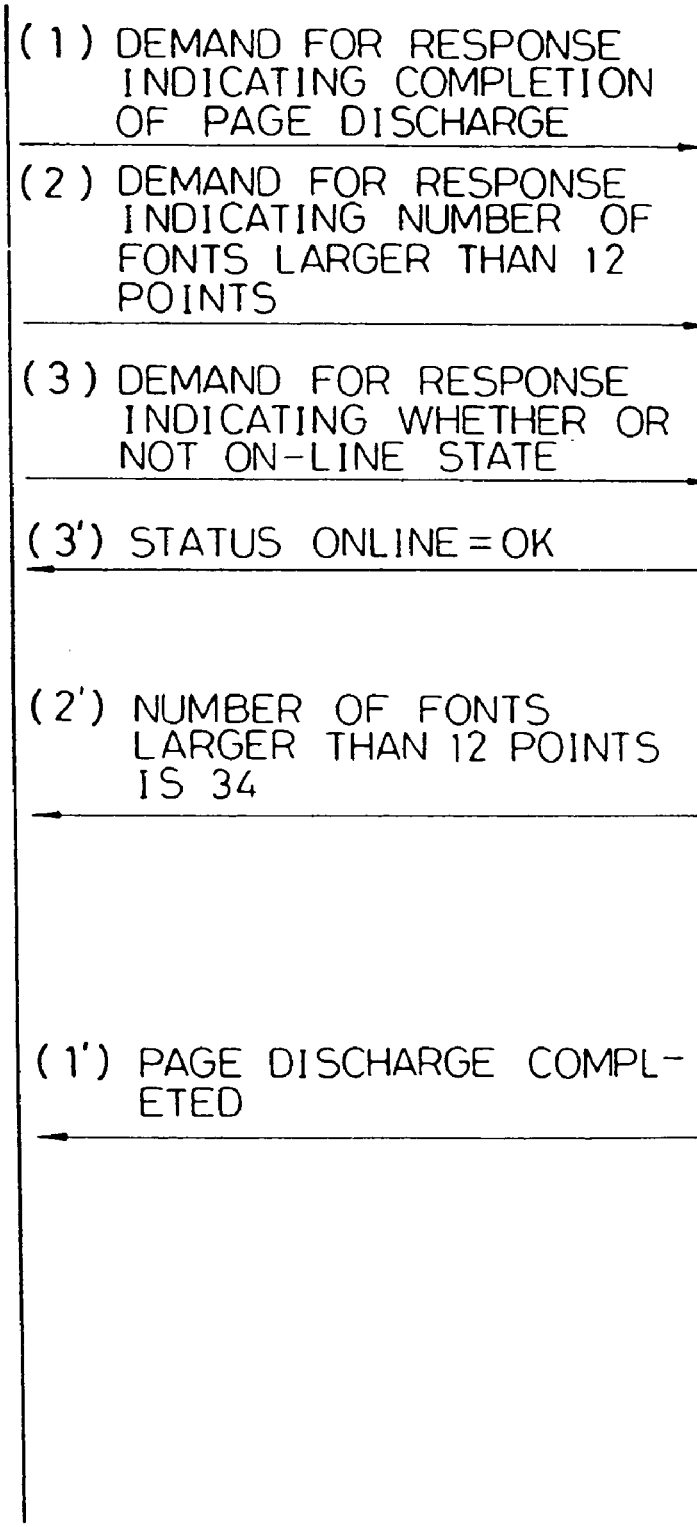
FIG. 7 is a schematic view showing an example of a conventional status response process.
Figure 8:
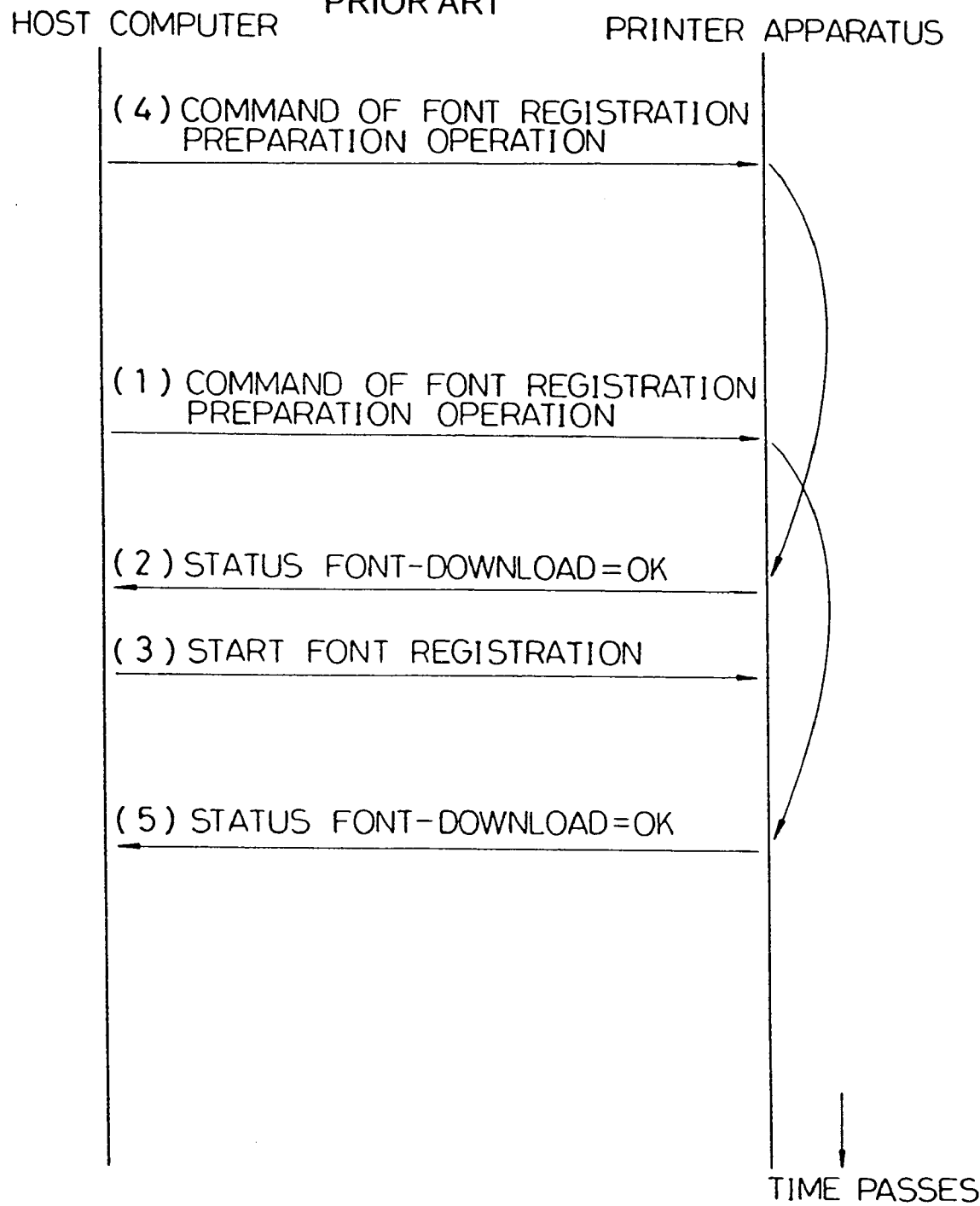
FIG. 8 is a schematic view showing an example of the conventional status response process.

FIG. 2 shows an example of the status response performed in a case where the demand and response sequence shown in FIG. 7 is performed in the system according to this embodiment. An assumption is made here that the host computer 1 has issued, to the printer apparatus 2, commands for the status response, such as (1) "notify discharge of the page, which is being printed", (2) "send information about the number of fonts among the fonts included in the printer apparatus 2 that are larger than 12 points", and (3) send information whether or not the printer apparatus 2 is able to receive data at present, the foregoing commands for the status response being sequentially issued in the foregoing order and included in document output data.

When the printer apparatus 2 according to this embodiment has received the foregoing commands for the status response, the data-receipt administration portion 3 immediately and sequentially assigns received command administration IDs.

The data-receipt administration portion 3 administrates the commands in the form in which the assigned administration ID information is added to the command.

Assumptions are made that the administration command ID assigned to the command (1) is "1339", that assigned to the command (2) is "1340" and that assigned to the command (3) is "1341".

As described above, the status responses cannot always be returned in the sequential order of the commands for status response depending upon the state of the printer apparatus 2 or the contents of the response. An assumption is made here that the status response corresponding to the command (3) could be immediately returned to the host computer 1 (response (3')).

At this time, the data-transmission administration portion 9 returns, to the host computer 1, information in the form in which the administration ID information assigned to the command is added to ordinary status response information.

For example, the administration ID information "1341" assigned to the received command for the status response is, as exemplified in response (3'), added in front of the response data which will be then returned.

When retrieval of the fonts (command (2)) has been completed, the status response is, in the form in response (2'), returned to the host computer 1.

After discharge of the page has been completed finally, the status response corresponding to command (1) is, in the form of response (1'), returned.

The host computer 1, that receives the status response, stores the administration ID returned by the printer apparatus 2 while being automatically assigned to the command for the status response issued by the host computer 1.

For example, the host computer 1 stores, as the ID of the command (3), the command administration ID "1331", which has been immediately returned from the printer apparatus 2 when the host computer 1 has issued the command (3).

When the status response has been returned from the printer apparatus 2, the command administration ID added to the status response is checked, and a corresponding command administration ID stored in the host computer 1 is searched for.

As shown in FIG. 2, information of the administration ID "1341", to which the command is assigned, is added to the response (3').

In the viewpoint of the sequential order of issuing commands, responses (2') and (1') can be returned prior to the response (3). However, a discrimination can be made that the response made first is not the response to command (1) or command (2), but is the response to the command (3) in accordance with the added command administration ID information.

Thus, addition of information of the administration ID assigned to the command to the conventional status response to be returned enables correspondence between status responses and the commands for status response to be estimated.

Although this embodiment has been described about the structure in which the serial No. type ID is used as the administration ID information, the type of the ID is not limited.

The present invention is not limited to the type of the command administration ID so far as the printer apparatus is able to make presentation of the ID to the host computer.

The administration of the assignment of the administration ID to each command, which is performed by the data-receipt administration portion 3, may be performed for only the command to which the status response is made or may be performed for all commands in order to simplify checking of the commands.

If administration ID information for identifying the command for a status response can be added to the status response when the status response is returned, the type of the data administration is not limited.

FIG. 3 is a flow chart of the operation of the printer apparatus 2 according to this embodiment which illustrates a process in which the data-receipt administration portion 3 receives data from the host computer 1 to administrate the data.

Initially, the data-receipt administration portion 3 receives, from the host computer 1, data codes indicating commands for forming an image, for control and for status response (step S301).

The data-receipt administration portion 3 supervises the transmitted data codes, discriminates the end of one command, and stores each command in the receiving buffer (step S302).

A command administration ID is assigned to each of the thus-received commands (step S303).

Then, the command administration, assigned in step S303, is immediately returned to the host computer 1 through the bidirectional interface (step S304).

The data codes are administrated in command units, and the data codes are, together with the command administration ID, temporarily stored in the receiving buffer so as to administrate them (step S305).

When receipt of one command has been completed, the operation returns to step S301, in which a next command is received and a similar process is repeated.

As a result of a sequence of the processes above, the commands transmitted from the host computer 1 are, together with the command administration ID information, stored and administrated by the data-receipt administration portion 3.

The foregoing sequential processes are performed immediately after a command has been issued from the host computer 1. Since the foregoing sequential processes are frequently performed individually from other processes by a multitask method or the like, the processes are free from influences of, for example, a state where other processes are performed. Therefore, the commands can immediately be administrated in the sequential order of the command receipt.

FIG. 4 is a flow chart of a process in which the printer language analyzing portion 4 processes data in command units and performs image forming, control and status response processes.

Initially, the printer-language analyzing portion 4 periodically supervises the receiving buffer and waits for supply of data in command units by the operation of the data receipt administration portion 3 as illustrated in the flow chart shown in FIG. 3. When data has been detected, the data is received in command units (step S401).

Then, the type of the commanded processes is discriminated (step S402). If the image forming control has been commanded, the printer-language analyzing portion 4 transmits the foregoing command to the image-forming and output portion 5 so that a process for forming and developing an image, such as corresponding characters, graphics or images, is performed, thus causing printing to be performed (step 5403).

If the command is a command to control the printer apparatus 2, the printer-language analyzing portion 4 transmits the command to the printer-apparatus control portion 6 so that the printer apparatus 2 is controlled as commanded (step S404).

If the command is a command for the status response, the printer-language analyzing portion 4 transmits the foregoing command to the status-response processing portion 7. Thus, the status-response processing portion 7 investigates the corresponding environments of the printer apparatus 2 (step S405).

The foregoing investigation cannot immediately be performed sometimes because a large quantity of information must be searched or the state of the printer apparatus 2 has been changed or due to the timing of the operation. In the foregoing case, all processes are not interrupted, but the employed multitask method enables the foregoing investigation to be performed simultaneously with performing the other data process. Then, completion of the investigation is waited for.

After the investigation has been completed, a result of the investigation is converted into status-response data format information, such as a character string or the like. At this time, the printer apparatus 2 adds the command ID assigned to the command for the status response to information about the investigation so that response data in the form of a character string or the like in the status response data format is prepared (step S406).

The status response data in the form, in which the command administration ID is added, is sent to the data transmission administration portion 9 so as to be temporarily stored in the transmitting buffer or the like, followed by being returned to the host computer 1 at the timing of the bidirectional interface (step S407).

The printer-language analyzing portion 4 receives a next command from the receiving buffer, analyzes the same and repeats the foregoing process.

As a result of the foregoing process, the host computer 1 issues a command for a status response. When the host computer 1 receives a status response corresponding to the command therefrom, the host computer 1 is able to recognize the command administration ID previously assigned to the command for the status response and stored in the printer apparatus 2. Furthermore, a reference to the command administration ID of the command for the status response can be made as the information of the returned status response. Therefore, even if the status responses are not returned out of the sequential order, or even if a long time has undesirably taken to return the status response, the correspondence between the returned status response and the command for the status response can easily be discriminated. Thus, the state of the printer apparatus can reliably be detected by the host computer 1.

Figure 17:
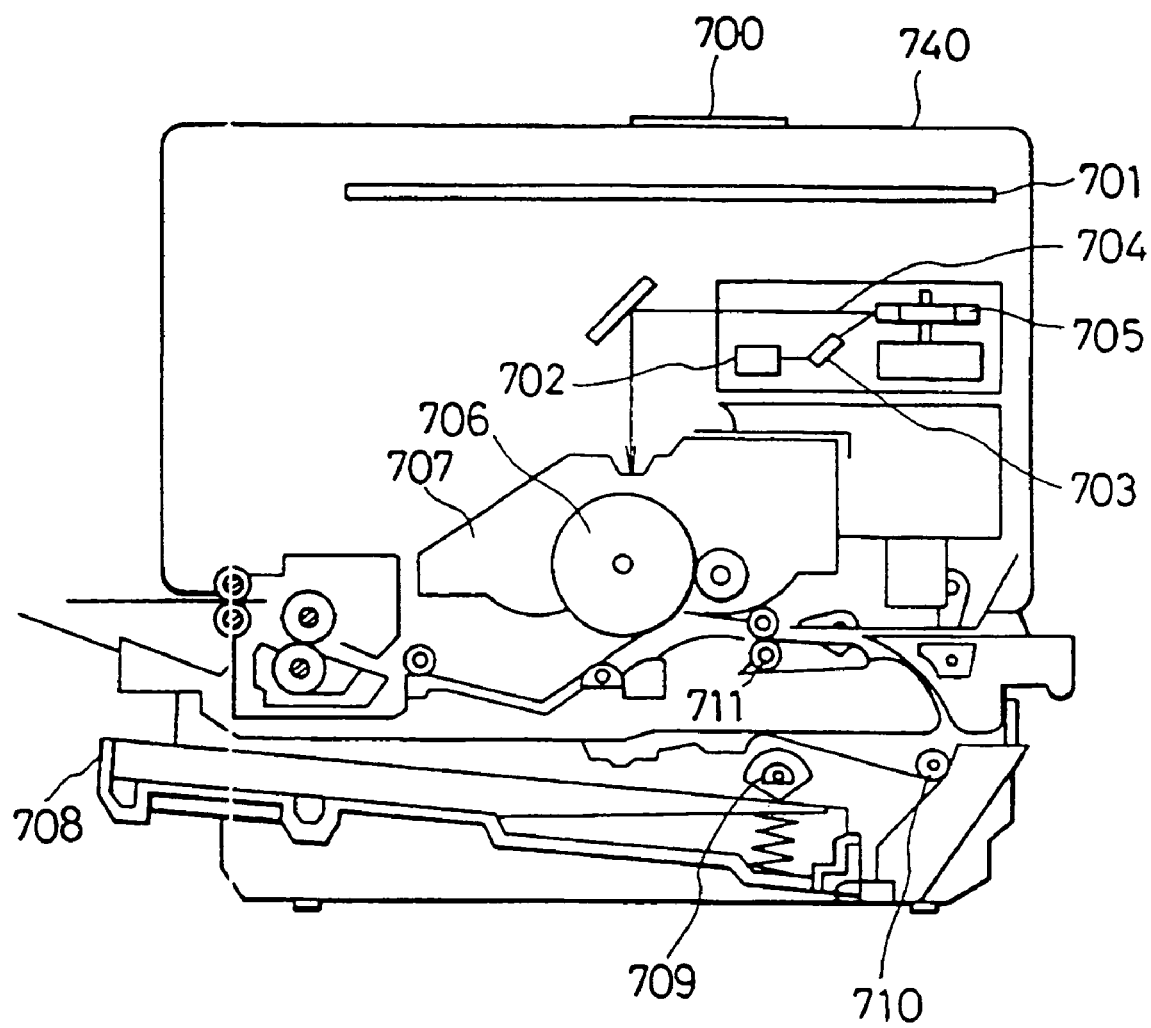
FIG. 17 is a cross sectional view showing a laser beam printer.

FIG. 17 is a diagram of the structure of a laser beam printer for use as the printer engine 8 of this embodiment.

Referring to FIG. 17, reference numeral 740 represents a body of a laser beam printer (LBP) that forms an image on recording paper, serving as a recording medium, in accordance with a supplied character pattern or the like. Reference numeral 700 represents an operation panel having operation switches and LED display units disposed thereon. Reference numeral 701 represents a printer control unit for totally controlling the LBP 740 and for analyzing character pattern information or the like. The printer control unit 701 mainly converts character pattern information into a video signal to transmit the video signal to a laser driver 702.

The laser driver 702 is a circuit for operating a semiconductor laser beam unit 703 that, in response to the supplied video signal, turns on/off a laser beam 704 emitted by the semiconductor laser beam unit 703. The laser beam 704 is swung laterally by a rotational polygonal mirror 705 to scan the surface of an electrostatic drum 706. As a result, an electrostatic latent image of the character pattern is formed on the electrostatic drum 706. The latent image is developed by a developing unit 707 disposed around the electrostatic drum 706, followed by being transferred onto the recording paper. The recording paper is cut sheets that are accommodated in a paper cassette 708 loaded in the LBP 740 so as to be introduced into the body of the LBP 740 by a paper feeding roller 709 and conveyance rollers 710 and 711, followed by being supplied to the electrostatic drum 706.

Although the printer engine according to this embodiment is the laser beam printer, the present invention is not limited to this. The present invention can be applied to, for example, an ink jet printer as will now be described.

<Schematic Structure of the Apparatus Body>

Figure 18:
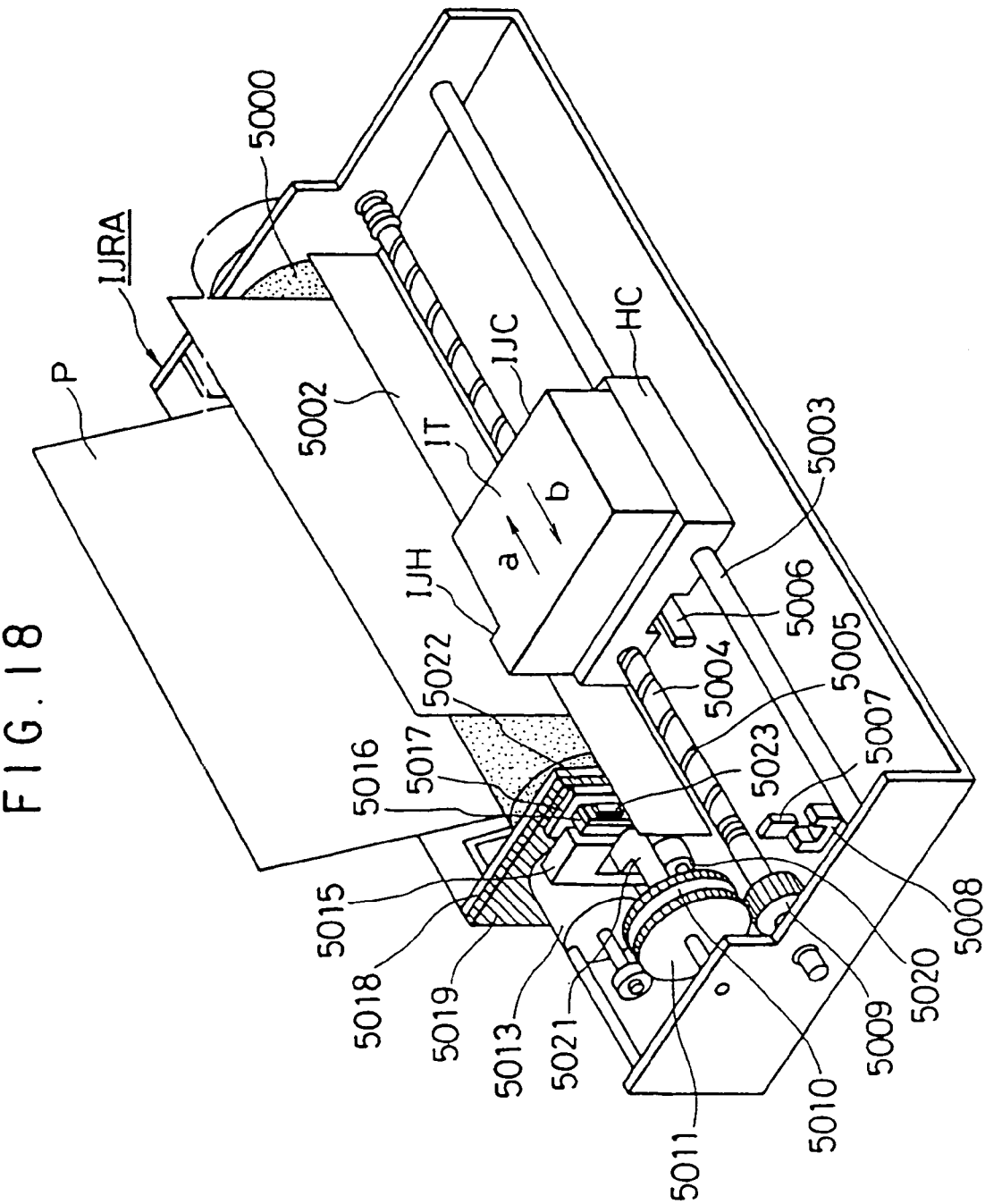
FIG. 18 is a diagram showing an ink jet printer.

FIG. 18 is a schematic view of an ink jet recording apparatus IJRA to which the present invention can be applied. Referring to FIG. 18, a carriage HC, that are engaged to a spiral groove 5004 of a lead screw 5005, which is, through 10 power transmission gears 5011 and 5009, rotated in synchronization with a drive motor 5013, has a pin (not shown) so as to be reciprocated in directions indicated by arrows a and b. The carriage HC has an ink jet cartridge IJC mounted thereon. Reference numeral 5002 represents a paper-retaining plate for pressing paper against a platen 5000 in the direction in which the carriage HC is moved. Reference numerals 5007 and 5008 represent photocouplers that are home-position detection means that detects presence of a lever 5006 of the carriage HC in the foregoing region to, for example, switch the rotational direction of a motor 5013. Reference numeral 5016 represents a member for supporting a capping member 5022 for capping the front surface of a recording head. Reference numeral 5015 represents a sucking means for sucking the inside of the cap member 5022 so that the recording head is recovered by sucking the inside of the capping member 5022 through an opening 5023 in the capping member 5022. Reference numeral 5017 represents a cleaning blade, and 5019 represents a member enabling the cleaning blade 5017 to be moved back and forth. The cleaning blade 5017 and the member 5019 are supported by a support plate 5018 of the body of the ink jet recording apparatus IJRA. As a matter of course, the cleaning blade 5017 is not limited to the foregoing blade, but a known cleaning blade may be used in this embodiment. Reference numeral 5021 represents a lever for starting recovering operation by sucking the inside of the capping member 5022. When a cam 5020, that engages to the carriage HC, is moved, the lever 5021 is moved, causing the rotation force of the drive motor 5013 to be transmitted through a known transmission means, such as a clutch and so forth. The capping, cleaning and suction recovery operations are arranged to be performed at corresponding positions due to the operation of the lead screw 5005 when the carriage HC has been moved to the home-position portion. However, any arrangement may be employed in the present invention so far as the foregoing operations are performed at predetermined timings.

Second Embodiment

A second embodiment of the present invention will now be described with reference to the drawings. In this embodiment, the command administration IDs are not automatically assigned by the data-receipt administration portion 3, but the commands are administrated by using command administration IDs sent from the host computer 1 together with the various commands and specified by the host computer 1.

Figure 5:
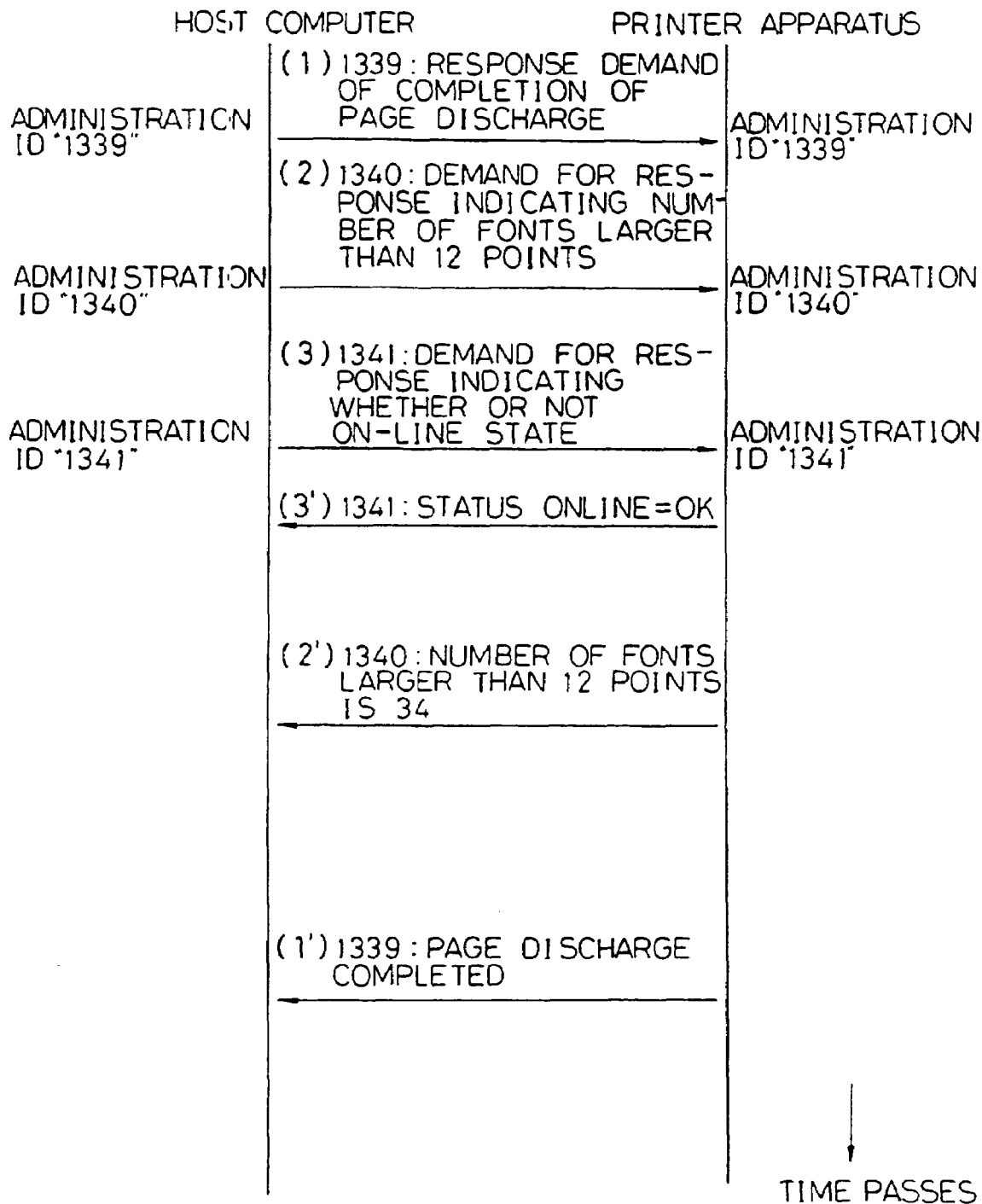
FIG. 5 is a schematic view showing an improved status response process according to the second embodiment.

The flow of the operations of this embodiment will now be described with reference to FIG. 5.

In the second embodiment, the host computer 1 adds administration ID for identifying the commands to each command when the host computer 1 issues a command.

The administration ID may be added to all commands or the same may be added to only the command that requires a status response.

Even if the type of the commands are the same, the administration IDs must be individual IDs. When the data receipt administration portion 3 has received various commands and command administration IDs assigned to the commands, the data-receipt administration portion 3 stores them in command units, and administrates them while adding the sent command administration IDs.

The data-receipt administration portion 3 does not assign the command administration IDs.

The following process is the same as that according to the first embodiment.

That is, the command administration IDs added to the status responses are not assigned by the printer apparatus 2, but are assigned by the host computer 1.

Figure 6:
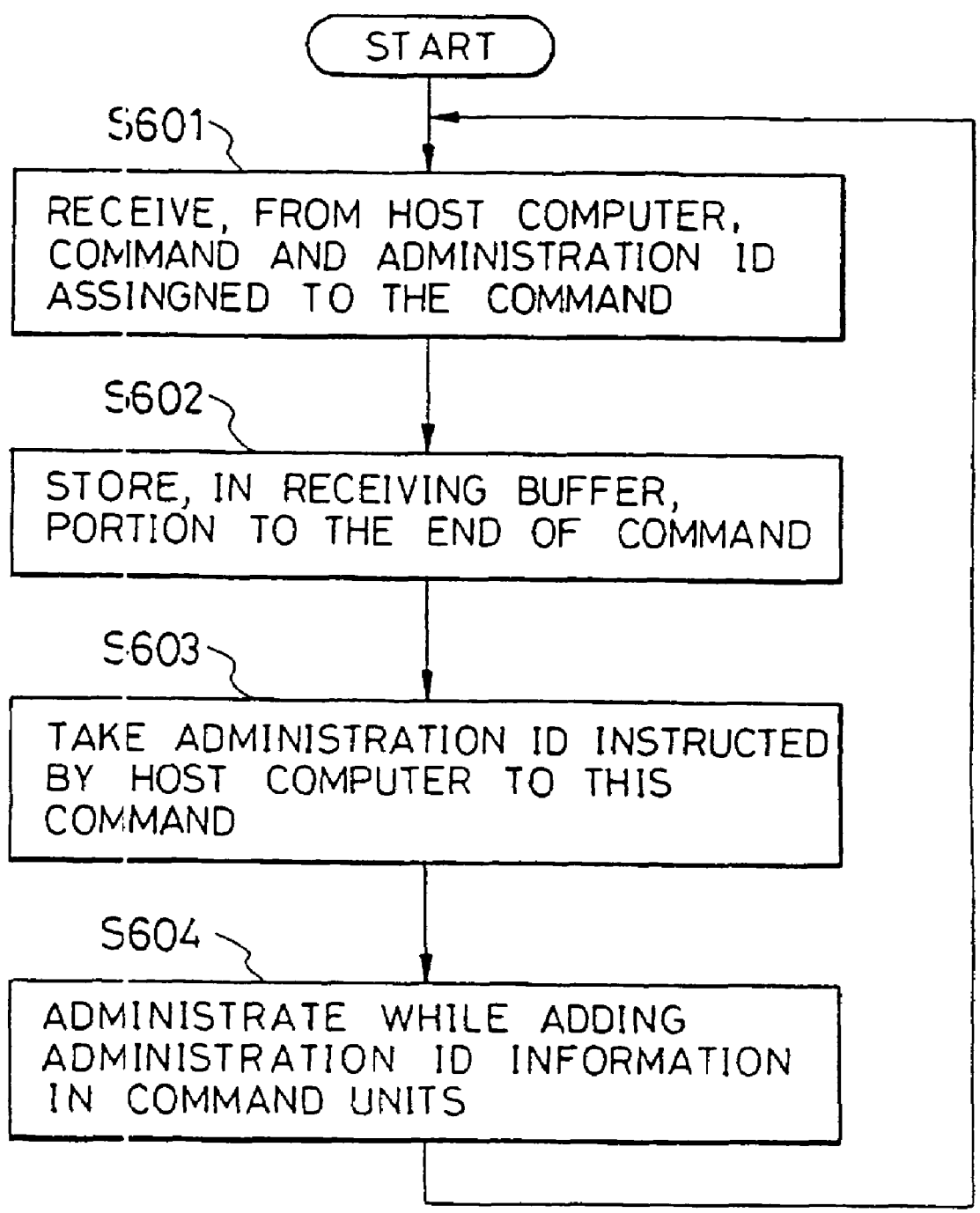
FIG. 6 is a flow chart showing the operation of a data-receipt administration portion according to the second embodiment.

FIG. 6 is a flow chart of the operation of the data-receipt administration portion 3 according to this embodiment.

Initially, commands for forming images and performing controls and requiring status responses, and data codes, such as the administration IDs assigned to the commands by the host computer 1 supplied from the host computer 1 are received by the data-receipt administration portion 3 (step S601).

The data-receipt administration portion 3 supervises the supplied data codes, and discriminates the end of one command to store the command in the receiving buffer (step S602).

Furthermore, the data-receipt administration portion 3 takes the command administration ID specified to the command by the host computer 1 (step S603).

The data codes are administrated in command units such that the data codes are, together with the command administration IDs taken in step S603, temporarily stored and administrated in a region in the receiving buffer or the like (step S604).

When receipt of one command has been completed, the operation returns to step S601 so that a next command is received, and a similar process is repeated.

As a result of the foregoing process, when the host computer issues a command for the status response and receives the status response corresponding to the command, the command administration ID for identifying the command for the status response, which has been previously specified by the host computer enables the host computer to refer to the command administration ID information of the specified command for the status response as the information of the returned status response. Therefore, even if the status responses are not returned out of the sequential order, or even if a long time has undesirably been taken to return the status response, the correspondence between the returned status response and the command for the status response can easily be discriminated. Thus, the state of the printer apparatus can reliably be detected by the host computer.

Third Embodiment

A third embodiment of the present invention will now be described with reference to the drawings.

Figure 9:
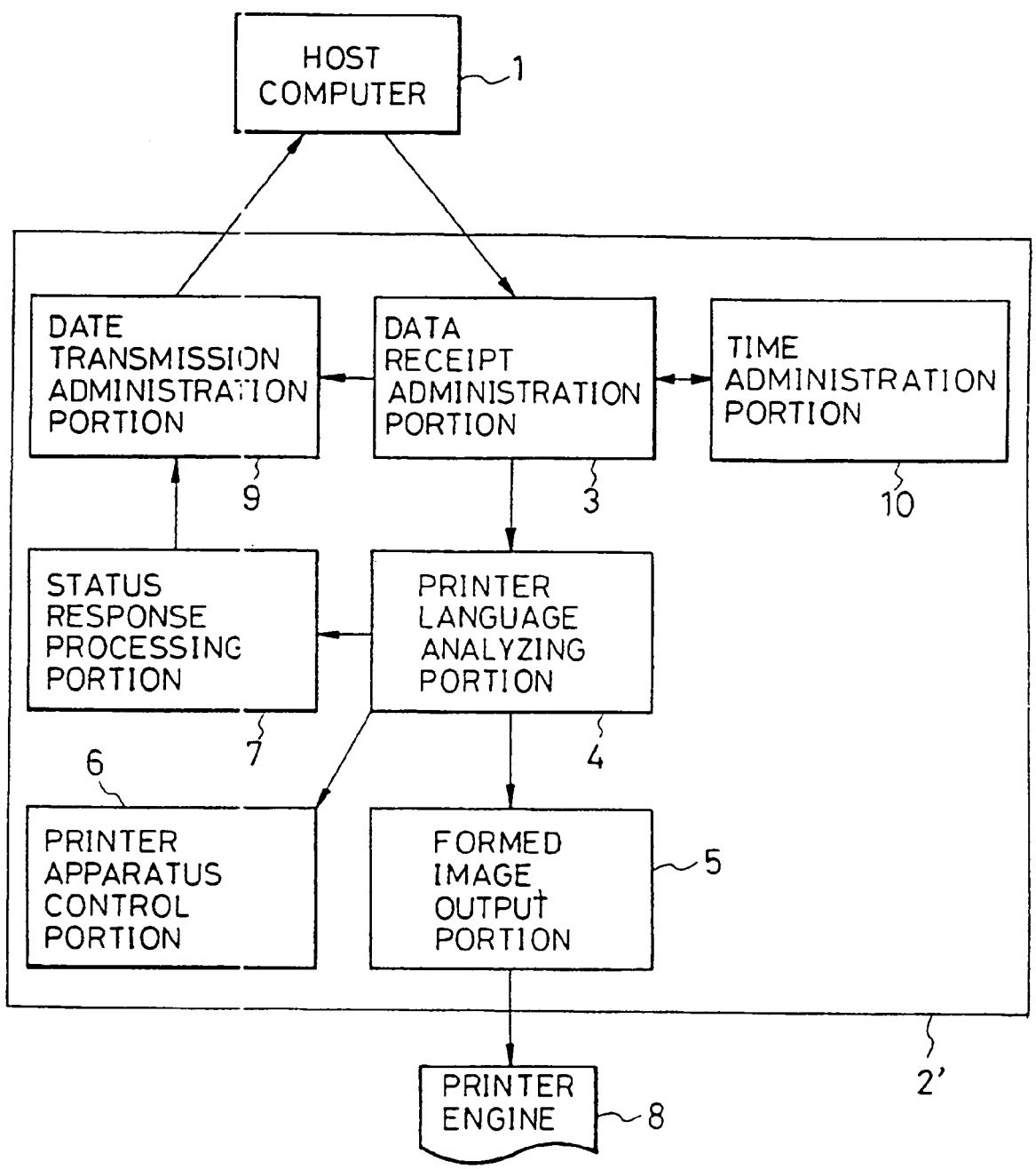
FIG. 9 is a block diagram showing the structure of a page printer apparatus according to third, fourth and fifth embodiments of the present invention.

FIG. 9 is a block diagram showing the structure of a printer apparatus according to this embodiment.

In this embodiment, a page printer is described.

Referring to FIG. 9, reference numeral 1 represents a host computer, which generates output data, such as characters and graphics, and a variety of control commands, and which generates a command for the status response for recognizing a variety of information items of a printer apparatus 2', in order to input the foregoing data and commands to the printer apparatus 2' which is the main portion of an output apparatus.

The host computer 1 and the printer apparatus 2' are connected to each other through a bidirectional interface so that data can be transferred from the host computer 1 to the printer apparatus 2', and data can be returned from the printer apparatus 2' to the host computer 1.

In the printer apparatus 2', reference numeral 3 represents a data-receipt administration portion that receives output data, such as characters and graphics, the various control commands and the command for the status response, which are supplied from the host computer 1, so as to administrate the data and commands.

The data-receipt administration portion 3 has a receiving buffer for receiving and temporarily storing data from the host computer 1.

Reference numeral 10 represents a timer administration portion for administrating the time in the printer apparatus 2'. The timer administration portion 10 has a clock that counts the time to recognize time passing in the inside of the printer apparatus 2'. The clock is administrated with a usual time, for example, the standard time to count the same times as that outside the printer apparatus 2'.

When the data-receipt administration portion 3 receives data, various control commands or commands for the status response from the host computer 1, the data-receipt administration portion 3 demands the timer administration portion 10 to notify the present time simultaneously with the receipt of the data or commands.

The present time received from the timer administration portion 10 is added to each command of the received data to administrate the time as the received time information.

Reference numeral 4 represents a printer-language analyzing portion that analyzes the detailed contents of the command, and that instructs the corresponding control to be performed in accordance with the contents of the command.

The printer-language analyzing portion 4 sequentially receives the commands stored in the data-receipt administration portion 3, and investigates the contents of the commands in accordance with the description rule of the printer language so as to discriminate what process is demanded to be performed.

If a result of the discrimination indicates a command for forming characters, graphics or images, the printer-language analyzing portion 4 commands an image-forming and output portion 5 to form and output an image.

If the result indicates a command for controlling the printer apparatus 2', the printer-language analyzing portion 4 commands a printer-apparatus control portion 6 to perform a corresponding control.

If the result indicates a certain status response, the printer-language analyzing portion 4 issues, to a status-response processing portion 7, a command for a status response.

Reference numeral 5 represents an image-forming and output portion that forms and develops characters or images, to be printed out from the printer apparatus 2', so as to output the formed and developed characters or images.

In the image-forming and output portion 5, a corresponding character pattern is formed, or a graphic is calculated or formed, or image data is developed in accordance with the image-forming and output command from the printer-language analyzing portion 4, and transmits, to the printer engine 8, the developed data to be output.

The printer engine 8 is an apparatus, such as a laser beam printer engine, that uses a procedure of an electrophotographic method or the like to perform a printing out process in accordance with the developed image received from the image-forming and output portion 5.

Reference numeral 6 represents the printer-apparatus control portion that controls and administrates the printer apparatus 2', such that it selects paper to be used and initializes the printer apparatus 2', in accordance with the printer-apparatus control command from the printer-language analyzing portion 4.

Reference numeral 7 represents a status-response processing portion that investigates the corresponding environment of the printer apparatus 2' in accordance with the command for the status response from the printer-language analyzing portion 4.

A variety of contents are investigated, for example, information about various fonts, contents of image forming functions, whether or not data can be received, the status of the printer apparatus 2' and the state of progress of the printing output process.

The status-response processing portion 7 investigates the various environments of the printer apparatus 2' so as to prepare status response information, which indicates the contents of the investigated environment, the status response information being formed into a character string or the like.

At this time, the printer apparatus 2' adds, to the response information, information about the time, at which the command for the status response has been sent from the host computer 1.

Then, the status response information is transmitted to a data-transmission administration portion 9.

When the data-transmission administration portion 9 has received the status response information returned from the status-response processing portion 7, the data-transmission administration portion 9 temporarily stores it in a transmitting buffer or the like to return a status response, to which the time information has been added, to the host computer 1 at proper timing for the bidirectional interface.

Figure 10:
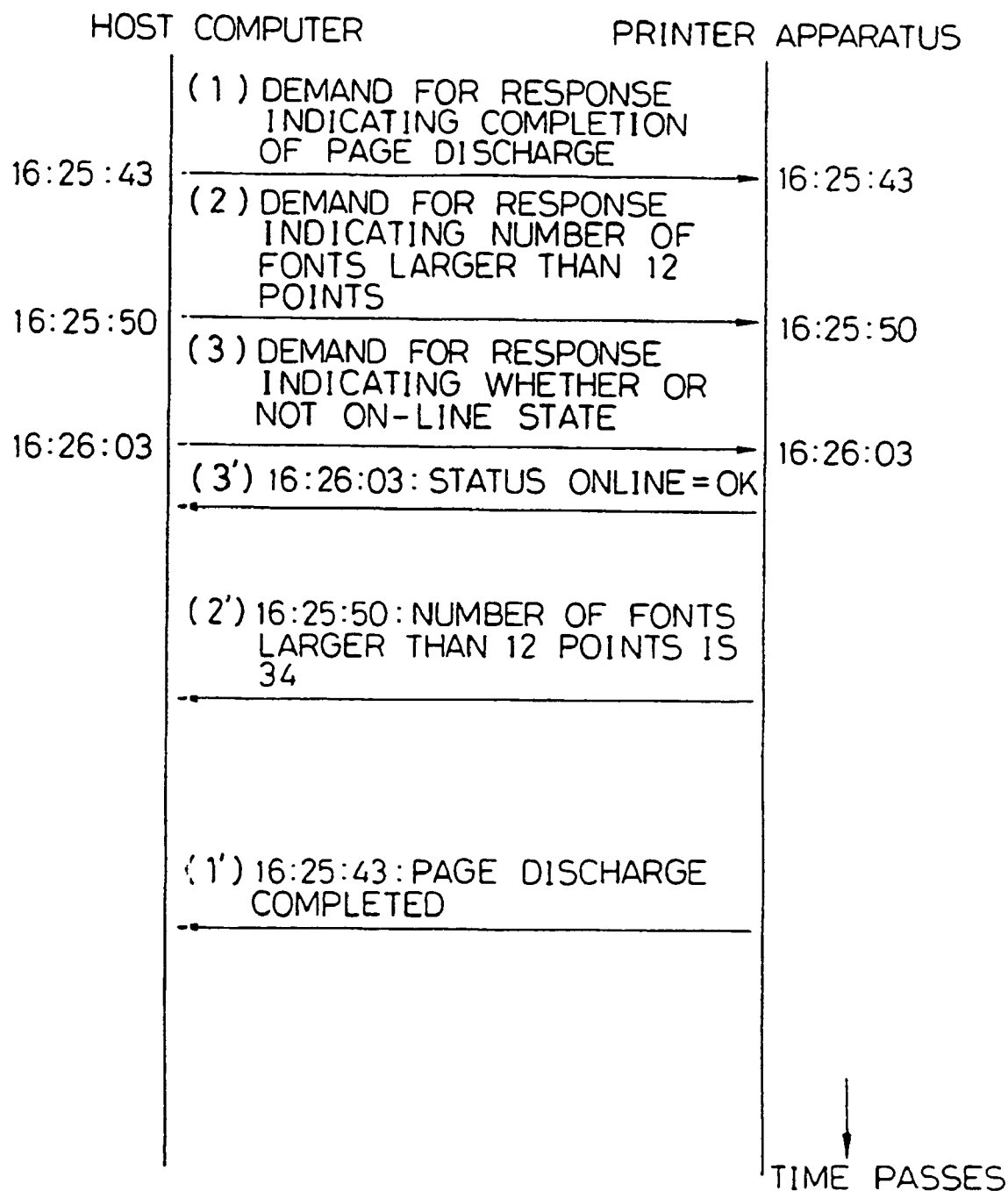
FIG. 10 is a schematic view showing an improved status response process according to the third embodiment.

FIG. 10 shows an example of the status response which is performed to correspond to the sequence shown in FIG. 7 in the system according to this embodiment.

An assumption is made here that the host computer 1 has issued, to the printer apparatus 2', commands for the status response, such as (1) "notify discharge of the page, which is being printed", (2) "send information about the number of fonts among the fonts included in the printer apparatus 2' that are larger than 12 points", and (3) send information whether or not the printer apparatus 2' is able to receive data at present, the foregoing commands for the status response being sequentially issued in the foregoing order and included in document output data.

When the printer apparatus 2' according to this embodiment has received the foregoing commands for the status response, the data-receipt administration portion 3 demands the timer administration portion 10 to transmit time information. The data-receipt administration portion 3 administrates each command while adding the time information to the command.

Assumptions are made that the time at which the command (1) has been received is "16:25:43", the time at which the command (2) has been received is "16:25:50" and the time at which the command (3) has been received is "16:26:03".

As described above, the status responses cannot always be returned in the sequential order of the commands for status response depending upon the state of the printer apparatus 2' or the contents of the response.

An assumption is made here that the status response corresponding to the command (3) could be immediately returned to the host computer 1 (response 3').

At this time, the data-transmission administration portion 9 returns, to the host computer 1, information in the form in which information of the time at which each command has been received is added to ordinary status response information items.

For example, time "16:26:03", at which the command for the status response has been received, is, as exemplified in (response 3'), added in front of the response data which will be then returned.

When retrieval of the fonts in command (2) has been completed, the status response is, in the form in response (2'), returned to the host computer 1.

After discharge of the page has been completed, the status response corresponding to command (1) is, in the form in response (1'), returned. The host computer 1, that receives the status response, stores, for example, the time at which the host computer 1 has issued the command for the status response.

For example, the host computer 1 stores that the time, at which the command (3) has been issued, is "16:26:03".

When the status response has been returned from the printer apparatus 2', the added command receipt time information in the printer apparatus 2' is checked, and a corresponding command issuing time stored in the host computer 1 is searched for.

Information, that is, time "16:26:03", at which the command has been received by the printer apparatus 2', is added to the response (3') as illustrated.

In the viewpoint of the sequential order of issuing commands, responses (2') and (1') can be returned prior to the response (3).

However, a discrimination can be made that the response made first is not the response to command (1) or command (2) but is the response to the command (3) in accordance with the added receipt time information.

Thus, addition of information of the time, at which the command has been received, to the conventional status response to be returned enables correspondence between status responses and the commands for status response to be estimated.

Although this embodiment has been described about the example in which the minimum unit of time information is made to be in unit of seconds, a further fine or rough unit may be employed. Furthermore, the format of "hour: minute: second" is not limited to this. For example, "hour" and "minute" are not used, but only "second" may be employed.

Furthermore, the reference time for the time information may be any reference time.

The standard time for each country, such as the Japanese Standard Time, may be employed, or time administrated peculiarly by the subject computer system may be used as the reference time.

The present invention is not limited to the type of the time, at which the printer apparatus has received a command, so far as the printer apparatus is able to make presentation of the foregoing time to the host computer.

The administration of the receipt time information for each command, which is performed by the data-receipt administration portion 3, may be performed for only the command to which the status response is made or may be performed for all commands in order to simplify checking of the commands.

If the time, at which the command for the status response has been received, can be added to the status response when the status response is returned, the type of the data administration is not limited.

Figure 11:
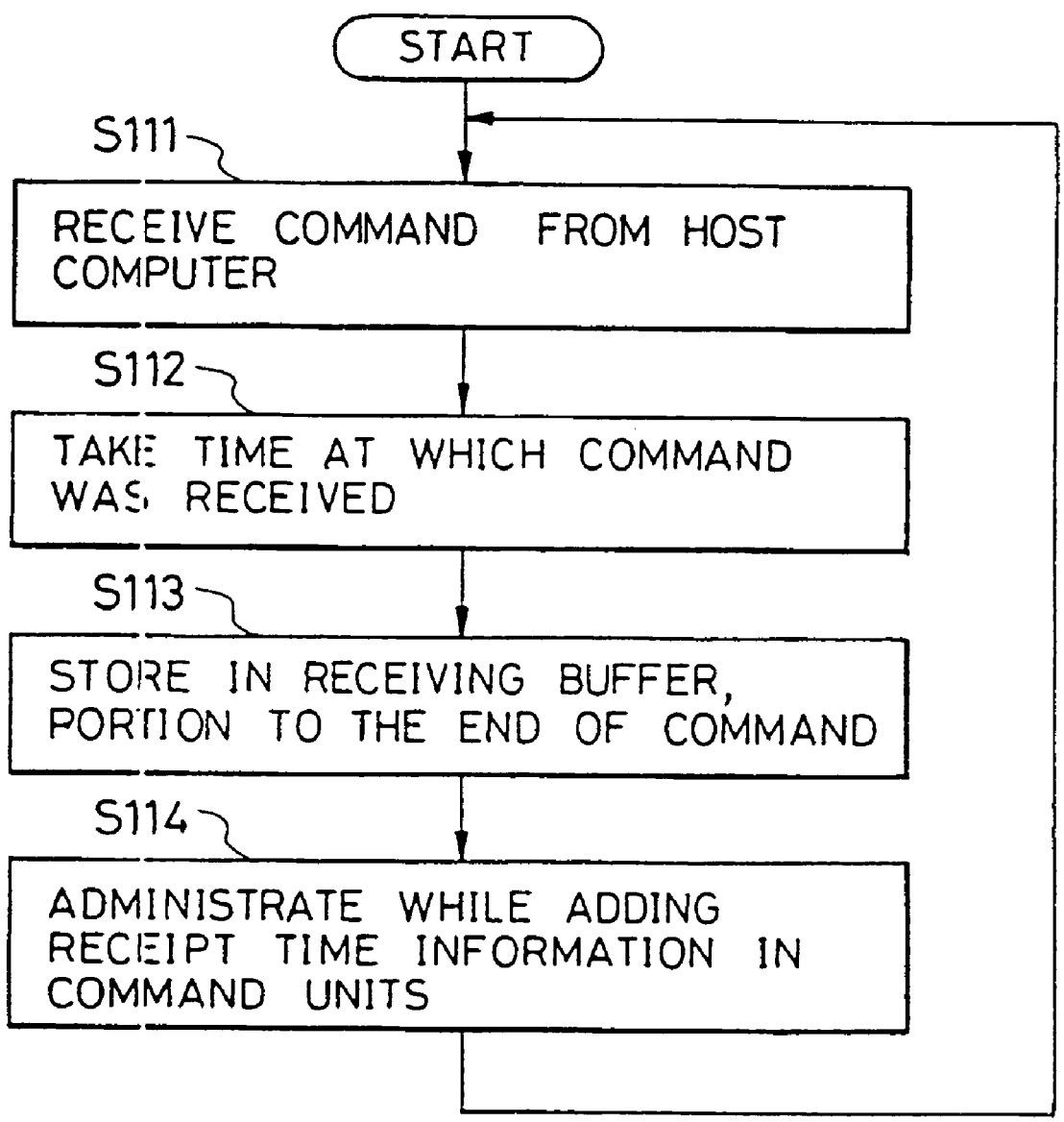
FIG. 11 is a flow chart showing the operation of a data-receipt administration portion of the printer apparatus according to the third embodiment.

FIG. 11 is a flow chart of the operation of the printer apparatus 2' according to this embodiment which illustrates a process in which the data-receipt administration portion 3 receives data from the host computer 1 to administrate the data.

Initially, the data-receipt administration portion 3 receives, from the host computer 1, data codes indicating commands for forming an image, for control and for status response (step S111).

The data-receipt administration portion 3 immediately requires the timer administration portion 10 to send time information (step S 12).

The data-receipt administration portion 3 supervises sent data codes to discriminate the end of one command so as to store each command in the receiving buffer (step S113).

As a result, the data-receipt administration portion 3 administrates the data codes in command units in such a manner that the data codes are temporarily stored together with the receipt time received in step S112 into a receiving buffer or the like (step S114).

When receipt of one command has been completed, the operation returns to step S111, in which a next command is received and a similar process is repeated.

As a result of a sequence of the processes above, the commands transmitted from the host computer 1 are, together with the command receipt time information, stored and administrated by the data-receipt administration portion 3.

The foregoing sequential processes are performed immediately after a command has been issued from the host computer 1. Since the foregoing sequential processes are frequently performed individually from other processes by a multitask method or the like, the processes are free from influences of, for example, a state where other processes are performed. Therefore, the time, at which the command has been received, can be administrated.

Figure 12:
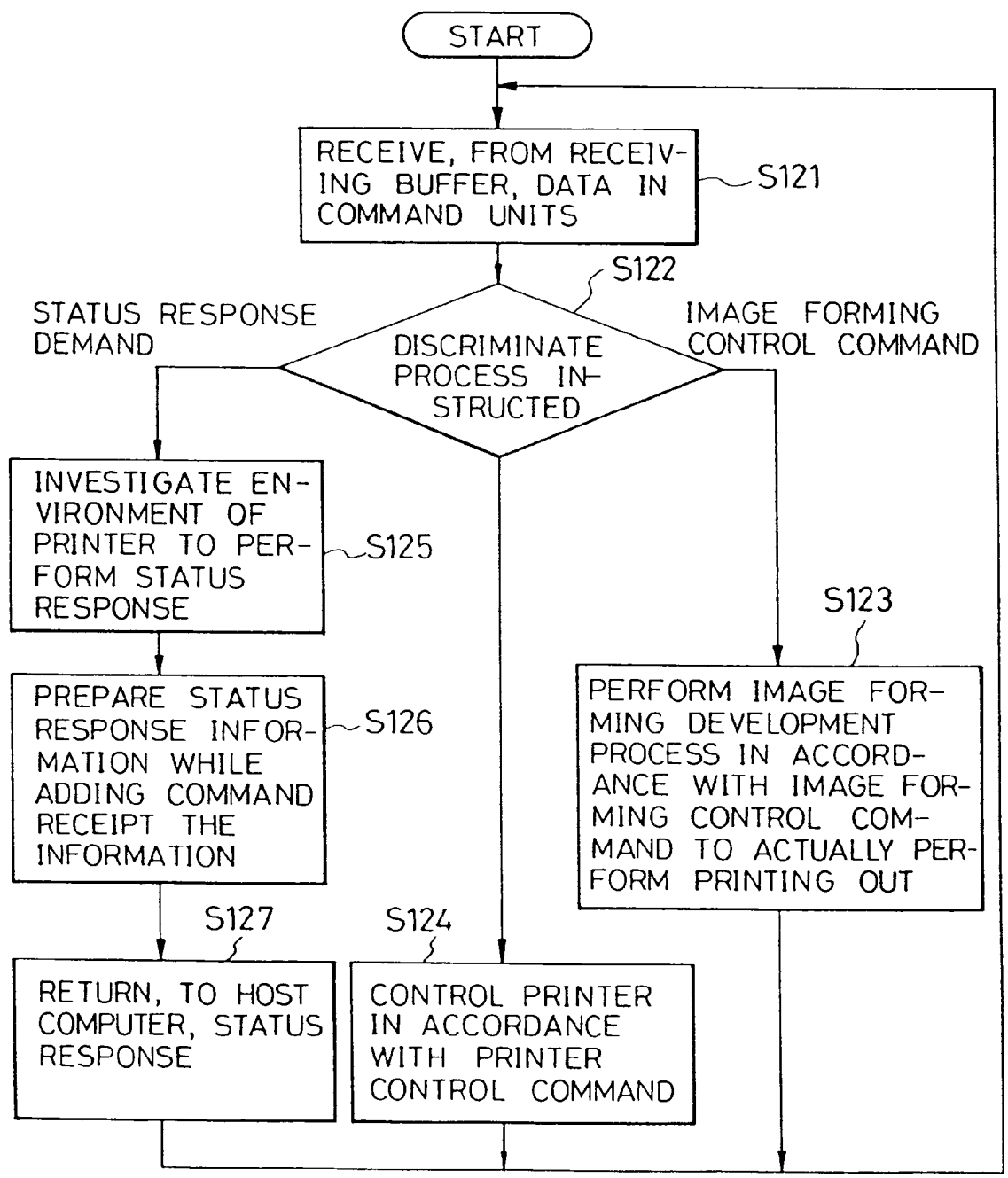
FIG. 12 is a flow chart showing the operation of a data-receipt administration portion of the printer apparatus according to the third embodiment.

FIG. 12 is a flow chart of the operation of the printer apparatus according to this embodiment, in which the printer-language analyzing portion 4 processes data in command units and performs image forming control, and status response processes.

Referring to FIG. 12, the printer-language analyzing portion 4 periodically supervises the receiving buffer and waits for supply of data in command units by the operation of the data-receipt administration portion 3 as shown in the flow chart shown in FIG. 11. When data has been detected, the data is received in command units (step S121).

Then, the type of the commanded processes is discriminated (step S122).

If the image forming control has been commanded, the printer-language analyzing portion 4 transmits the foregoing command to the image-forming and output portion 5 so that a process for forming and developing an image, such as corresponding characters, graphics or images, is performed, thus causing printing to be performed (step S123).

If the command is a command to control the printer apparatus 2', the printer-language analyzing portion 4 transmits the command to the printer-apparatus control portion 6 so that the printer apparatus 2' is controlled as commanded (step S124).

If the command is a command for the status response, the printer-language analyzing portion 4 transmits the foregoing command to the status-response processing portion 7. Thus, the status-response processing portion 7 investigates the corresponding environments of the printer apparatus 2' (step S125).

The foregoing investigation cannot immediately be performed sometimes because a large quantity of information must be searched or the state of the printer apparatus 2' has been changed or due to timing of the operation. In the foregoing case, all processes are not interrupted, but the employed multitask method enables the foregoing investigation to be performed simultaneously with performing the other data process. Then, completion of the investigation is waited for.

After the investigation has been completed, a result of the investigation is converted into status-response data format information, such as a character string or the like.

At this time, the printer apparatus 2' according to the present invention adds information about the time, at which the command for the status response has been received, to the information about the result of the investigation so that response data in the form of a character string or the like in the status response data format is prepared (step S126).

The status response data in the form, in which the command receipt information is added, is sent to the data transmission administration portion 9 so as to be temporarily stored in the transmitting buffer or the like, followed by being returned to the host computer 1 at the timing of the bidirectional interface (step S127).

The printer-language analyzing portion 4 receives a next command from the receiving buffer, analyzes the same and repeats the foregoing process.

As a result of the foregoing process, when the host computer 1 issues a command for the status response and receives a status response corresponding to the command therefrom, the host computer 1 is able to refer to information of the time, at which the command for the status response has been received, as the information of the returned status response. Therefore, even if the status responses are not returned out of the sequential order, or even if a long time has undesirably taken to return the status response, the correspondence between the returned status response and the command for the status response can easily be discriminated. Thus, the state of the printer apparatus can reliably be detected by the host computer.

Fourth Embodiment

A fourth embodiment of the present invention will now be described with reference to the drawings.

In this embodiment, time information administrated by the timer administration portion 10 according to the third embodiment is improved.

In the third embodiment, in which the time, at which the command for the status response has been received, is returned as additional information to the status response. However, undesirable difference between the time administrated in the host computer and that administrated in the printer apparatus will make useless the added command receipt time information according to the third embodiment.

Accordingly, the fourth embodiment has an additional function in which a command to set time from the host computer is received to set the time in the printer apparatus to make coincide the two times in the host computer and the printer apparatus.

Figure 13:
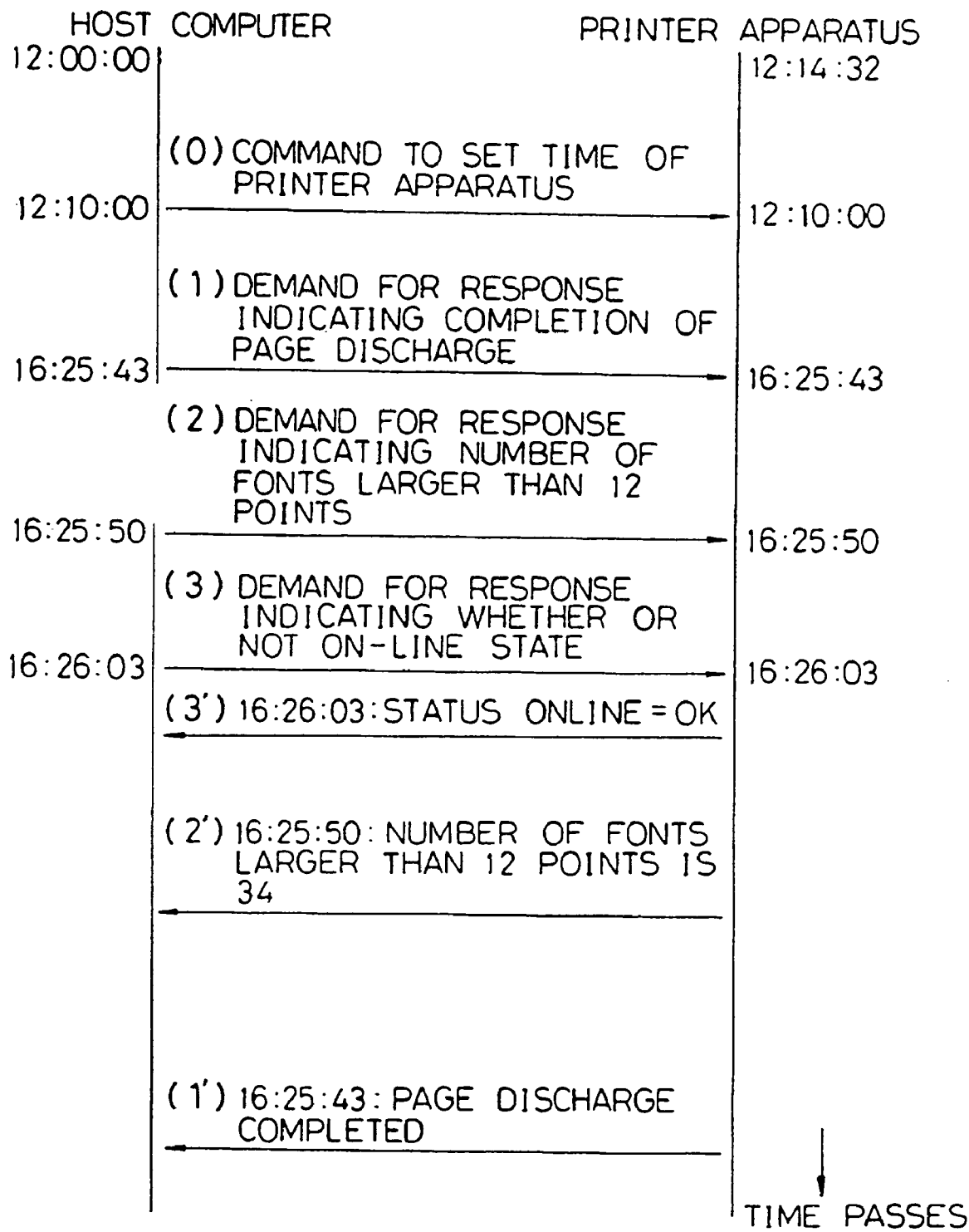
FIG. 13 is a schematic view showing an improved status response process according to the fourth embodiment.

Referring to FIG. 13, the operation of this embodiment will now be described.

In this embodiment, prior to starting the printing job, the host computer 1 issues a command to set the time in the printer apparatus 2'.

Then, the data-receipt administration portion 3 discriminates the command to immediately transmit information about the specified time to the timer administration portion 10.

The timer administration portion 10 resets the time thereof in accordance with the transmitted time information.

Then, the time in the printer apparatus 2' is administrated in accordance with the reset time.

That is, command receipt time information to be added to the status response is made on the basis of the time administrated by the host computer 1 so that the problem caused from the time difference between the two apparatuses is overcome.

The other process is performed similarly to the third embodiment.

The reason why the command for setting the time issued from the host computer 1 is not analyzed by the printer-language analyzing portion 4, but the same is analyzed by the data-receipt administration portion 3 lies in that accuracy of the set time must be maintained by immediately performing the time setting process when the command has been supplied.

For example, an assumption is made that the process performed by the printer-language analyzing portion 4 delays the operation of setting the time in the printer apparatus 2' by the timer administration portion 10 by three seconds from the issue of the time setting command from the host computer 1. As a result, also time information to be added to the status response is delayed by three seconds. In order to prevent the foregoing problem, the foregoing structure is employed.

Figure 14:
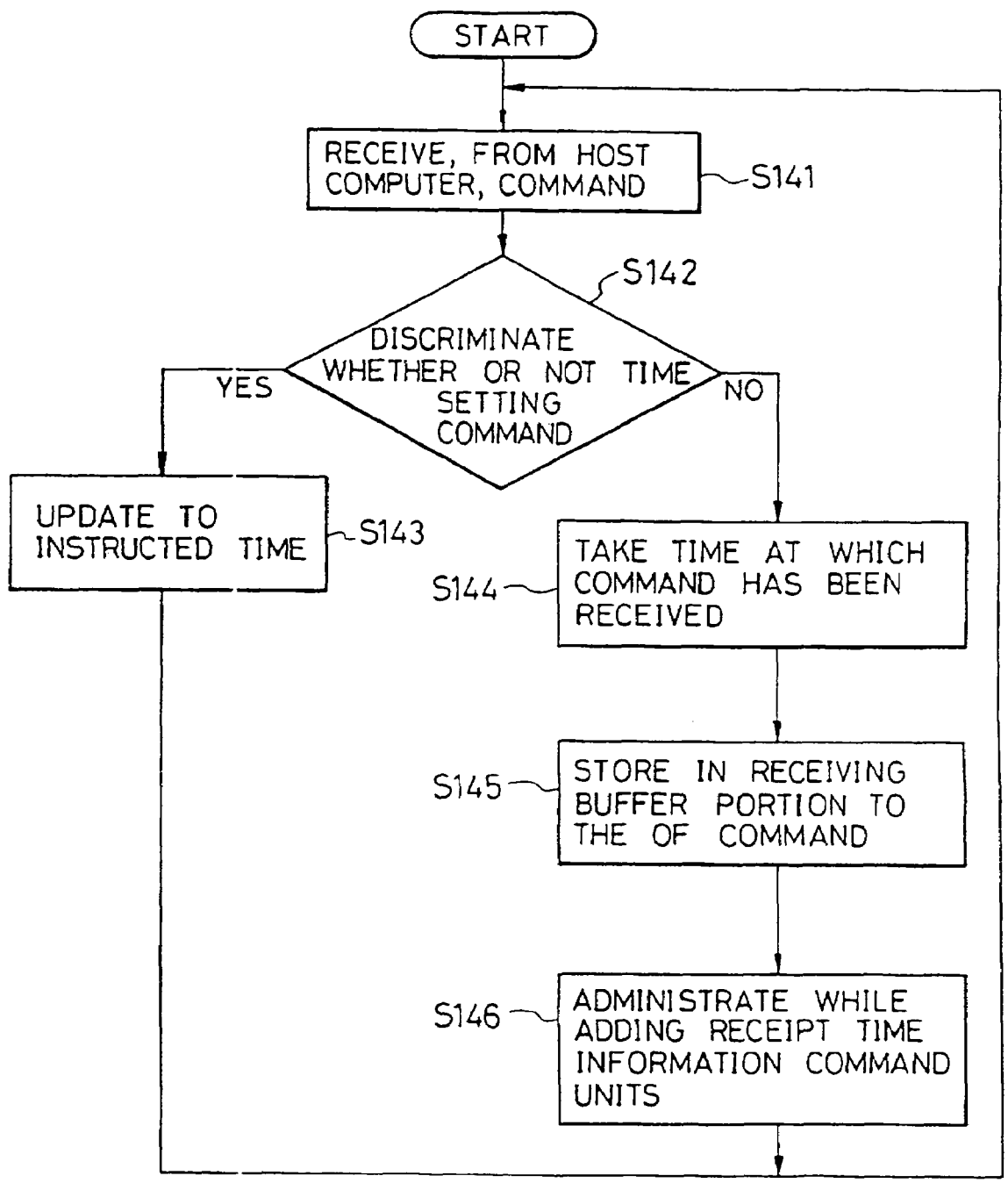
FIG. 14 is a flow chart showing the operation of a data-receipt administration portion according to the fourth embodiment.

FIG. 14 is a flow chart of the operation of the data-receipt administration portion 3 according to the fourth embodiment.

Initially, commands for forming various images, controls and status responses and data codes for setting the time administrated by the printer apparatus 2' from the host computer 1 are received by the data-receipt administration portion 3 (step S141).

The data-receipt administration portion 3 discriminates as to whether or not the transmitted information is the time setting command (step S142).

If the transmitted information is the time setting command, the data-receipt administration portion 3 immediately transmits the foregoing command to the timer administration portion 10 to update the time in the printer apparatus 2' to the specified time (step S143).

Then, the operation returns to the start of the flow chart.

Then, the time to be used in the ensuing operation is administrated on the basis of the updated time.

If the information is not the time setting command, the data-receipt administration portion 3 immediately requires the timer administration portion to send time information (step S144).

The data-receipt administration portion 3 supervises sent data cods to discriminate the end of one command (step S145).

Thus, the data codes are administrated in command units and are, together with the receipt time received in step S144, temporarily stored in the receiving buffer or the like so as to be administrated (step S146).

When receipt of one command has been completed, the operation returns to step S141 in which a next command is received and a similar process is repeated.

As a result, the time in the host computer 1 and that in the printer apparatus 2' are made coincide with each other, causing the command receipt time information added to the status response to be made further reliable. Thus, when the host computer 1 issues a command for the status response and receives a status response corresponding to the command therefrom, the host computer 1 is able to refer to information of the time, at which the command for the status response has been received, as the information of the returned status response. Therefore, even if the status responses are not returned out of the sequential order, or even if a long time has undesirably taken to return the status response, the correspondence between the returned status response and the command for the status response can easily be discriminated.

Thus, the state of the printer apparatus can reliably be detected by the host computer.

Fifth Embodiment

A fifth embodiment of the present invention will now be described with reference to the drawings.

In this embodiment, the data-receipt administration portion 3 according to the third embodiment is improved.

In the third embodiment, the time, at which the command for the status response has been received, is returned as additional information to the status response. However, time administrated in the host computer and that administrated in the printer apparatus do not always coincide with each other.

Therefore, there is a possibility that the comparison between the time administrated by the host computer 1 and time information returned by the printer apparatus 2' is useless.

Accordingly, the fifth embodiment has an additional function in which, when a command is received from the host computer, and the command receipt time has been established in the printer apparatus, time information is immediately returned to the host computer to subject, to a comparison, the command receipt time information and the command receipt time information which will be returned while being added to the status response.

The flow of the operation will now be described with reference to FIG. 15.

In this embodiment, when the data-receipt administration portion 3 receives output data, various control commands and commands for status response (commands (1), (2) and (3)) from the host computer 1, the data-receipt administration portion 3 requires the timer administration portion 10 to send the present time information simultaneously with the foregoing receipt. The present time received from the timer administration portion 10 is added to each command of received data as receipt time information so as to be administrated.

Simultaneously, information of the time, at which the command has been received, is immediately returned to the host computer 1 through the bidirectional interface (responses (1'), (2') and (3')).

The return at this time is immediately performed in the sequential order of the command receipt.

That is, the host computer 1 is able to confirm the time, at which the command issued therefrom has been received, with reference to the time administrated by the printer apparatus 2' in accordance with the foregoing return.

The host computer 1 stores the returned command receipt time for the printer apparatus 2' for each command.

When the host computer 1 has received the status response returned after the receipt of the command receipt time (responses (1'), (2') and (3')), the command receipt time, which has been received and stored, and the command receipt time information added to the status response are subjected to a comparison. Thus, the correspondence between the commands and status responses can reliably be discriminated.

That is, the difference between the times administrated by the host computer 1 and that administrated by the printer apparatus 2' does not raise any problem.

The other process is the same as that according to the third embodiment.

Figure 16:
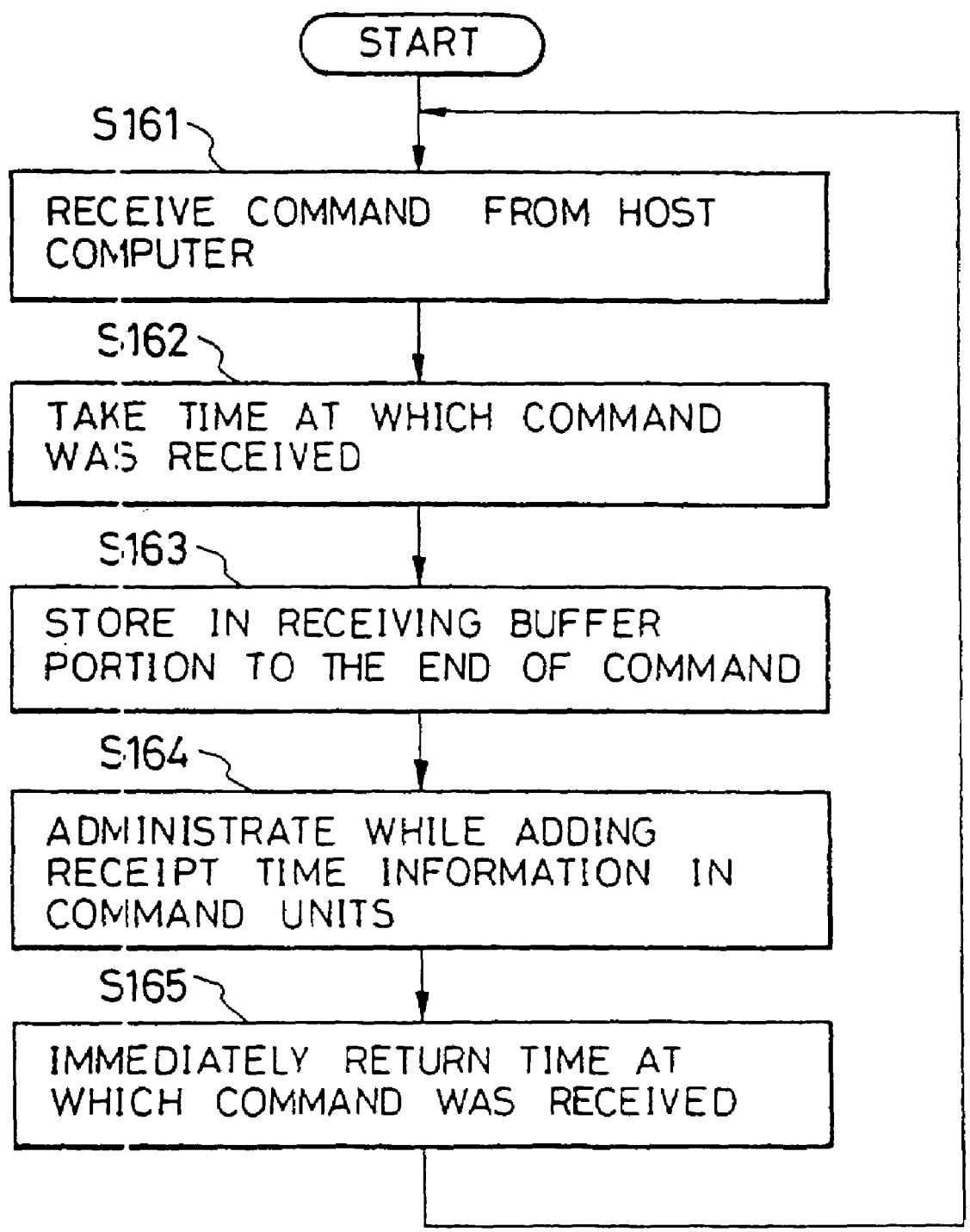
FIG. 16 is a flow chart showing the operation of a data-receipt administration portion according to the fifth embodiment.

FIG. 16 is a flow chart of the operation of the data-receipt administration portion 3 according to the fifth embodiment.

Initially, data codes, such as commands for forming images, controls and status responses, from the host computer 1 are received by the data-receipt administration portion 3 (step S161).

As a result, the data-receipt administration portion 3 immediately requires the timer administration portion 10 to supply time information (step S162).

The data-receipt administration portion 3 supervises supplied data codes to discriminate the end of one command (step S163).

Thus, the data codes are administrated in command units and are temporarily stored and administrated in the receiving buffer or the like together with the receipt time received in step S162 (step S164).

The, the command receipt time information is immediately returned to the host computer 1 through the bidirectional interface (step S165).

When receipt of one command has been completed, the operation returns to step S161 in which a next command is received, a next process is repeated.

As a result, even if the time in the host computer 1 and that in the printer apparatus 2' do not coincide with each other, the command receipt time previously returned to the host computer 1 immediately when the command has been received enables the command receipt time information added to the status response to be made further reliable.

Thus, when the host computer 1 issues a command for the status response and receives a status response corresponding to the command therefrom, the host computer 1 is able to refer to information of the time, at which the command for the status response has been received, as the information of the returned status response. Therefore, even if the status responses are not returned out of the sequential order, or even if a long time has undesirably taken to return the status response, the correspondence between the returned status response and the command for the status response can easily be discriminated. Thus, the state of the printer apparatus can reliably be detected by the host computer.

Note that the present invention may be applied to a system consisting of a plurality of units or an apparatus comprising one unit. As a matter of course, the present invention can be applied to a case where a system or an apparatus is constituted with a supplied program.

Sixth Embodiment

A sixth embodiment of the present invention will now be described with reference to the drawings.

Figure 19:
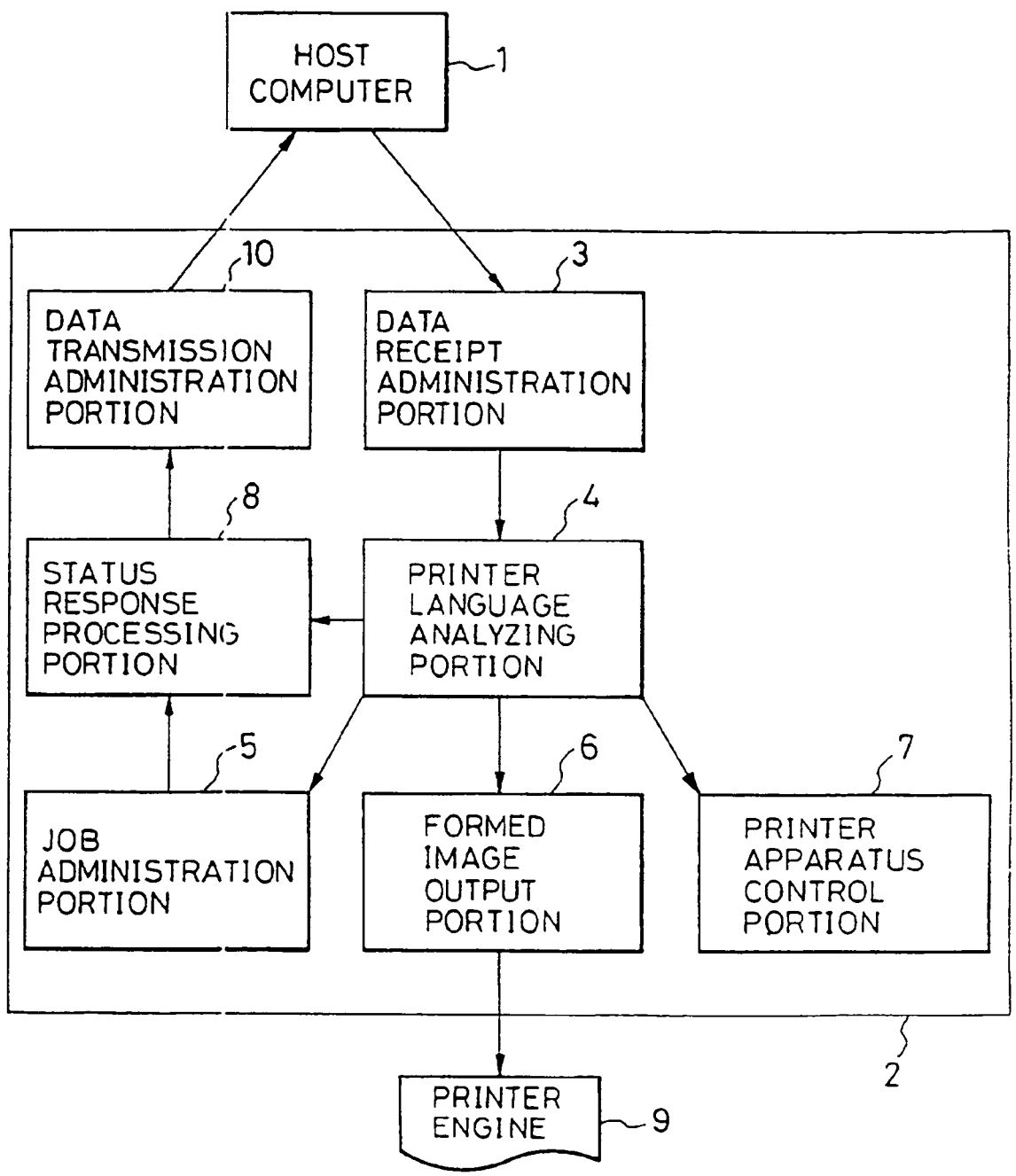
FIG. 19 is a block diagram showing the structure of a page printer apparatus according to sixth and seventh embodiments of the present invention.

FIG. 19 is a block diagram of the structure of a printer apparatus according to sixth, seventh and eighth embodiments.

In this embodiment, the description will be made about a page printer.

Referring to FIG. 19, reference numeral 1 represents a host computer, which generates output data, such as characters and graphics, and a variety of control commands, and which generates a command for the status response for recognizing a variety of information items of the printer apparatus, in order to input the foregoing data and commands to a printer apparatus 2 which is the main portion of an output apparatus.

The host computer 1 and the printer apparatus 2 are connected to each other through a bidirectional interface so that data can be transferred from the host computer 1 to the printer apparatus 2, and data can be returned from the printer apparatus 2 to the host computer 1.

In the printer apparatus 2, reference numeral 3 represents a data-receipt administration portion that receives data, such as characters and graphics, the various control commands and the command for the status response, which are supplied from the host computer 1, so as to administrate the data and commands.

The data-receipt administration portion 3 has a receiving buffer for receiving and temporarily storing data from the host computer 1.

Reference numeral 4 represents a printer-language analyzing portion that analyzes the detailed contents of a command, and that instructs the corresponding control in accordance with the contents of the command.

The printer-language analyzing portion 4 sequentially receives the commands stored in the data-receipt administration portion 3, and investigates the contents of the commands in accordance with the description rule of the printer language so as to discriminate what process is demanded to be performed. If the result of the discrimination indicates a command relating to job administration, such as a command for starting a printing job or a completion declaration, a corresponding job administration command is issued to a job administration portion 5.

If the command orders to form an image, such as characters or graphics, a command is issued to an image-forming and output portion 6 to form and output a corresponding image.

If the command orders to control the printer apparatus 2, a corresponding control command is issued to a printer-apparatus control portion 7.

If the command orders a status response, a command for the status response is issued to a status-response processing portion 8.

Reference numeral 5 represents the job administration portion.

The job administration portion 5 processes print data from the host computer 1 in job units in accordance with a job administration command from the printer-language analyzing portion 4. When the job administration portion 5 according to the present invention has received a printing job start declaration from the host computer 1, the job administration portion 5 automatically assigns an administration ID to the job.

The administration ID is used to distinguish the job from other jobs, the administration ID being numerals assigned in the sequential order of receipt of the job start declaration or an independent character string.

Note that the administration ID must be different among all jobs that have been received.

The administration ID assigned to each job is, as job-administration ID information, added to each job of the received output data so as to be administrated. The job-administration ID information is stored until the corresponding job is completed.

Simultaneously, the job administration portion 5 immediately returns the job-administration ID information to the host computer 1 through the bidirectional interface.

The foregoing returning operation is immediately performed in the sequential order of the job receipt.

Reference numeral 6 represents an image forming and output portion for forming and developing characters, graphics and images to output them.

The image-forming and output portion 6 processes a corresponding character pattern, calculates a graphic, forms an image or develop image data in accordance with the image forming and output command from the printer-language analyzing portion 4, the output developed data being then transmitted to a printer engine 9.

The printer engine 9 is an apparatus, such as a laser beam printer, that prints out data by using an electrophotographic method in accordance with output development data received from the image-forming and output portion 6.

Reference numeral 7 represents a printer-apparatus control portion that controls and administrates the printer apparatus 2, such that it selects paper to be used and initializes the printer apparatus 2, in accordance with the printer-apparatus control command from the printer-language analyzing portion 4.

Reference numeral 8 represents a status-response processing portion that investigates the corresponding environment of the printer apparatus 2 in accordance with the command for the status response from the printer-language analyzing portion 4.

A variety of contents are investigated, for example, information about various fonts, contents of image forming functions, whether or not data can be received, the status of the printer apparatus 2 and the state of progress of the printing output process.

The status-response processing portion 8 investigates the various environments of the printer apparatus 2 so as to prepare status response information, which indicates the contents of the investigated environment, the status response information being formed into a character string or the like.

At this time, the printer apparatus 2 adds, to the job data, in which the command for the status response is described, the administration ID information assigned by the job administration portion 5. Furthermore, the printer apparatus 2 according to the present invention comprises the status-response processing portion 8 that discriminates the contents of the status responses to judge whether or not the status responses for all jobs must be communicated as well as the status response for the job, which is being performed. If the status response is an important status response that must be communicated to all jobs, information indicating importance is further added to the status response. The status response information is transmitted to the data-transmission administration portion 10.

When the data-transmission administration portion 10 has received the status response information returned from the status-response processing portion 8, the status response information is temporarily stored in the transmitting buffer or the like, followed by being returned to the host computer 1 at a proper timing for the bidirectional interface while being formed into a shape in which the administration ID information is added.

Figure 20:
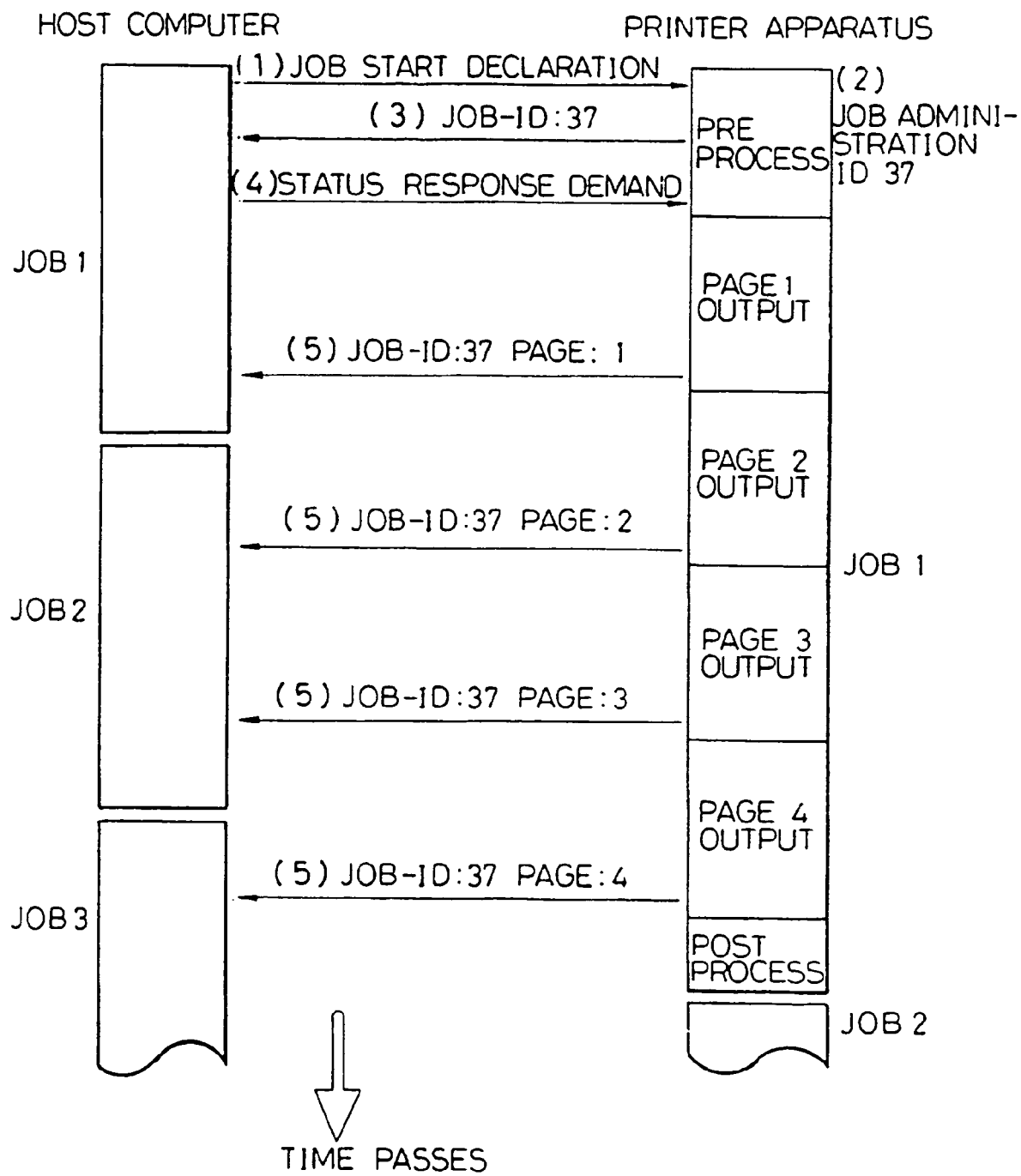
FIG. 20 is a schematic view showing an improved status response process according to the sixth embodiment of the present invention.
Figure 25:
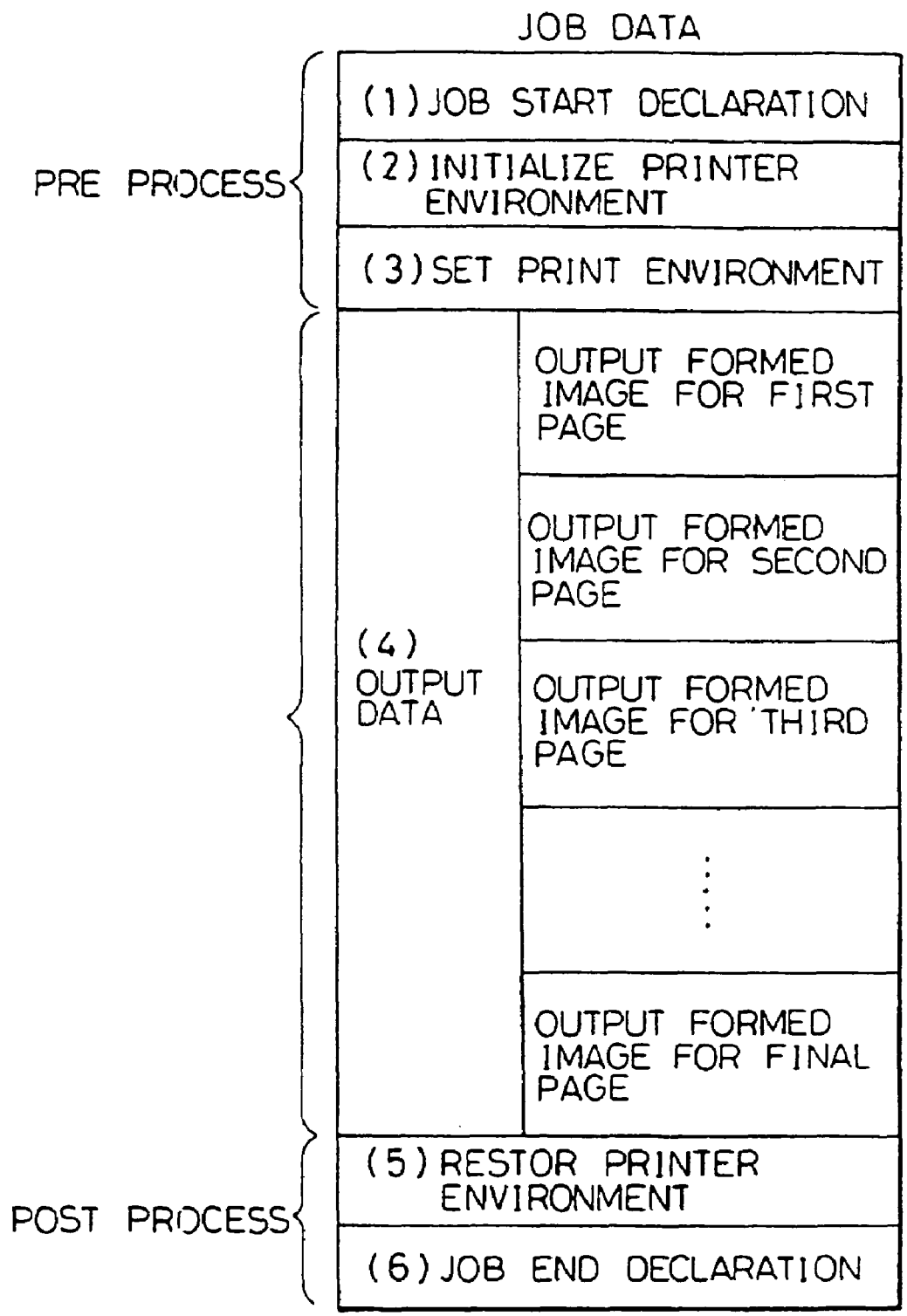
FIG. 25 is a schematic view showing an example of a usual output job.
Figure 26:
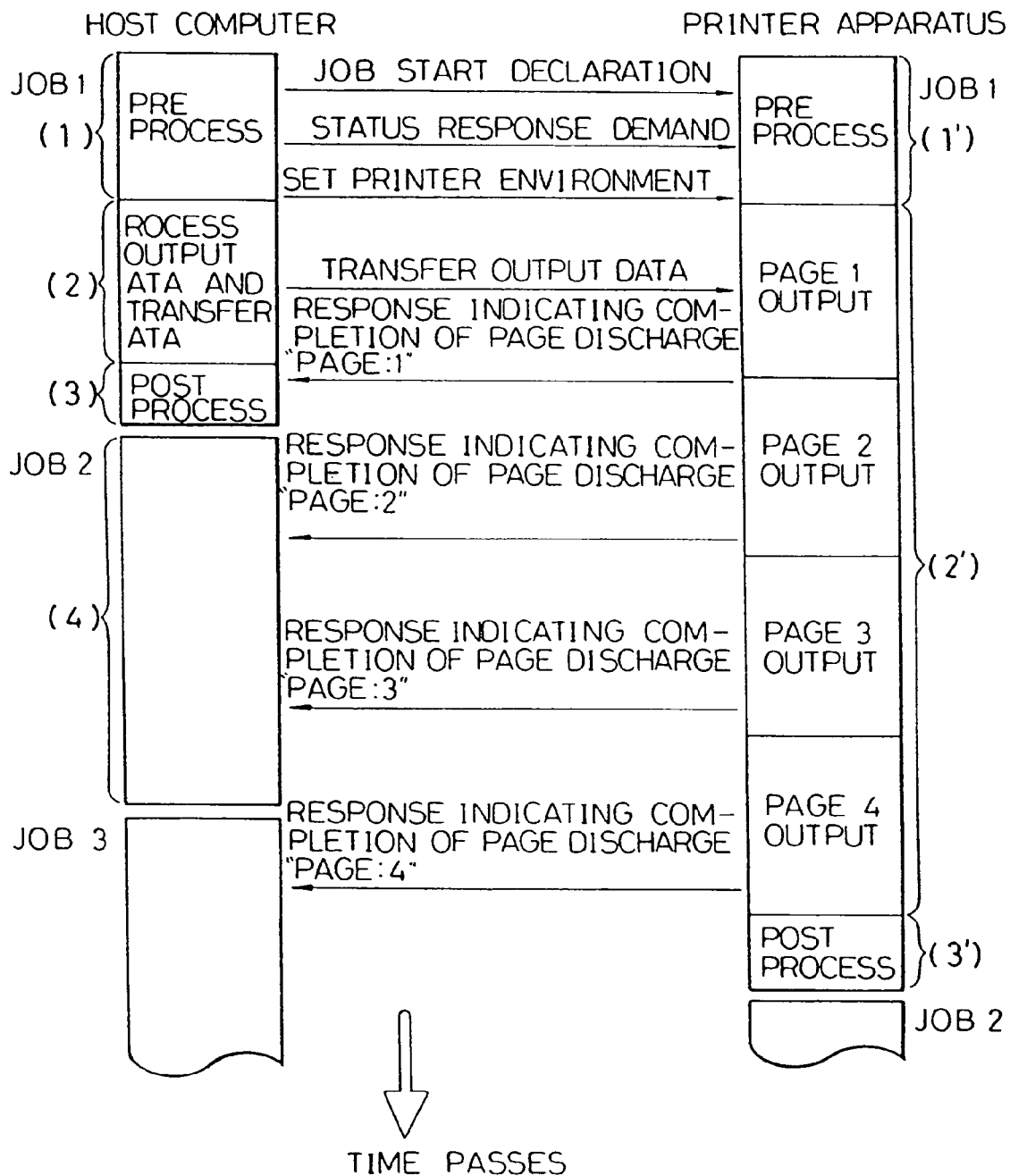
FIG. 26 is a schematic view showing an example of a conventional status response process.

FIG. 20 shows an example of a status response corresponding to an example shown in FIG. 25 and according to the present invention.

An assumption is made here that a first job 1 has been sent from the host computer 1 to the printer apparatus 2 (process 1).

The printer-language analyzing portion 4 analyzes the supplied job data in command units. If the printer-language analyzing portion 4 has received a job start declaration, it transmits the job start declaration to the job administration portion 5.

The job administration portion 5 according to the present invention starts job administration in accordance with the transmitted job start declaration, and assigns job-administration ID information to the job (process 2).

The job administration portion 5 administrates each job in the form in which the assigned administration ID information is added.

For example, the administration is performed in such a manner that the job-administration ID information assigned to the first Job 2 is "37", that assigned to a next Job 2 is "38" and that assigned to a next Job 3 is "39".

The job administration portion 5 immediately transmits the assigned job-administration ID information from the status-response processing portion 8 to the host computer 1 so that the sent Job 1 being administration ID "37" is transmitted (process 3).

The foregoing transmission is performed by a character string or the like, for example, "STATUS JOB ID: 37 RECEIVED".

As described above, the host computer 1 requires information about the various statuses of the printer apparatus 2.

The statuses are the sizes of paper that can be used, available fonts, the state of the printer apparatus 2, such as whether or not out of paper takes place, the page No. that has been discharged during the present output job, and whether or all pages have been discharged.

The foregoing status responses are classified into status, such as information about the available paper size, that can be immediately returned; status, such as the state of the printer that changes always and that must be returned whenever the change occurs; status, such as the page discharge state, that must be responded after the printer engine has completed the process thereof.

Therefore, status responses are sometimes returned to the host computer 1 after a long time has passed from the receipt of a command for the status response.

Therefore, a case will occur frequently where the first Job 1 has been completed in the host computer 1, and the next Job 2 has started.

Accordingly, the status-response processing portion 8 according to the present invention returns the status response information to the host computer 1 while adding the administration ID information assigned to each job to the usual status response information (response 5).

An assumption is made here that the third page has been printed out during a process of output data in the Job 1. If a status of the page discharge has been required from the host computer 1, information about completion of the discharge of the third page must be communicated to the host computer 1.

The status-response processing portion 8 according to the present invention adds, to the page discharge information, administration ID "37" of the Job 1 so that the information is expressed by a character string or the like, such as "STATUS JOB-ID: 37 PAGE:3 FINISHED", and the information is transmitted to the host computer 1.

The host computer 1 subjects, to a comparison, the job administration ID added to the conventional status response and the present job-administration ID, received at the job has been started. Thus, the host computer 1 is able to discriminate easily the job data in which the returned status response has been generated.

In the foregoing example case, page discharge information can be discriminated to be information that relates to page discharge indicated by the job-administration ID "37" in accordance with sent information "STATUS JOB-ID: 37 PAGE:3 FINISHED".

The job-administration ID "37", returned from the printer apparatus 2 at the time of start of the Job 1 and assigned to the Job 1, and the ID, assigned to the foregoing status response, coincide with each other.

As a result, the host computer 1 is able to discriminate that the status response does not relate to the Job 2 and Job 3, which have been started.

Figure 21:
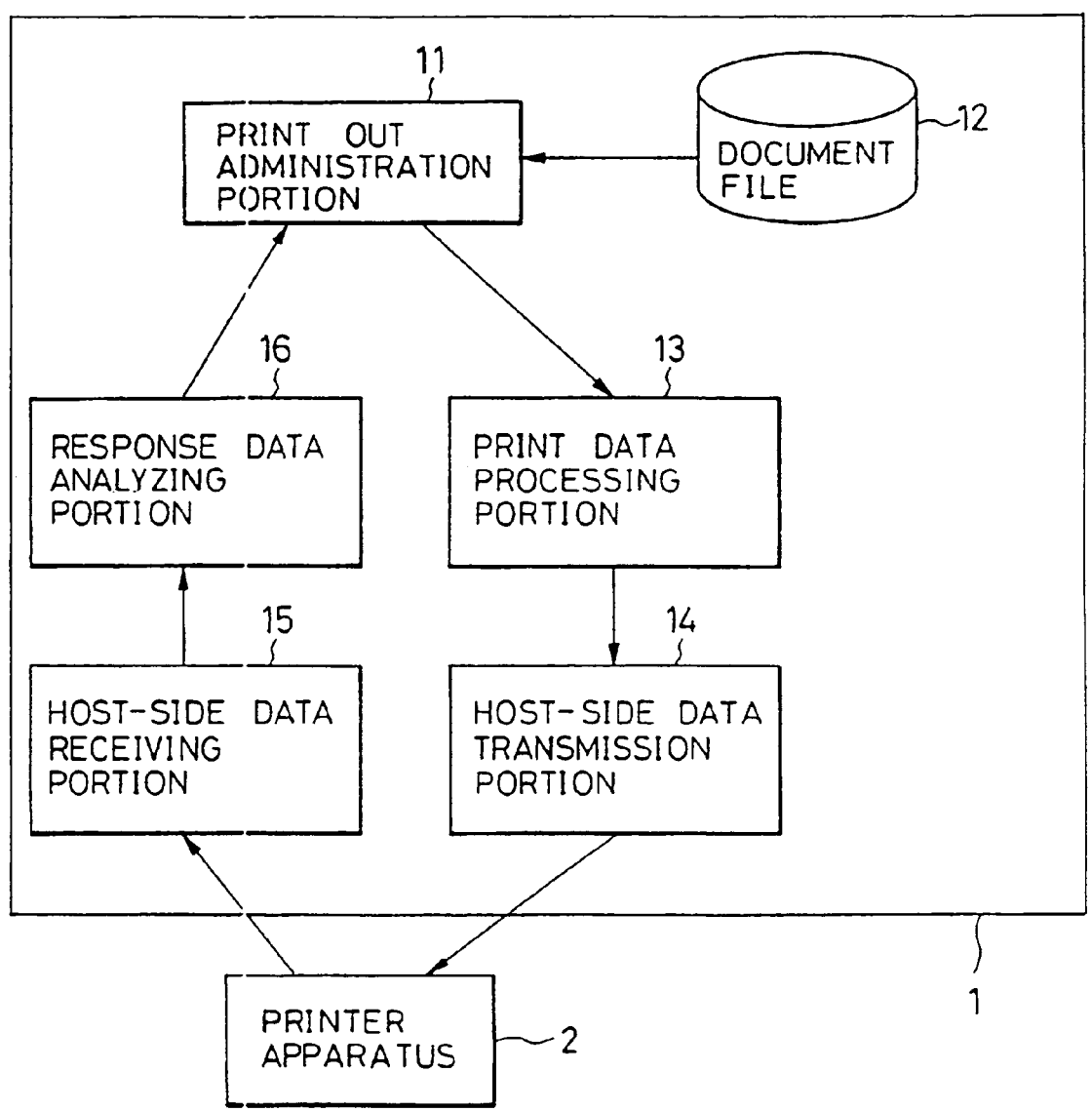
FIG. 21 is a block diagram showing the structure of a portion of a host computer relating to the present invention.

FIG. 21 is a block diagram showing the structure of a portion of the host computer 1 that relates to the present invention.

Referring to FIG. 21, reference numeral 1 represents the host computer, and 2 represents the printer apparatus. Reference numeral 11 represents a printing-out administration portion that totally administrates an operation of printing out a document in accordance with an instruction from a user or the like.

When an instruction for printing out a document or the like has been made by a user or the like, the printing-out administration portion 11 administrates the output of the document as one printing job. The contents of the instructed document are received from a document file recorded on, for example, a hard disk 12 to transmit the contents to a printing-data processing portion 13.

To obtain information about, for example, the printer apparatus 2, required to perform the printing job, the printing-out administration portion 11 issues a command for the status response to the printing-data processing portion 13.

The printing-data processing portion 13 converts the command for the status response and the contents of the document received from the printing-out administration portion 11 into a printer-language format that can be recognized by the printer apparatus 2 to transmit the converted data to a host computer-side data-transmission portion 14.

The host computer-side data transmitting portion 14 transmits the supplied job data to the printer apparatus 2.

The printer apparatus 2 analyzes the job data to perform various printing processes, and returns various status responses.

The returned status responses are received by a host computer-side data receiving portion 15 so as to be transmitted to a responded-data analyzing portion 16.

The responded-data analyzing portion 16 analyzes the received status responses to communicate their contents to the printing-out administration portion 11.

The communicated status responses are processed as follows:

When the host computer 1 has transmitted a job, the printer apparatus 2 assigns and returns a job-administration ID assigned to the job.

When the printing-out administration portion 11 has received the job-administration ID, it discriminates that the returned job-administration ID is the administration ID assigned to the job which is being processed, followed by storing the returned job-administration ID while making the same correspond to the job.

Then, the printer apparatus 2 appropriately returns status responses in accordance with commands for the status response from the host computer 1.

As described above, the foregoing status responses have information of job-administration IDs added thereto.

The printing-out administration portion 11 receives the job-administration ID, as well the contents of each status response to subject the job-administration ID added to the status response and the job-administration ID, which has been received at the start of the job, to a comparison.

If the two job-administration IDs coincide with each other, the status response has been generated during the job, which is being processed, and therefore the status response can be used. If they do not coincide with each other, the status response has been generated during another job, and therefore the status response can be ignored.

In case of a host computer capable of performing a parallel process, or in an environment in which a plurality of users or host computers are connected, a plurality of jobs sometimes are processed simultaneously by the host computer. Even in the foregoing case, the job-administration ID enables only the status response required for each job to be selected so as to detect the state of the printer apparatus.

As described above, information of the administration ID assigned to a job is added to a conventional status response, followed by being returned, thus causing a detection to be performed that the job, during which the status response has been generated, can be inferred.

When the responded-data analyzing portion 16 has received a status response, the responded-data analyzing portion 16 discriminates as to whether or not information indicating that the response is an important response, which relates to all jobs, is added to the status response.

In the foregoing case, a discrimination is performed as to whether or not a character string or the like, such as "*CAUTION*" is added.

If information indicating importance is added, a judgment is performed that the status response is not peculiar to each job, but relates to all jobs.

The contents of the status responses of all jobs are always analyzed regardless of job-administration ID information so that a variety of corresponding processes are performed.

If information indicating importance is not added, a judgment is performed that the status response is peculiar to the job.

In the foregoing case, then, job-administration ID information is checked. If the corresponding job is being processed, the status information is sent to the foregoing process.

During the corresponding job, the supplied status information is analyzed so that a variety of corresponding processes are performed.

If no corresponding job is being performed, the status information is ignored.

In a case of a host computer capable of performing a parallel process, or in an environment in which a plurality of users or host computers are connected, a plurality of jobs are sometimes performed simultaneously by the host computer. Even in the foregoing cases, the job-administration ID and information indicating importance enable discrimination to be performed whether the status response is peculiar to the job or the same relates to all jobs.

Although the job-administration ID information according to this embodiment is formed into a serial No., any ID form may be employed.

The information indicating importance is not limited to a character string according to this embodiment.

The essential portion of the present invention requires that presentation of job-administration IDs and information indicating importance can be made to the host computer.

Figure 22:
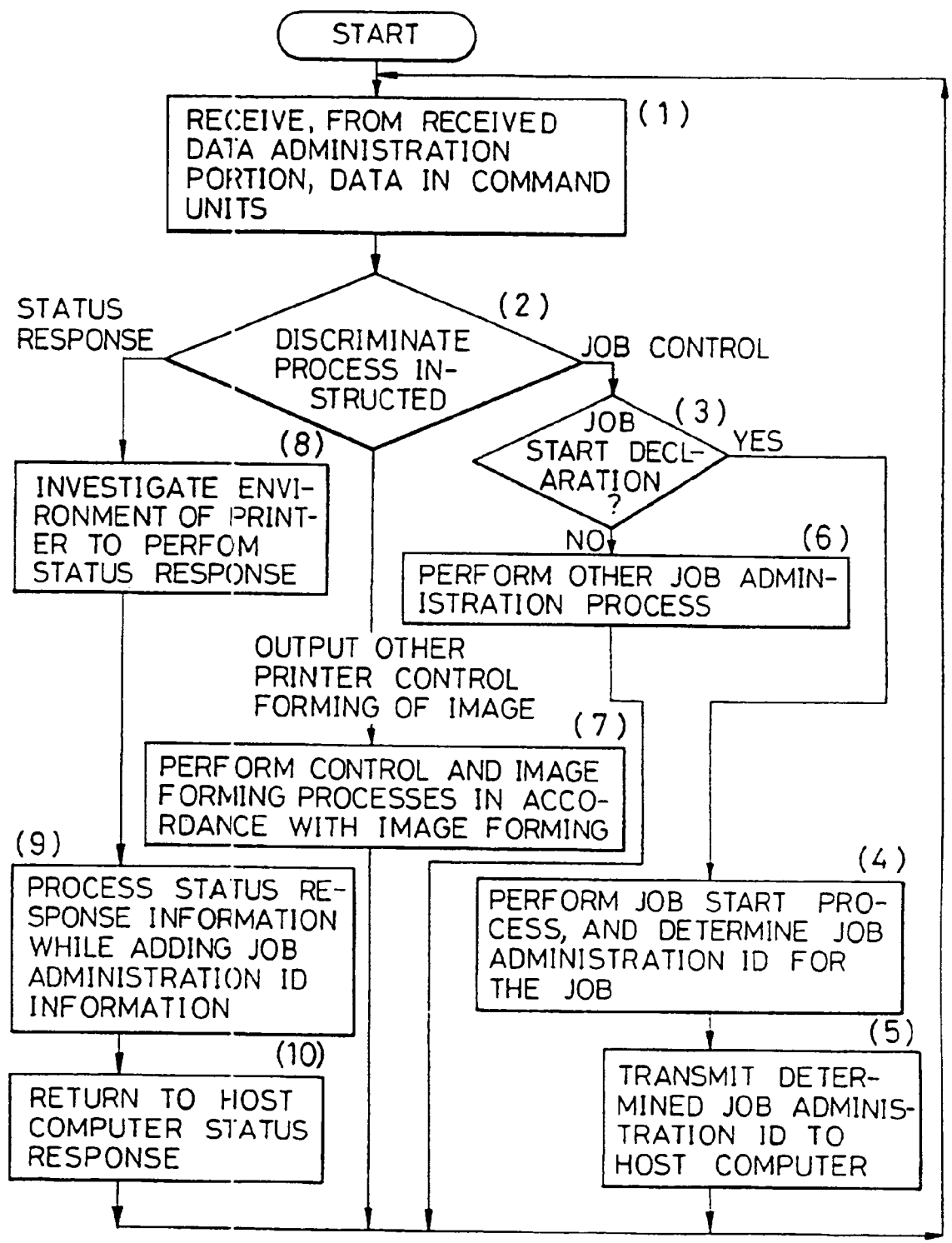
FIG. 22 is a flow chart showing a command process in the printer apparatus according to the sixth embodiment of the present invention.

FIG. 22 is a flow chart of the operation of the present invention, in which the printer-language analyzing portion 4 performs job administration processes, image forming processes, control processes and status-response processes.

The printer-language analyzing portion 4 receives data from the data-receipt administration portion 3 (step S1).

Then, the process to be performed in accordance with the issued command is discriminated (step S2).

If any job control is instructed, this command is transmitted to the job administration portion 5 so that a corresponding job control process is performed. Then, a discrimination is performed whether or not the command is a job start declaration (step S3).

If the command declares start of the job, a job-administration ID for the job is determined and administrated (step S4).

Then, the determined job-administration ID is immediately status-responded to the host computer 1 (step S5).

If the command is a command except the job start declaration, a corresponding job administration process is performed (step S6).

If any image forming control is instructed, this command is transmitted to the image-forming and output portion 6 so that a corresponding process for imaging and developing characters, graphics and images is performed, and the developed image is printed out. If the command orders to control the printer, the command is transmitted to the printer-apparatus control portion 7 so that a corresponding printer control process is performed (step S7).

If the command requires any status response, the command is transmitted to the status-response processing portion 8. The status-response processing portion 8 investigates the corresponding state of the environment of the printer apparatus 2 (step S8).

The foregoing investigation cannot immediately be performed sometimes because a large quantity of information must be searched or the state of the printer apparatus 2 has been changed or due to the timing of the operation. In the foregoing case, all processes are not interrupted, but the employed multitask method enables the foregoing investigation to be performed simultaneously with performing the other data process. Then, completion of the investigation is waited for.

After the investigation has been completed, its result is converted into status response data format information in the form of a character string or the like.

At this time, the printer apparatus 2 according to the present invention adds, to the investigation information, job-administration ID information of the job requiring the response, so as to process response data in the form of a character string or the like of a status-response data format (step S9).

The status-response data, in the form in which the job-administration ID information is added, is supplied to the data-transmission administration portion 10 so as to be stored temporarily in the transmitting buffer or the like, followed by being returned to the host computer 1 at the timing of the bidirectional interface (step S10).

The printer-language analyzing portion 4 receives a next command from the data-receipt administration portion 3 to analyze the contents of the command, followed by repeating the foregoing process.

Thus, when the host computer 1 issues a command for the status response and receives a status response corresponding to the command therefrom, the host computer 1 is able to refer to information of the time, at which the command for the status response has been received, as the information of the returned status response. Therefore, even if the status responses are not returned out of the sequential order, or even if a long time has undesirably taken to return the status response, the correspondence between the returned status response and the command for the status response can easily be discriminated. Thus, the state of the printer apparatus can reliably be detected by the host computer for each job.

Seventh Embodiment

A seventh embodiment of the present invention will now be described.

In this embodiment, the job-administration ID is not automatically assigned by the job administration portion 3, but a job-administration ID, supplied from the host computer 1 together with job data, and, assigned by the host computer 1, is used to administrate jobs.

Figure 23:
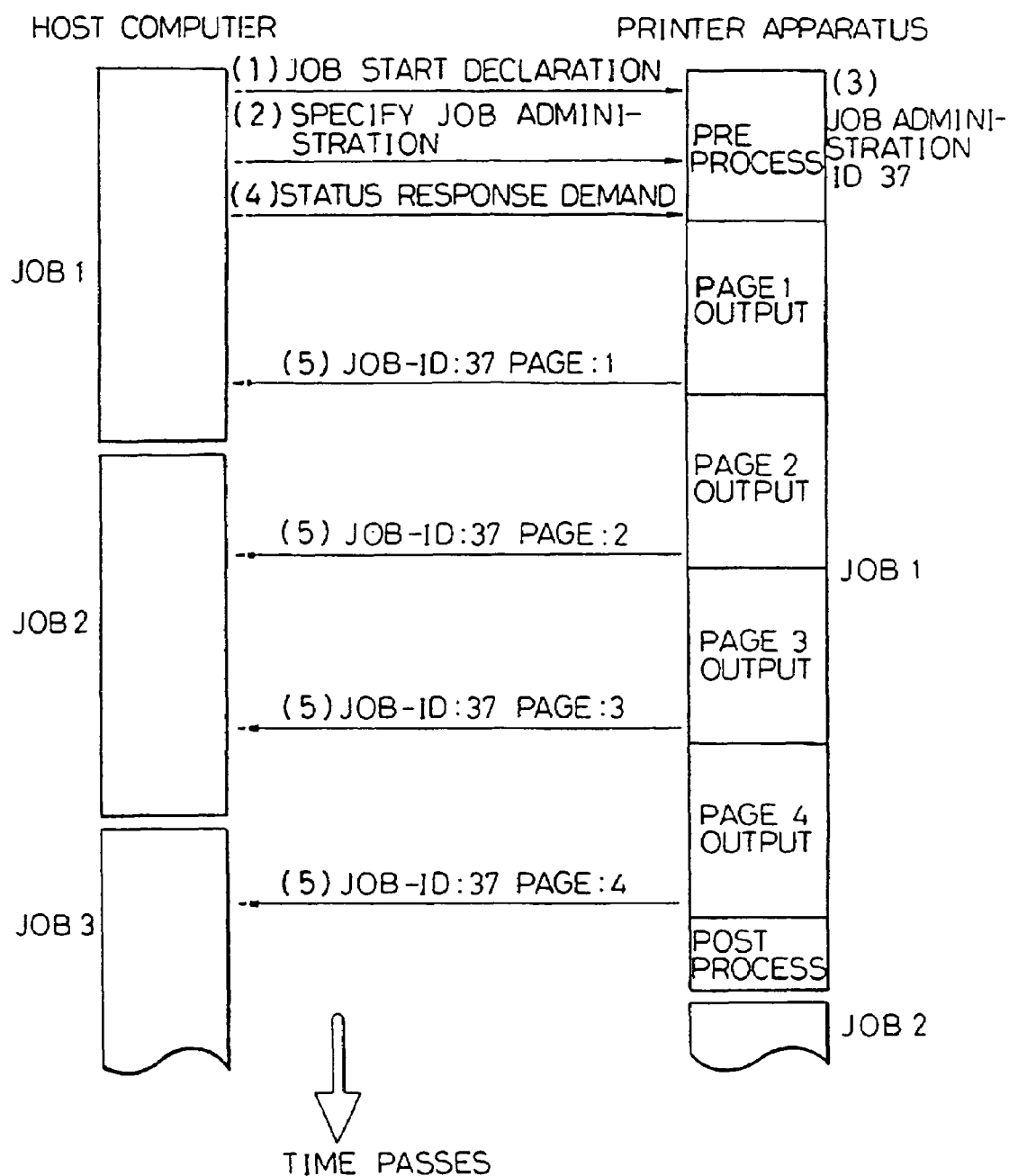
FIG. 23 is a schematic view showing an improved status response process according to the seventh embodiment of the present invention.

The flow of the process will now be described with reference to FIG. 23.

In the seventh embodiment, the host computer 1 communicates a job-administration IDs for identifying the job to the printer apparatus 2 together with a job start declaration (process 1) for the job (process 2).

The job-administration ID is not different from that according to the first embodiment, but is determined by the host computer 1.

When the job administration portion 5 receives the job start declaration and the job-administration ID assigned to the job, the job administration portion 5 administrates the job-administration ID while making this correspond to job data which will be supplied (process 3).

The job administration portion 5 does not assigns the job-administration ID.

Other process is the same as that according to the sixth embodiment.

That is, the job-administration ID information added to the status response is not assigned by the printer apparatus 2, but is specified by the host computer 1.

Figure 24:
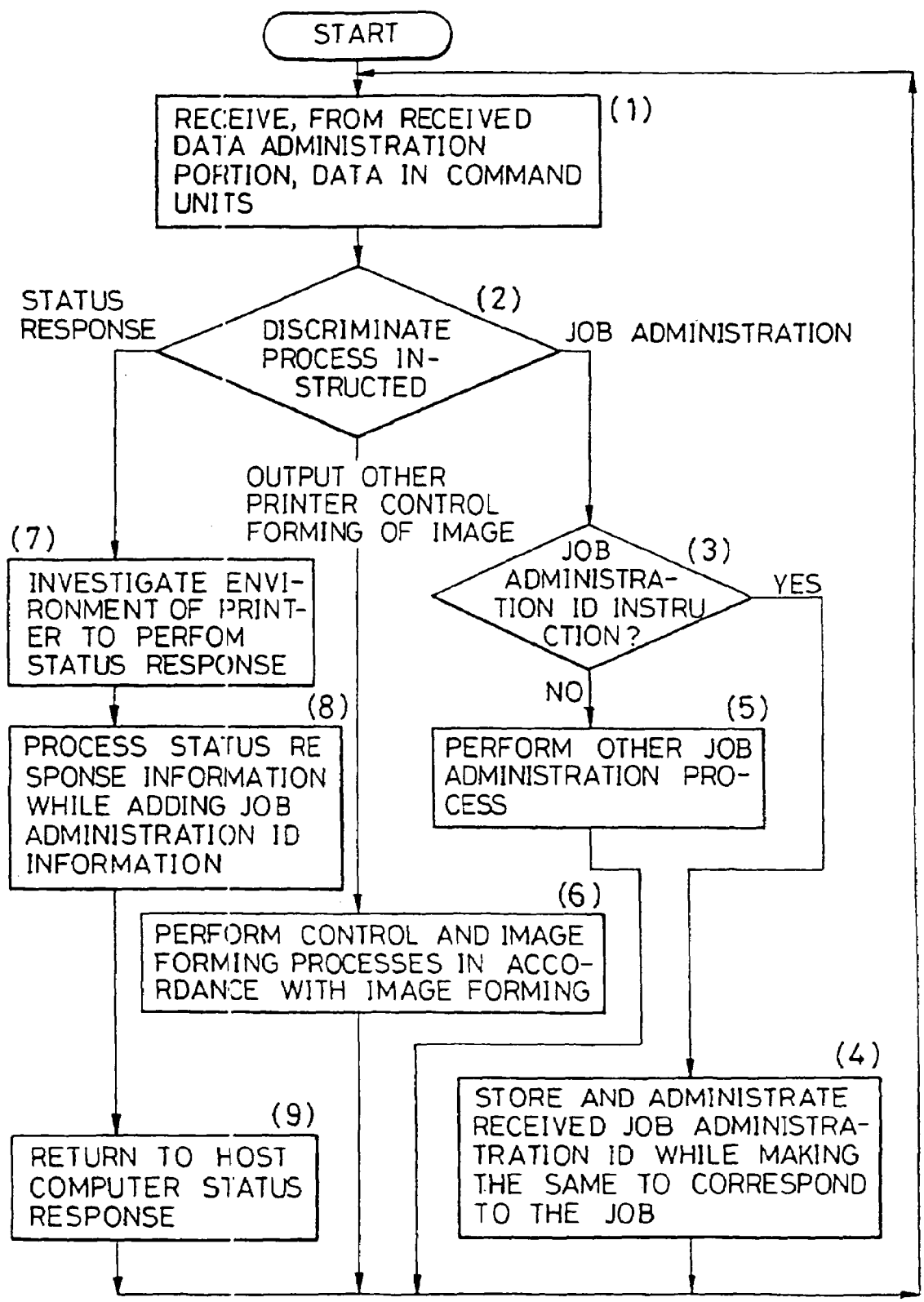
FIG. 24 is a flow chart showing the operation of a command process according to the seventh embodiment of the present invention.

FIG. 24 is a flow chart of the operation of the seventh embodiment.

The printer-language analyzing portion 4 receives data from the data-receipt administration portion 3 (step S1).

Then, the process to be performed in accordance with this command is discriminated (step S2).

If the command orders any job control, this command is communicated to the job administration portion 5 so that a corresponding job administration process is performed. Then, a discrimination is performed whether or not the command orders to specify a job-administration ID (step S3).

If the command orders to specify a job-administration ID, a discrimination is made that the specified administration ID is a job-administration ID for the job so that the foregoing job is administrated with this administration ID (step S4).

If the command does not order to specify a job-administration ID, a corresponding job administration process is performed (step S5).

If the command orders to perform any image-forming control, this command is communicated to the image-forming and output portion 6 so that a corresponding process for forming and developing characters or graphics or images is performed, and the developed image is printed out. If the command orders to control the printer apparatus 2, this command is communicated to the printer-apparatus control portion 7 so that the printer control operation is performed (step S6).

If the command orders any status response, this command is communicated to the status-response processing portion 8. The status-response processing portion 8 investigates the corresponding state of the environment of the printer apparatus 2 (step S7).

The foregoing investigation cannot immediately be performed sometimes because a large quantity of information must be searched or the state of the printer apparatus 2 has been changed or due to the timing of the operation. In the foregoing case, all processes are not interrupted, but the employed multitask method enables the foregoing investigation to be performed simultaneously with performing the other data process. Then, completion of the investigation is waited for.

After the investigation has been completed, its result is converted into status response data format information in the form of a character string or the like.

At this time, the printer apparatus 2 according to the present invention adds, to the investigation information, job-administration ID information of the job requiring the response, so as to process response data in the form of a character string or the like of a status-response data format (step S8).

The status-response data, in the form in which the job-administration ID information is added, is supplied to the data-transmission administration portion 10 so as to be stored temporarily in the transmitting buffer or the like, followed by being returned to the host computer 1 at the timing of the bidirectional interface (step S9).

The printer-language analyzing portion 4 receives a next command from the data-receipt administration portion 3 to analyze the contents of the command, followed by repeating the foregoing process.

Thus, when the host computer 1, in a printing job, issues a command for the status response and receives a status response corresponding to the command therefrom, the host computer 1 previously storing job-administration IDs assigned to printing jobs by the host computer 1 is able to refer to the job-administration ID of the job, the status response of which has been required.

Therefore, even if the status responses are not returned out of the sequential order, or even if a long time has undesirably taken to return the status response, the correspondence between the returned status response and the command for the status response can easily be discriminated. Thus, the state of the printer apparatus can reliably be detected by the host computer for each job.

As described above, when the host computer 1 issues a command for the status response and receives a status response corresponding to the command therefrom, the host computer 1 is able to refer to information of the time, at which the command for the status response has been received, as the information of the returned status response. Therefore, even if the status responses are not returned out of the sequential order, or even if a long time has undesirably taken to return the status response, the correspondence between the returned status response and the command for the status response can easily be discriminated. Thus, the state of the printer apparatus can reliably be detected by the host computer.

Figure 36:
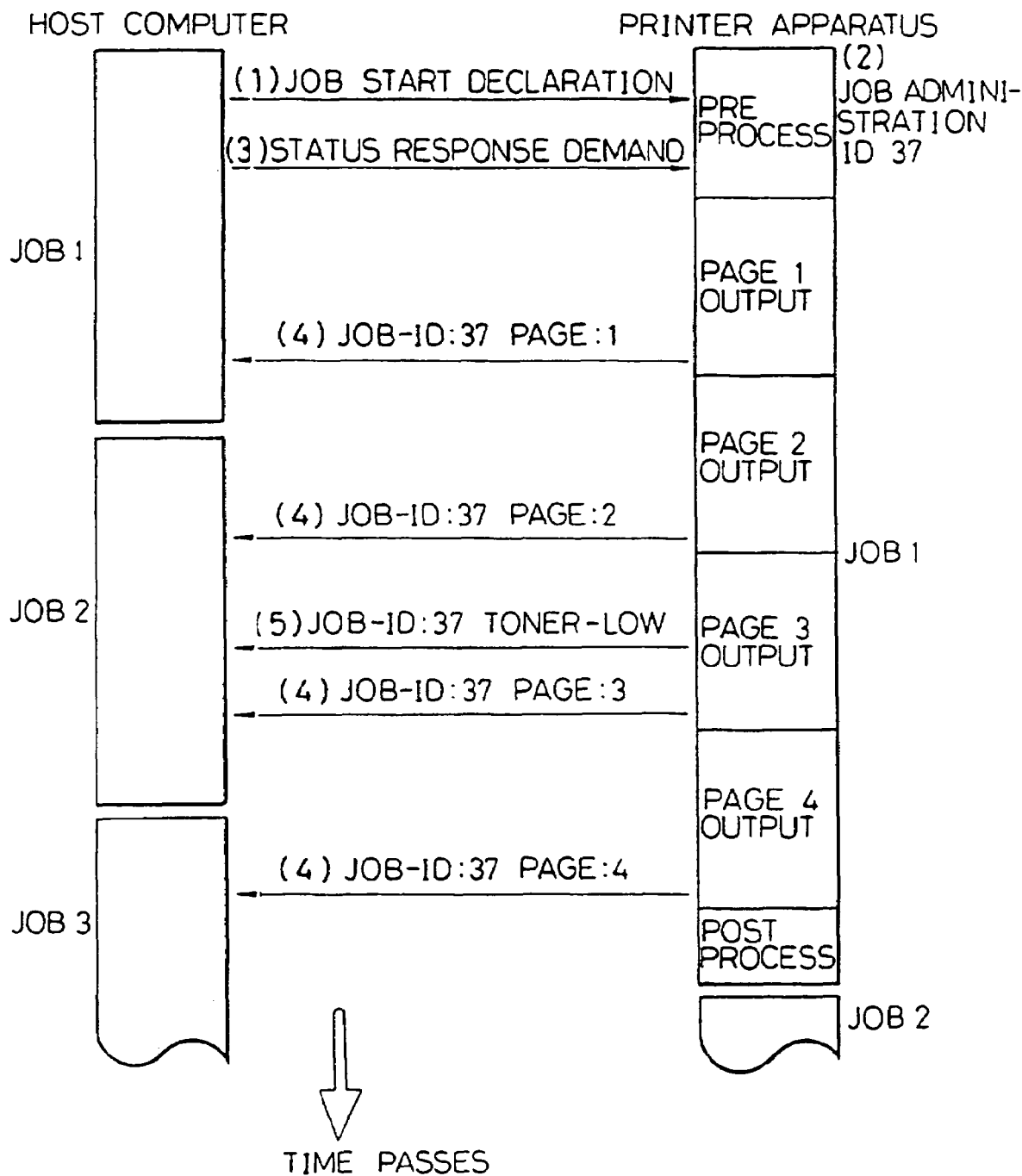
FIG. 36 is a schematic view showing an example of a status response process according to the sixth and seventh embodiments of the present invention.

As described above, the sixth and seventh embodiments have an improvement in which a job-administration ID, for identifying the job, is assigned to each job; and in which when a status response is returned in such a manner that information of the job-administration ID is added to the status response (see FIG. 36).

In an example case where a status response is returned when discharge of a page has been completed, job-administration ID is added to conventional page discharge information, for example, "STATUS JOB-ID:37 PAGE:3 FINISHED".

As a result, even if a next Job is being processed when, for example, a third page has been discharged, and a corresponding status response has been supplied to the host computer 1, reference to the job-administration ID enables a discrimination to be performed that the "discharge of the third page" is the discharge of the "third page" of the "Job 1".

Figure 37:
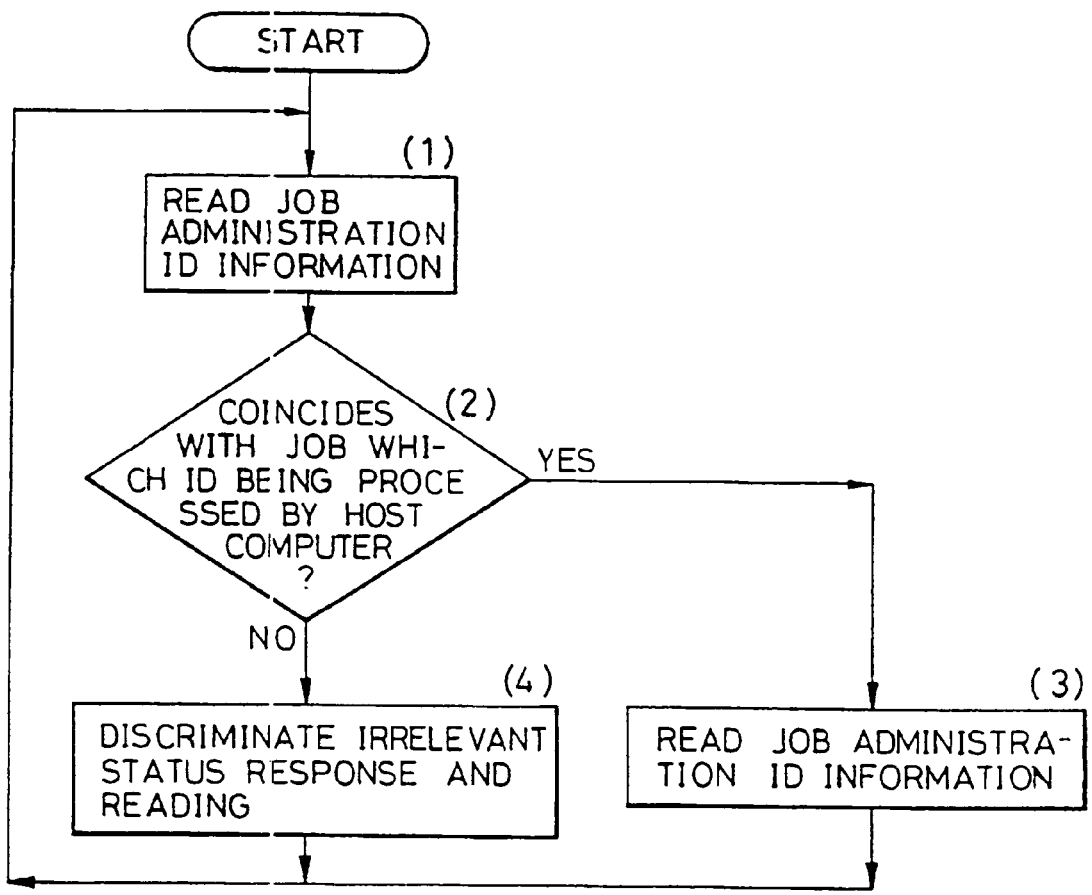
FIG. 37 is a flow chart showing the operation of a status response process in the host computer according to the sixth and seventh embodiments of the present invention.

When the host computer 1 has received a status response in which a job-administration ID is added, the host computer 1 performs the following process. FIG. 37 is a flow chart of the process to be performed in the foregoing case.

Initially, the added job-administration ID information is read from information of the status response (step S1).

A checking is performed as to whether or not the added job-administration ID coincides with the job-administration ID of the job, which is being processed by the host computer 1 (step S2).

If they coincide with each other, a discrimination is made that the information returned in the status response relates to the job, which is being performed, and this information is used (step S3).

If they do not coincide with each other, a discrimination is made that the status response is a status response for another job and the status response does not relate to the job, which is being performed by the host computer 1, and this status response is ignored (step S4).

Then, the operation proceeds to a process of a next status response.

As described above, a reference to a job-administration ID information is performed; a discrimination is performed as to whether or not the status response relates to the job, which is being performed; and if the status response does not relate to the job, which is being performed, then it is ignored. Thus, the host computer is able to prevent an erroneous judgment because of receipt of information, which does not relate to the present process. Furthermore, performing of wasteful process, that is performed due to non-required information, can be prevented.

If a colorant, such as toner or ink, for use in printing in a conventional printer apparatus is consumed in the printing operation to a degree that an image cannot be formed sufficiently, continuation of the printing operation causes the toner to run short. Thus, the formed image blurs, and therefore a clear print cannot be produced.

Since a printed product becomes wasteful in the foregoing case, a status response is sometimes transmitted to the host computer in order to issue a caution. For example, a status response, such as "STATUS TONER-LOW", is returned to the host computer 1 (see process (5) of FIG. 36).

When the host computer 1 has received the foregoing status response, the printing operation is temporarily stopped to prevent following printing operation from being useless, and a message for supplying toner is displayed on the screen of the computer or the like to cope with this state.

In the sixth and seventh embodiments, the job-administration ID is used to discriminate whether or not the subject status response relates to the present job. If the status response does not relate to the present job, the response is ignored to improve the process efficiency.

In the foregoing case of toner shortage, expression, such as "STATUS JOB-ID: 37 TONER-LOW", is performed (see process (6) of FIG. 36).

The foregoing status response is discriminated to be a response corresponding to the job, whose job-administration ID is "37" so that reference is performed in the process of the Job 1, but no reference is performed in the processes of the Jobs 2 and 3.

The foregoing phenomenon, the toner shortage, is critical that deteriorates the result of the printing operation of the present job, which is being performed, and following printing operations.

Although information of this must therefore be communicated to other jobs except the printing job, which is being performed, the information has been ignored.

Since discrimination of the job-administration ID information causes all status responses, that do not relate to the present job, to be ignored, even if important information affecting the ensuing printing job is included in the response, it is not sometimes transmitted.

Eighth and ninth embodiments, structured to prevent the foregoing problem, will now be described.

Eighth Embodiment

Figure 27:
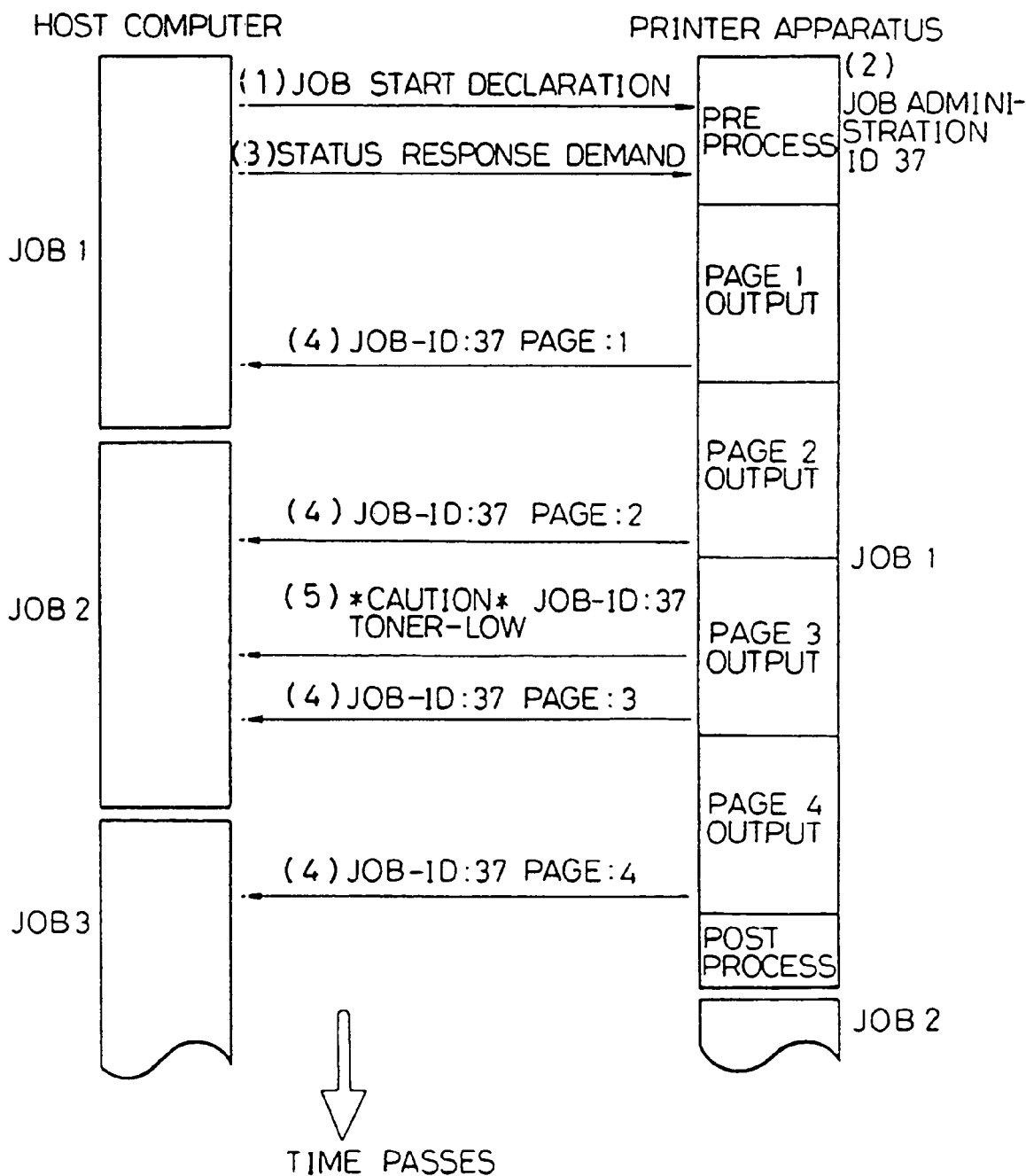
FIG. 27 is a schematic view showing an improved status response process according to an eighth embodiment of the present invention.

FIG. 27 is a diagram showing an example of a status response according to an eighth embodiment.

An assumption is made here that a first job 1 has been sent from the host computer 1 to the printer apparatus 2 (process 1).

The printer-language analyzing portion 4 analyzes the supplied job data in command units. If the printer-language analyzing portion 4 has received a job start declaration, it transmits the job start declaration to the job administration portion 5.

The job administration portion starts job administration in accordance with the transmitted job start declaration, and administrates each job while adding job-administration ID information to the job (process 2).

The job-administration ID information for use in this process may be information sent from the host computer 1 together with the job start declaration, or may be information automatically assigned by the printer apparatus 2.

The job-administration ID information must be capable of identifying the respective jobs, and the same job-administration ID for the same job must be used between the printer apparatus and the host computer regardless of the form of the job-administration ID.

For example, administration is performed such that a job-administration ID assigned to the first Job 1 is "37", that assigned to the second Job 2 is "38" and that assigned to the third Job 3 is "39".

Then, the host computer 1 requires status response of various information of the printer apparatus 2 (process (3)).

The foregoing status responses are classified into status, such as information about the available paper size, that can be immediately returned; status, such as the state of the printer, that changes always and that must be returned whenever the change occurs; status, such as the page discharge state, that must be responded while waiting for completion of the process by the printer engine.

Therefore, status responses are sometimes returned to the host computer 1 after a long time has passed from the receipt of a command for the status response.

Therefore, a case will occur frequently where the first Job 1 has been completed in the host computer 1, and the next Job 2 has started.

Accordingly, the status-response processing portion 8 returns the status response information to the host computer 1 while adding the administration ID information assigned to each job to the status response information (process (4)).

An assumption is made here that the third page has been printed out during a process of output data in the Job 1. If a status of the page discharge has been required from the host computer 1, information about completion of the discharge of the third page must be communicated to the host computer 1.

At this time, the status-response processing portion 8 adds, to the page discharge information, administration ID "37" of the Job 1 so that the information is expressed by a character string or the like, such as "STATUS JOB-ID: 37 PAGE:3 FINISHED", and the information is transmitted to the host computer 1.

The host computer 1 subjects, to a comparison, the job administration ID added to the conventional status response and the present job-administration ID, assigned to each job-administration ID. Thus, the host computer 1 is able to discriminate easily the job data in which the returned status response has been generated.

When the status response is issued, the status-response processing portion 8 discriminates whether or not the "page discharge information" is important information that must be communicated to jobs except the Job 1.

The page discharge information is used to notify the page of the job, which has been output, and is a meaning information for the subject job, but is not important for other jobs.

Therefore, the status-response processing portion 8 does not add information indicating importance to the foregoing status response.

As a result of the process performed by the status response processing portion 8, status response, such as "STATUS JOB-ID:37 PAGE:3 FINISHED", is transmitted to host computer 1.

The host computer 1 is able to discriminate that the page discharge information relates to the page discharge having job-administration ID "37" in accordance with information "STATUS JOB-ID:37 PAGE:3 FINISHED".

Also a fact can be detected that the foregoing status response is a response peculiar to the job having the administration ID "37".

As a result of the discrimination performed by the host computer 1, the job-administration ID "37", assigned to the Job 1 at the time of start of the Job 1, and the ID, added to the status response, coincide with each other. Therefore, the status response is a status response generated due to data in Job 1.

Furthermore, the status response does not coincide with the job-administration ID "38" of the Job 2, which is being performed by the host computer 1. Therefore, a fact can be detected that the status response is a peculiar response for another job.

Therefore, the foregoing status response does not relate to the Job 2, and whose contents are not required to be analyzed, and corresponding process is not required to be performed. Thus, the foregoing status response is ignored.

An assumption is made here that any problem, such as toner shortage, takes place during output of the third page.

If toner shortage takes place, an image of satisfactory quality cannot be formed and the produced output print becomes wasteful.

In order to quickly overcome the foregoing problem, the printer apparatus 2 transmits a status response of a caution of toner shortage to the host computer 1 (process 5).

When the foregoing status response is issued, the status-response processing portion 8 according to the present invention discriminates whether or not "toner-shortage caution information" is an important information that must be communicated to other jobs as well the Job 1.

The toner shortage caution is an important status response that also relates to forming of images in other jobs to be processed later.

Therefore, the status-response processing portion 8 adds information indicating importance to the foregoing status response.

For example, the status-response processing portion 8 adds, for example, a character string "*CAUTION*".

As a result of the process performed by the status-response processing portion 8, a status response, such as "STATUS *CAUTION* JOB-ID:37 TONER-LOW", is transmitted to the host computer 1.

The host computer 1 is able to recognize that the toner shortage has taken place during the job having the job administration ID "37" and it is an important information also relating to other jobs in accordance with the sent status response.

As a result of the discrimination performed by the host computer 1, the foregoing status response is analyzed in all jobs, which are being performed by the host computer 1, and required coping operations are performed.

Since information indicating the status response is an important status response is added so as to be discriminated, information relating to all jobs is not ignored but can be transmitted.

Figure 28:
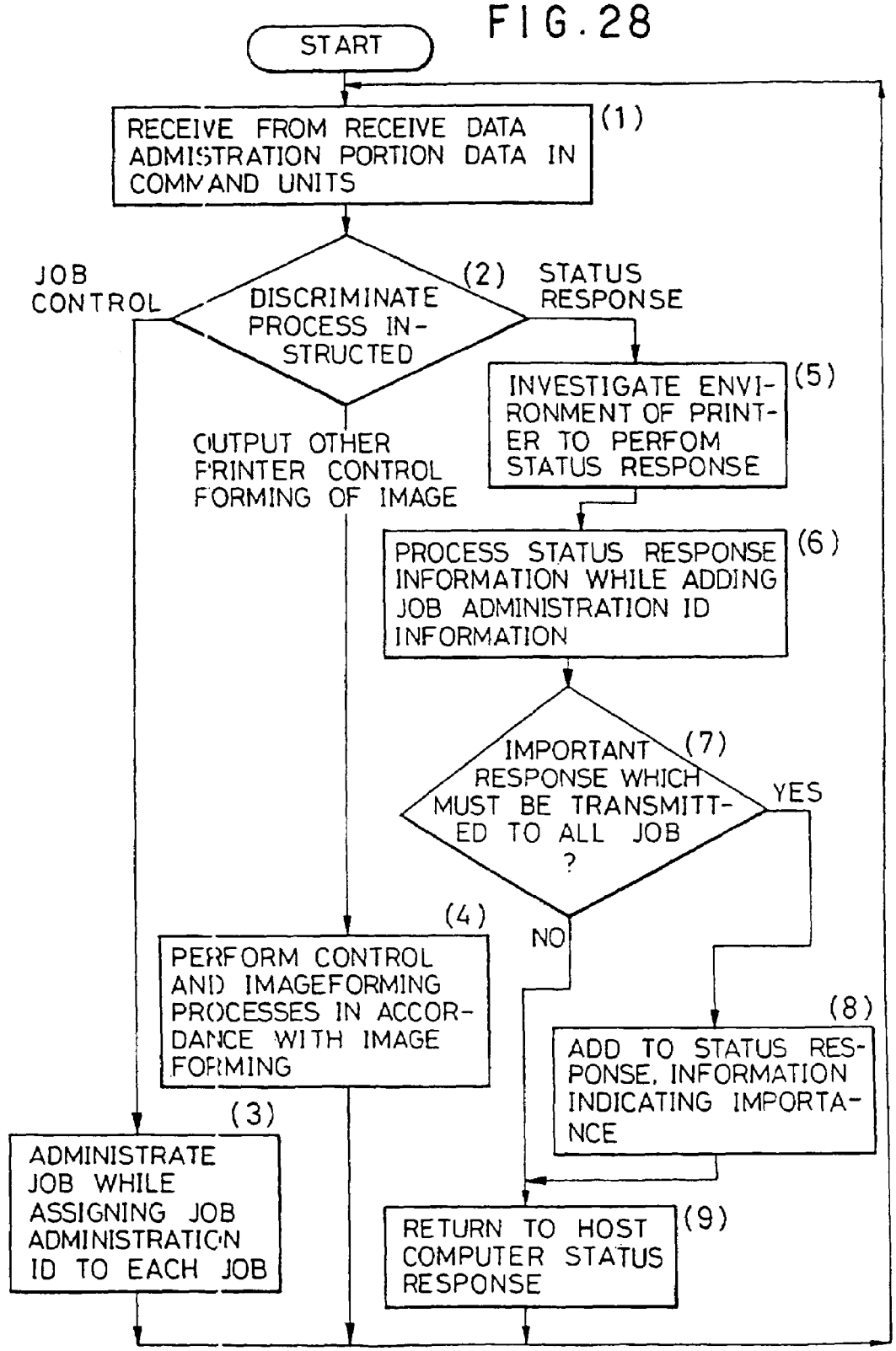
FIG. 28 is a flow chart showing the operation of a command process in a printer apparatus according to the eighth embodiment of the present invention.

FIG. 28 is a flow chart of the operation according to the present invention in which the printer-language analyzing portion 4 processes data in command units to perform job processing processes, image forming processes, control processes and status-response processes.

The printer-language analyzing portion 4 receives data from the data-receipt administration portion 3 (step S1).

Then, the process to be performed in accordance with the issued command is discriminated (step S2).

If the command instructs any job control operation, this command is transmitted to the job administration portion 5 so that a corresponding job control process is performed.

The job administration portion 5 administrates jobs in such a manner that job-administration IDs are assigned to respective printing jobs (step S3).

If any image forming control is instructed, this command is transmitted to the image-forming and output portion 6 so that processes for forming and developing images, such as characters, graphics and images are performed, and the images are printed out. If any printer-control operation is instructed, this command is transmitted to the printer-apparatus control portion 7 so that a corresponding printer control operation is performed (step S4).

If the command orders any status response, this command is transmitted to the status-response processing portion 8. The status-response processing portion 8 investigates a corresponding environment of the printer apparatus 2 (step S5).

The foregoing investigation cannot immediately be performed sometimes because a large quantity of information must be searched or the state of the printer apparatus 2 has been changed or due to the timing of the operation. In the foregoing case, all processes are not interrupted, but the employed multitask method enables the foregoing investigation to be performed simultaneously with performing the other data process. Then, completion of the investigation is waited for.

After the investigation has been completed, a result of it is converted into status response data format information, such as a character string.

The status-response processing portion 8 adds information of the job-administration ID of the job, which has required the foregoing response, to information of the result of the investigation so as to process response data in the form of a character string or the like having a status-response data format (step S6).

Then, the status-response processing portion 8 discriminates whether the foregoing status response is not peculiar to the subject job, but is an important response relating to all jobs (step S7).

If the status response is an important response relating to all jobs, the status-response processing portion 8 adds information indicating importance to the foregoing status response (step S8).

The information is expressed by using, for example, a character string "*CAUTION*" according to the foregoing embodiment.

The status response data in the form, in which the job-administration ID information and information indicating importance are added, is transmitted to the data-transmission administration portion 10, followed by being temporarily stored in a transmitting buffer or the like. Then, the status response data is returned to the host computer 1 at the timing of the bidirectional interface (step S9).

The printer-language analyzing portion 4 receives a next command from the data-receipt administration portion 3 to analyze the command and repeat the foregoing process.

Figure 29:
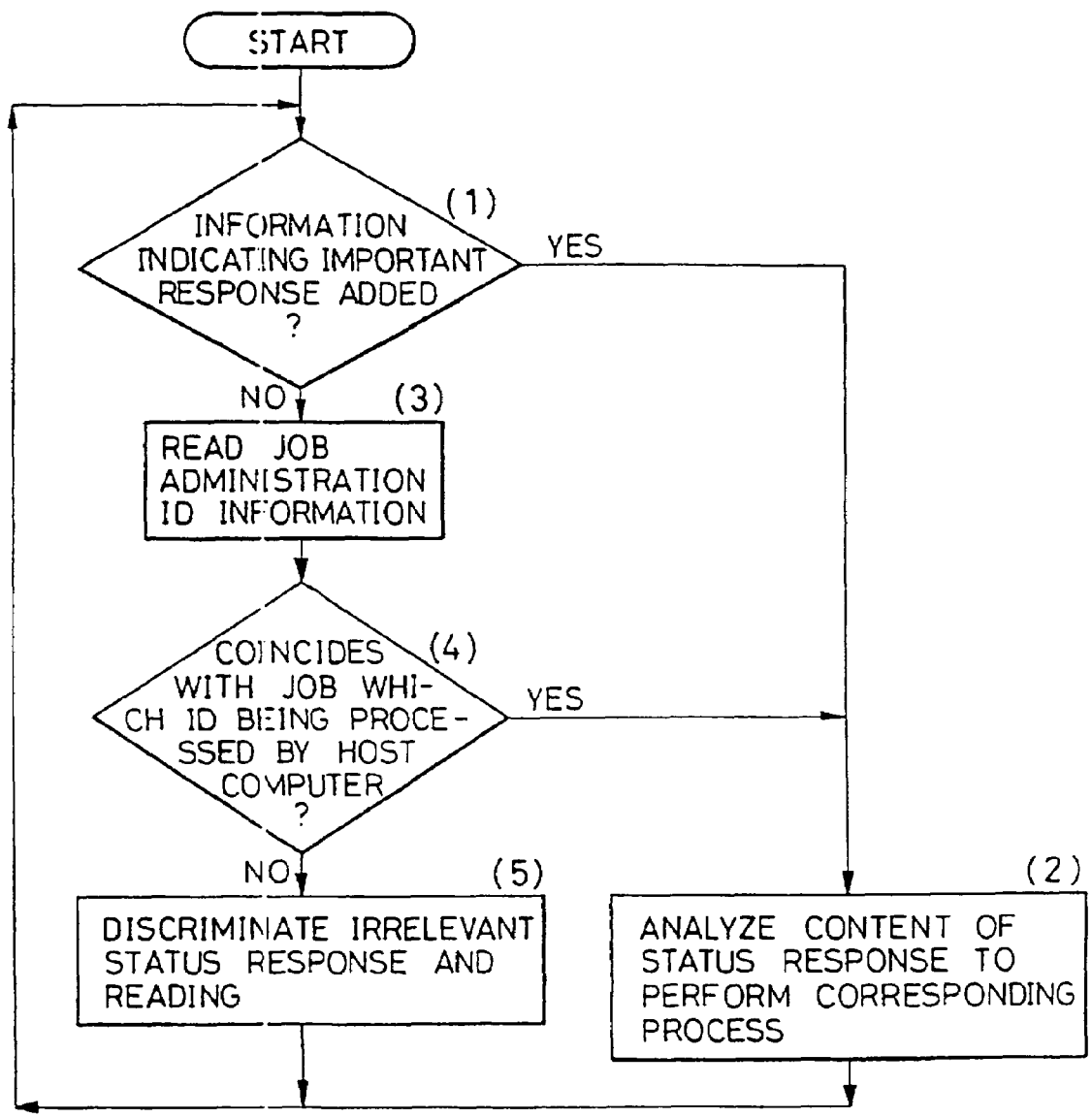
FIG. 29 is a flow chart showing the operation of the host computer according to the eighth embodiment of the present invention.

FIG. 29 is a flow chart showing the process to be performed by the host computer 1 according to the present invention.

When a status response is received from the printer apparatus 2, a discrimination is performed whether or not information indicating importance is added (step S1).

If information indicating importance is added, a discrimination is performed that the status response is an important information relating to all jobs, and the contents of the status response are analyzed, followed by performing corresponding processes (step S2).

If information indicating importance is not added, a discrimination is performed that the foregoing status response is information peculiar to a job.

Then, job-administration ID information added to the status response is read from information of the status response (step S3).

Then, a discrimination is performed as to whether or not the read job-administration ID coincides with the job-administration ID of the job which is being performed by the host computer 1 (step S4).

If they coincide with each other, a discrimination is performed that information returned as the foregoing status response relates to the job, which is being performed. Thus, the contents of the status response are analyzed and corresponding process is performed (step S2).

If they do not coincide with each other, a discrimination is performed that the foregoing status response is a status response for another job and it does not relate to the job, which is being performed by the host computer 1. Thus, the foregoing status response is ignored (step S5).

Then, the following status response process is performed.

Thus, references to job-administration ID information and information indicating importance are performed to discriminate whether or not the response relates to the job, which is being performed; if it relates the job, which is being performed, then the foregoing information is used; if it does not relate to the job, it is ignored. Therefore, the host computer is able to easily receive only required information to perform the printing process while appropriately recognizing the state of the printer apparatus.

As a result, when the host computer 1, in a printing job, issues a command for the status response and receives a status response corresponding to the command therefrom, the host computer 1 is able to recognize job-administration ID previously assigned to the printing job and stored in the printer apparatus; is able to refer to the job-administration ID information of the job, which has demanded a response, as information of the returned status response; and is able to refer to information indicating that the response is an important status response relating to all jobs. Therefore, even if a long time has undesirably passed to return of the status response, and timing delay takes place from the job process performed by the host computer, the correspondence between the returned status response and the command for the status response in the job can easily be discriminated.

Furthermore, a discrimination can easily be performed as to whether or not the subject status response is an important status response relating to all jobs. Therefore, the state of the printer apparatus can reliably be recognized by the host computer.

Ninth Embodiment

A ninth embodiment of the present invention will now be described with reference to the drawings.

In this embodiment, in a case where the subject status response does not relate to all jobs, but is peculiar to each job, information indicating, that the status response is peculiar to each job, is added to the status response, followed by transmitting the status response to the host computer 1.

Figure 30:
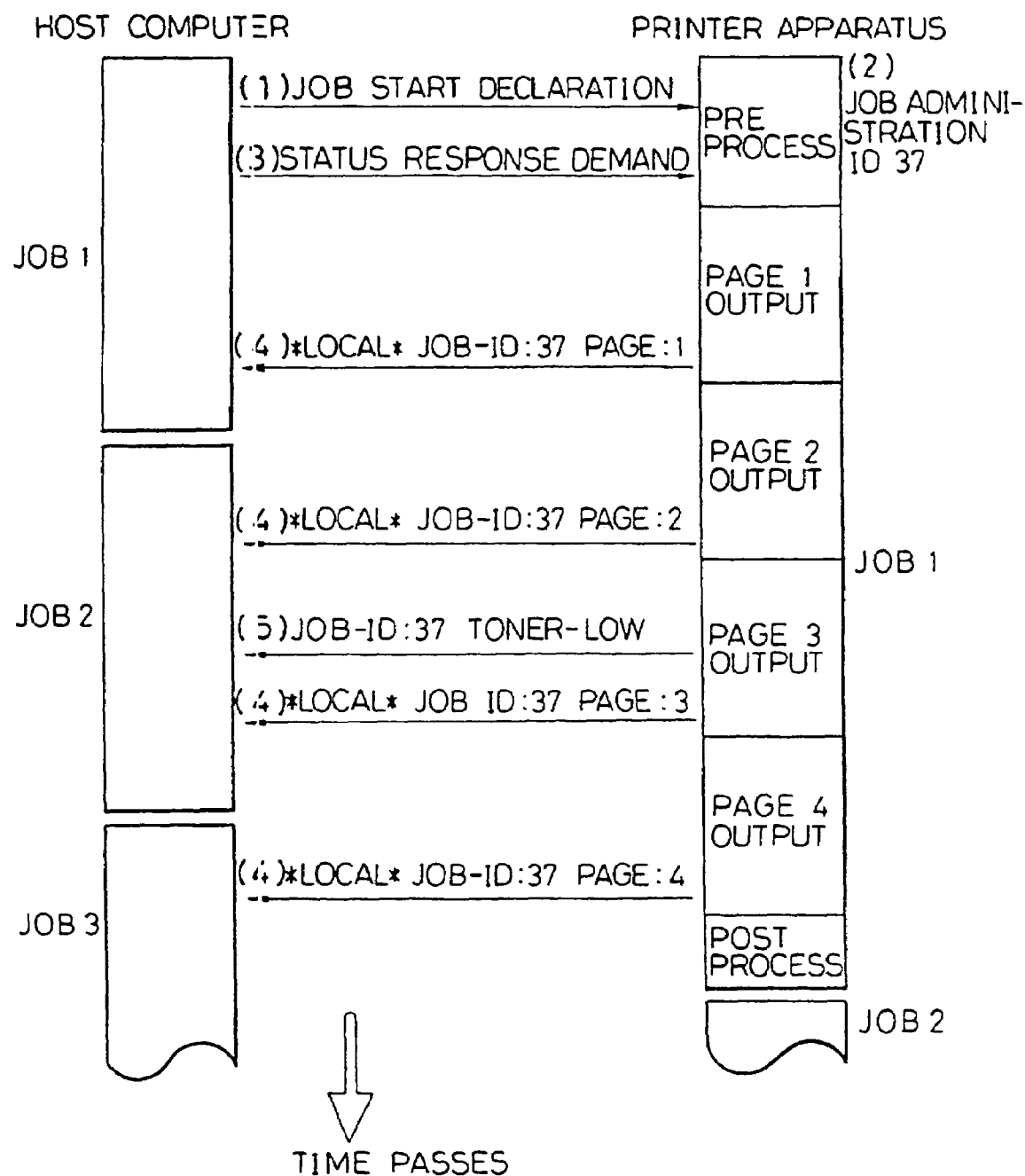
FIG. 30 is a schematic view showing an improved status response process according to a ninth embodiment of the present invention.

The flow of the process will now be described with reference to FIG. 30.

The status-response processing portion 8 checks the contents of a status response, which is intended to be returned, to perform a discrimination as to whether or not the subject response is peculiar to each job.

For example, a status response indicating the page discharge state in each job is information peculiar to each job, and is not important for other jobs.

Therefore, the status-response processing portion 8 adds information, indicating that the status response is peculiar to each job, to the status response.

For example, a character string "*LOCAL*" is added to express the information by a character string "STATUS *LOCAL* JOB-ID:37 PAGE:3 FINISHED", followed by transmitting the information to the host computer 1 (process S4).

For example, a status response, such as "toner shortage caution information" is important information relating to all jobs.

In the foregoing case, information indicating that the status response is peculiar to each job is not added.

For example, a status response, such as "STATUS JOB-ID:37 TONER-LOW", is transmitted to the host computer 1.

Figure 31:
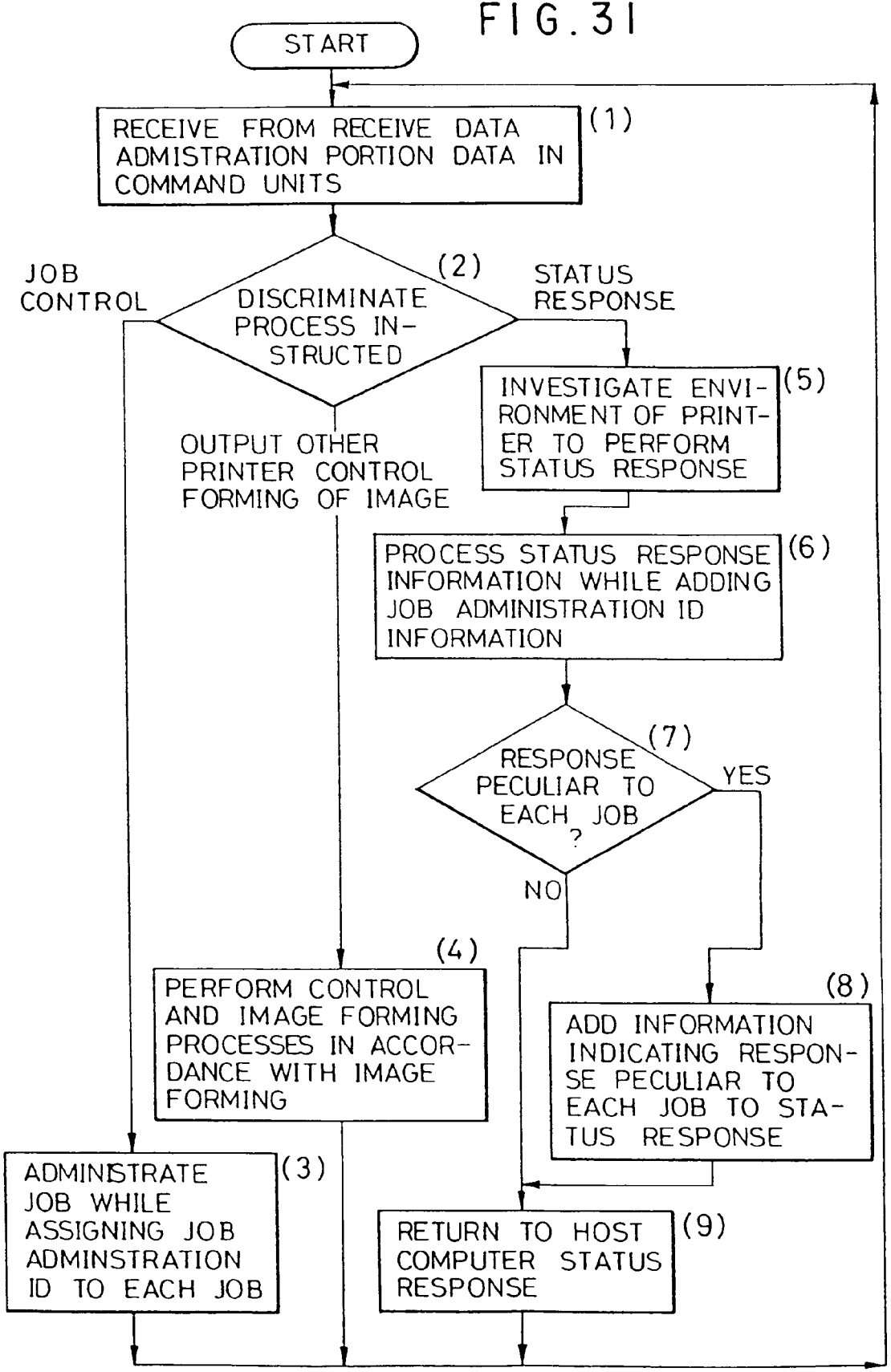
FIG. 31 is a flow chart showing the operation of a command process according to the ninth embodiment of the present invention.

FIG. 31 is a flow chart showing the operation of a printer apparatus according to the ninth embodiment.

Since steps (1) to (6) are the same as those according to the first embodiment, they are omitted from description.

The status-response processing portion 8 discriminates whether or not the subject status response is peculiar to each job (step S7).

If the status response is peculiar to each job, information indicating the response is peculiar to each job to the job is added to the status response data (step S8).

The information is, for example, a character string "*LOCAL*" as described in the foregoing embodiment.

The status response data in the form, in which the job-administration ID information and information indicating that the status response is peculiar to each job are added, is transmitted to the data-transmission administration portion 10, followed by being temporarily stored in a transmitting buffer or the like. Then, the status response data is returned to the host computer 1 at the timing of the bidirectional interface (step S9).

The printer-language analyzing portion 4 receives a next command from the data-receipt administration portion 3, analyzes the contents of the supplied command, and repeats the foregoing process.

Figure 32:
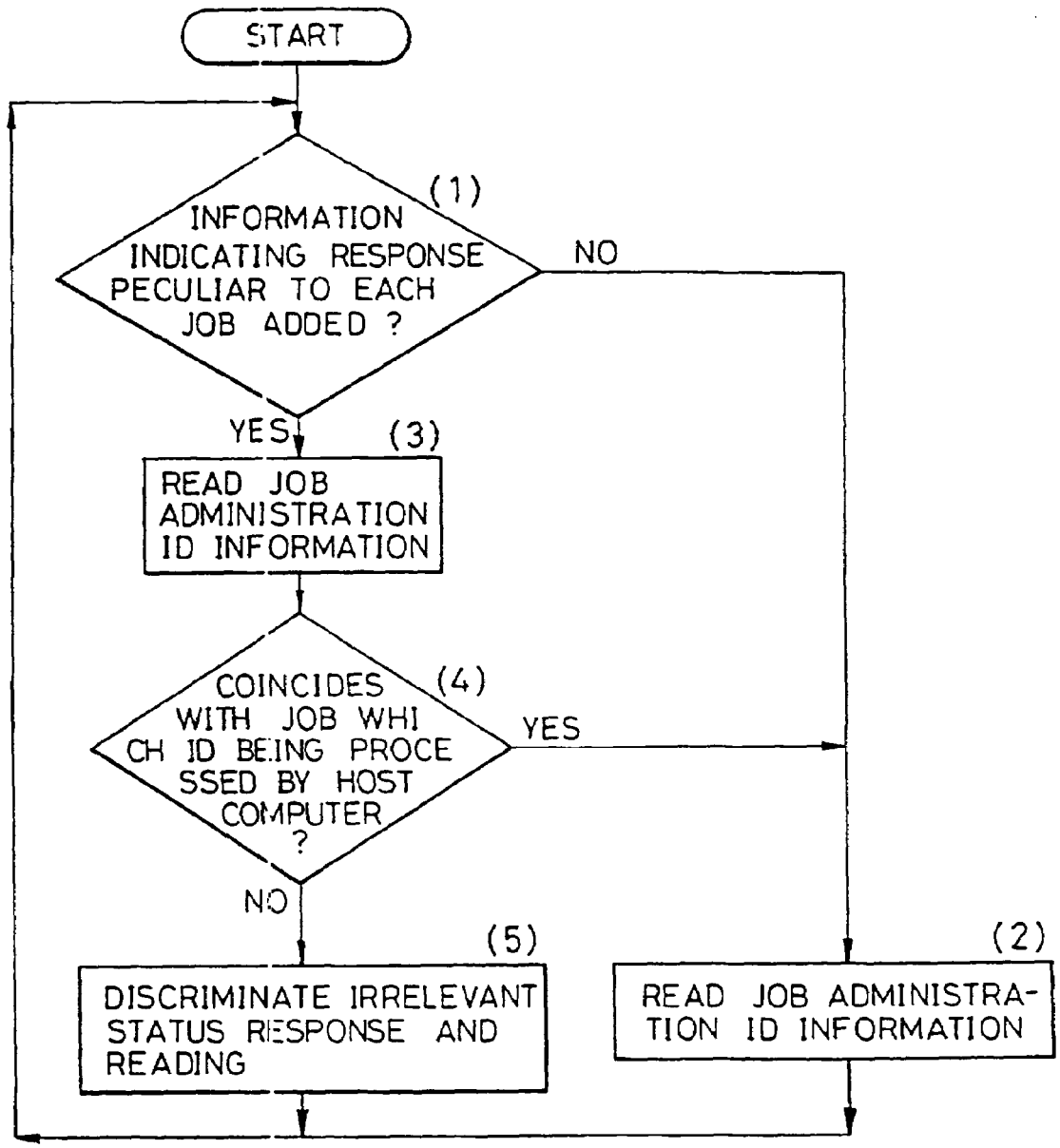
FIG. 32 is a flow chart showing the operation of the process of the host computer according to the ninth embodiment of the present invention.

FIG. 32 is a flow chart showing the operation to be performed by the host computer 1 according to the present invention.

When the host computer 1 receives the status response, the host computer 1 checks whether or not information indicating that the subject status response is peculiar to each job is added to the status response (step S1).

If information indicating that the subject status response is peculiar to each job is added, job-administration ID information is examined (step S2).

If the job-administration ID information coincides with the job-administration ID of the job, which is being performed by the host computer 1, then the contents of the status response are analyzed to perform a corresponding process (step S3). If they do not coincide with each other, the foregoing status response is ignored (step S4).

If information indicating that the subject status response is peculiar to each job is not added, a discrimination is performed that the subject status response is important information relating to all jobs, and the contents of the status response are analyzed so that a corresponding process is performed (step S5).

As described above, information indicating that the subject status response is peculiar to each job is added, and it is discriminated so that status responses, which do not relate to the subject status response, are skipped in reading. Thus, the process efficiency can be improved while performing reference to important information relating to all jobs.

Tenth Embodiment

A tenth embodiment of the present invention will now be described with reference to the drawings.

In this embodiment, if the subject status response is an important response relating to all jobs, information indicating importance is added. If the subject status response is peculiar to each job, information indicating that the subject status response is peculiar to each job is added, followed by transmitting the status response to the host computer 1.

Figure 33:
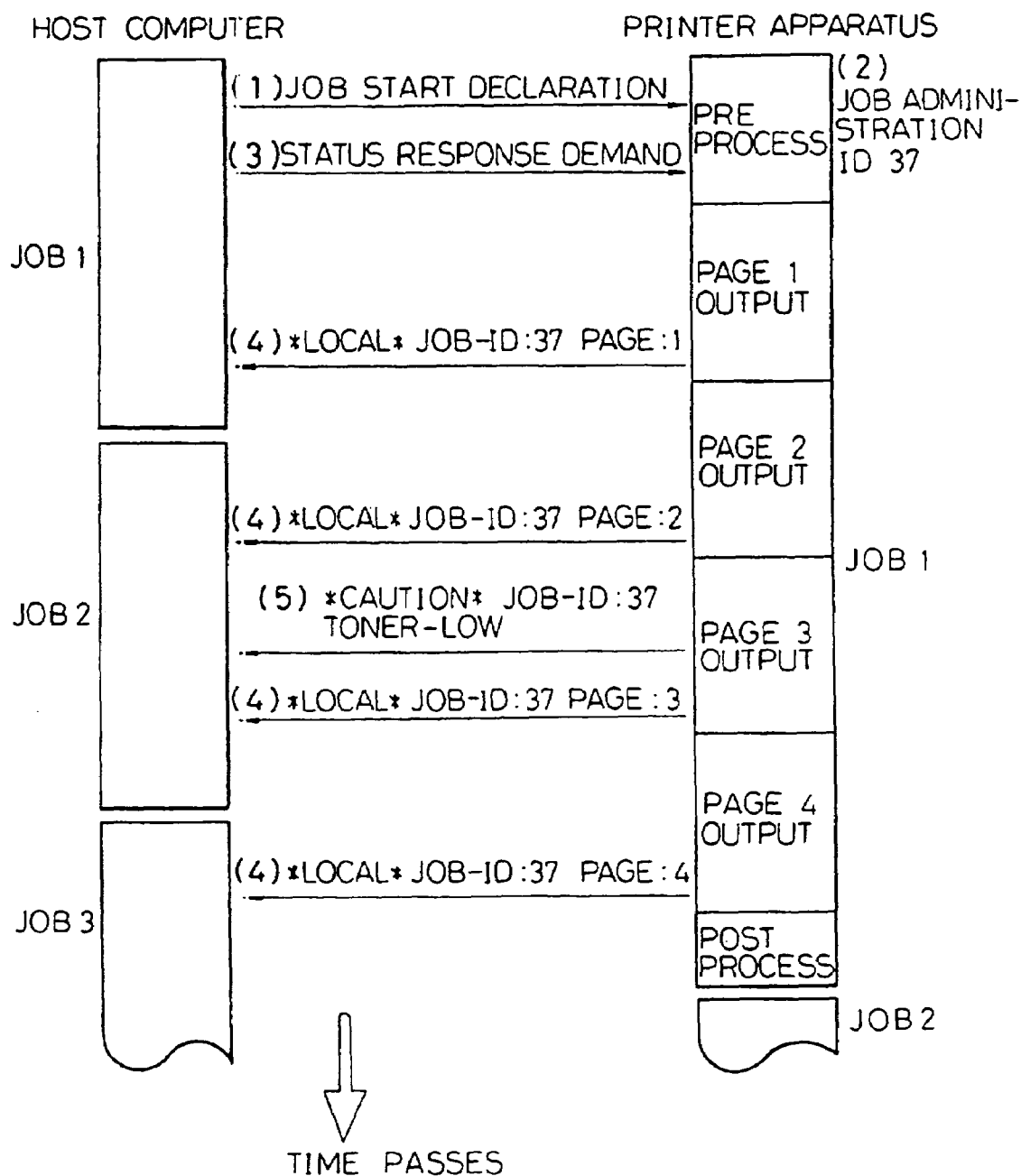
FIG. 33 is a schematic view showing an improved status response process according to a tenth embodiment of the present invention.

The flow of the process will now be described with reference to FIG. 33.

The status-response processing portion 8 checks the contents of the status response intended to be returned to discriminate that the response is an important response relating to all jobs or is peculiar to each job.

For example, the status response, indicating the page discharge state in each job, is information peculiar to each job, but is not important for other jobs.

Accordingly, the status-response processing portion 8 adds, to the foregoing status response, information indicating that the subject status response is peculiar to each job.

For example, a character string, such as "*LOCAL*", is added to express the information by a character string, such as "STATUS *LOCAL* JOB-ID:37 PAGE:3 FINISHED", followed by transmitting the information to the host computer 1 (process S4).

For example, a status response, such as "toner shortage caution information" is important information relating to all jobs.

Therefore, the status-response processing portion 8 adds, to the foregoing status response, information indicating that the subject status response is an important response relating to all jobs.

For example, a status response, such as "STATUS *CAUTION* JOB-ID:37 TONER-LOW", formed by adding a character string, such as "*CAUTION*", is transmitted to the host computer 1.

Figure 34:
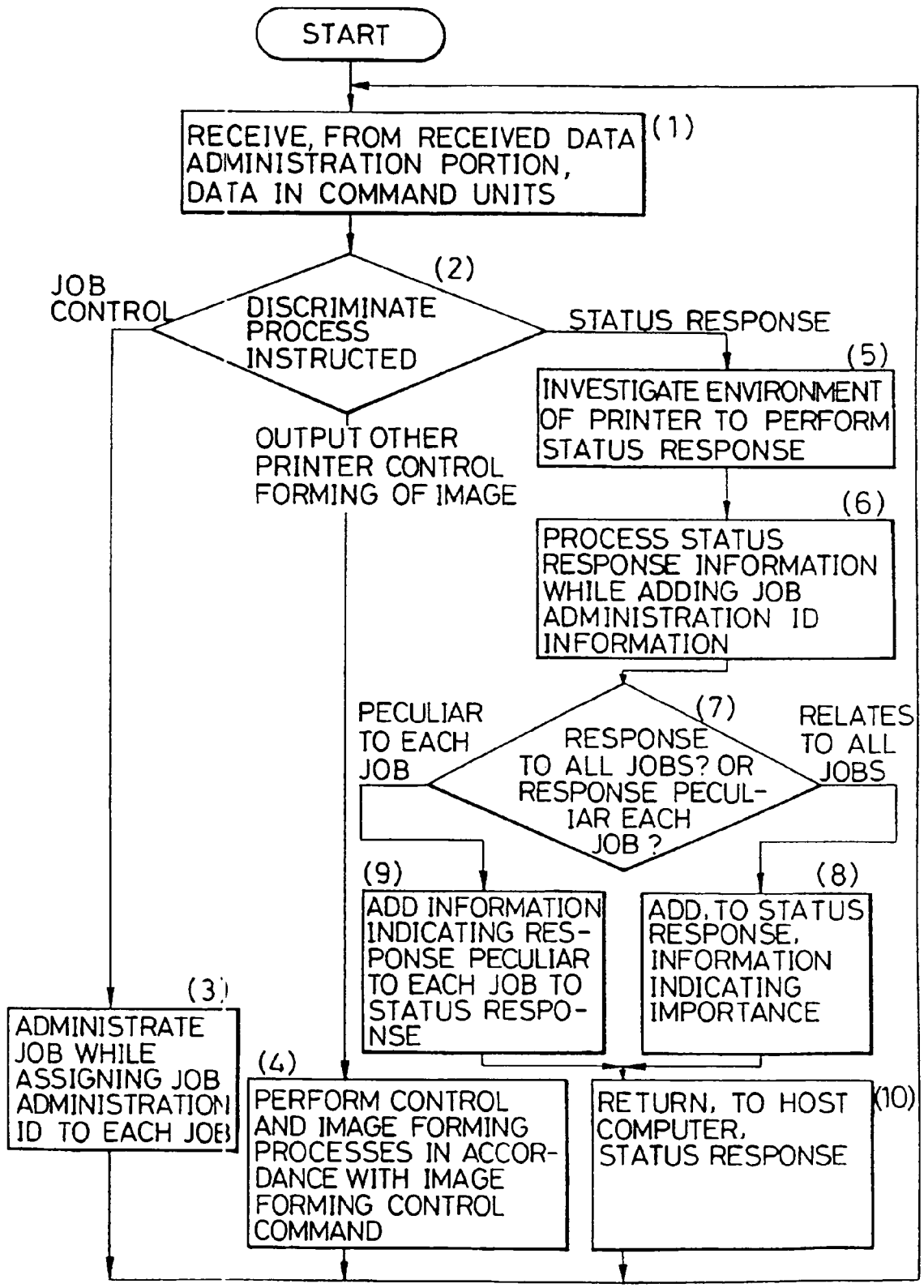
FIG. 34 is a flow chart showing the operation of a command process according to the tenth embodiment of the present invention.

FIG. 34 is a flow chart of the operation of the printer apparatus according to this embodiment.

Since steps (1) to (6) are the same as those according to the eighth embodiment, they are omitted from illustration.

The status-response processing portion 8 discriminates that the subject status response is an important response relating to all jobs or the same is peculiar to each job (step S7).

If the subject status response is an important response relating to all jobs, information, indicating that the status response is an important response relating to all jobs, is added to the foregoing status response (step S8).

The foregoing information is a character string, for example "*CAUTION*", as described in the foregoing embodiment.

If the subject status response is peculiar to each job, information indicating that the subject status response is peculiar to each job is added to the status response data (step S9).

Status response data, in the form in which the job-administration ID information and information indicating the subject status response is an important response relating to all jobs or information indicating that the subject status response is peculiar to each job, is transmitted to the data-transmission administration portion 10. Then, the status response data is temporarily stored in a transmitting buffer or the like, followed by being returned to the host computer 1 at the timing determined by the bidirectional interface (step S10).

The printer-language analyzing portion 4 receives a next command from the data-receipt administration portion 3, analyzes the contents of the same, and repeats the foregoing process.

Figure 35:
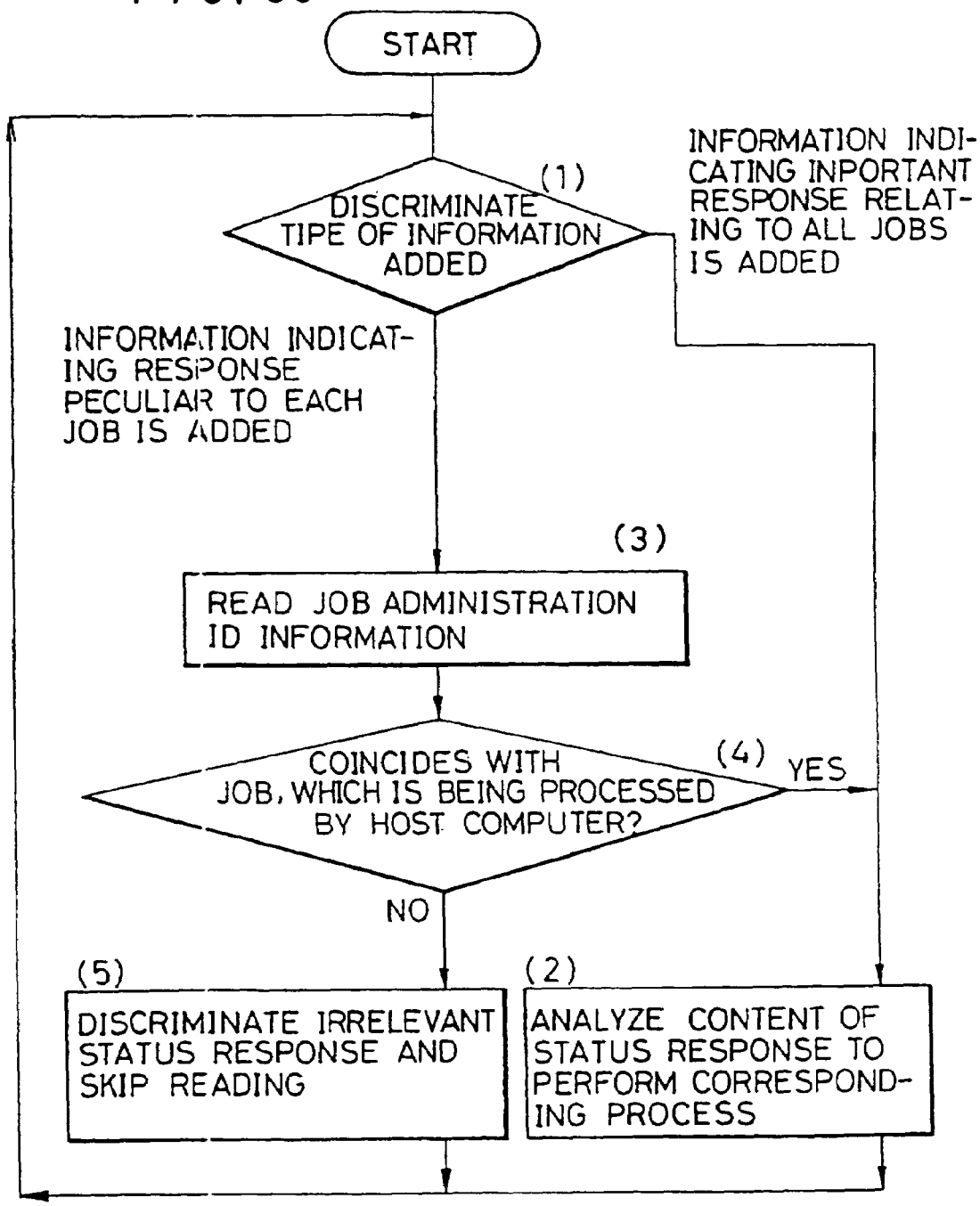
FIG. 35 is a flow chart showing the operation of the host computer according to the tenth embodiment of the present invention.

FIG. 35 is a flow chart showing the process to be performed by the host computer 1 according to the present invention.

When the host computer 1 receives the status response, the host computer checks that the information relating to all jobs or information indicating that the subject status response is peculiar to each job is added (step S1).

If the status response is peculiar to each job, its job-administration ID information is examined (step S2).

If the job-administration ID information coincides with the job-administration ID of the job, which is being performed, the contents of the status response is analyzed so that a corresponding processing is performed (step S3). If they do not coincide with each other, the foregoing status response is ignored (step S4).

If the subject status response relates to all jobs, its contents are analyzed regardless of whether or not the difference from the administration ID of the job, which is being performed by the host computer 1 so that a corresponding process is performed (step S5).

As described above, information indicating that the subject status response relates to all jobs, or information indicating that the subject status response is peculiar to each job, is added so as to be discriminated. Thus, the status responses, that do not relate to the subject job, are skipped in reading. As a result, the process efficiency can be improved, and reference can be made to important information relating to all jobs.

As described above, according to the eighth and ninth embodiments, when the host computer has issued, in a printing job, a command for the status response and has received a corresponding status response, the host computer is able to recognize the job-administration ID assigned to the printing job and stored in the printer apparatus; the host computer is able to refer to the job-administration ID information of the job, which has required the response, as information of the returned status response; and reference can be made to information indicating that the subject status response is an important status response relating to all jobs or information indicating that the subject status response is peculiar to each job. Therefore, even if a long time has undesirably taken to return the status response and therefore timing delays from that of the job, which is being performed by the host computer, the correspondence between the status response and the return of the command for the status response of the job can easily be discriminated. Furthermore, a discrimination can easily be performed that the subject status response is an important status response relating to all jobs or the same is a status response that may be skipped in reading because it is peculiar to each job. Therefore, the state of the printer apparatus can reliably be recognized by the host computer.

Eleventh Embodiment

An eleventh embodiment of the present invention will now be described with reference to the drawings.

Figure 38:
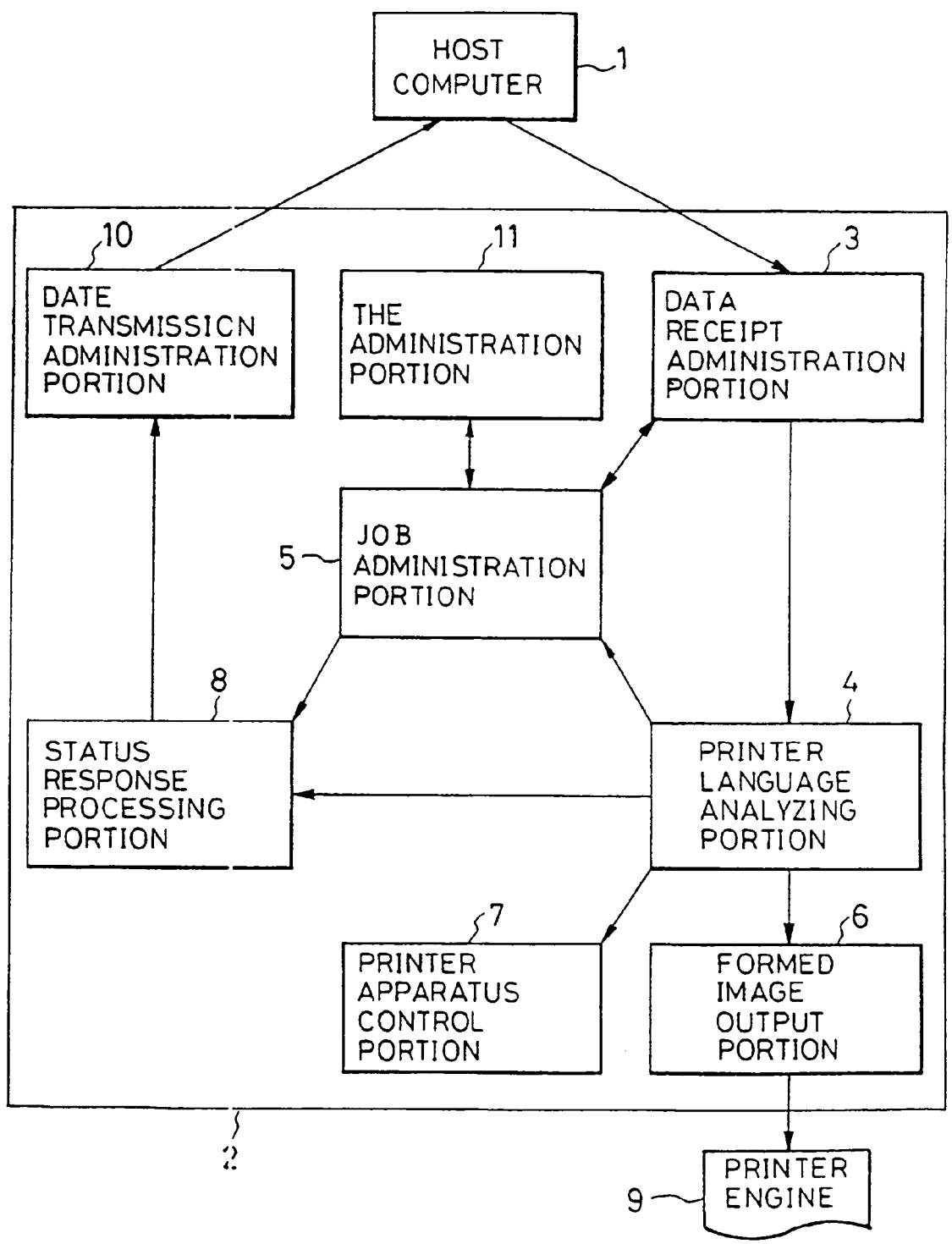
FIG. 38 is a block diagram showing the structure of a page printer apparatus according to an eleventh embodiment of the present invention.

FIG. 38 is a block diagram showing the structure of a printer apparatus according to eleventh, twelfth and thirteenth embodiment.

In this embodiment, the description will be made about a page printer.

Referring to FIG. 1, reference numeral 1 represents a host computer, which generates output data, such as characters and graphics, and a variety of control commands, and which generates a command for the status response for recognizing a variety of information items of the printer apparatus, in order to input the foregoing data and commands to a printer apparatus 2 which is the main portion of an output apparatus.

The host computer 1 and the printer apparatus 2 are connected to each other through a bidirectional interface so that data can be transferred from the host computer 1 to the printer apparatus 2, and data can be returned from the printer apparatus 2 to the host computer 1.

In the printer apparatus 2, reference numeral 3 represents a data-receipt administration portion that receives data, such as characters and graphics, the various control commands and the command for the status response, which are supplied from the host computer 1, so as to administrate the data and commands.

The data-receipt administration portion 3 has a receiving buffer for receiving and temporarily storing data from the host computer 1.

Reference numeral 4 represents a printer-language analyzing portion that analyzes the detailed contents of a command, and that instructs the corresponding control in accordance with the contents of the command.

The printer-language analyzing portion 4 sequentially receives the commands stored in the data-receipt administration portion 3, and investigates the contents of the commands in accordance with the description rule of the printer language so as to discriminate what process is demanded to be performed.

If a result of the discrimination indicates that the command is a command relating to a job administration, such as start or completion declaration of a printing job, a corresponding job administration command is issued to a job administration portion 5.

If the command orders to form an image, such as characters, graphics or images, a command for forming a corresponding image is issued to the image-forming and output portion 6.

If the command orders to control the printer apparatus 2, a command is issued to the printer-apparatus control portion 7 to perform a corresponding control. If the command requires any status response, a command is issued to the status-response processing portion 8 to perform a corresponding status response.

Reference numeral 5 represents a job administration portion.

The job administration portion 5 processes printing data supplied from the host computer 1 in accordance with job administration command from the printer-language analyzing portion 4.

Reference numeral 6 represents an image-forming and output portion for forming and developing images, such as characters, graphics or images to be output.

The image-forming and output portion 6 forms a corresponding character pattern, calculates a graphic or forms an image and develops image data in accordance with a command for forming and outputting an image from the printer-language analyzing portion 4, followed by transmitting developed data to be output to a printer engine 9.

The printer engine 9 is an apparatus, such as a laser beam printer engine, that uses a procedure of an electrophotographic method or the like to perform a printing out process in accordance with the developed image received from the image-forming and output portion 6.

Reference numeral 7 represents the printer-apparatus control portion that controls and administrates the printer apparatus 2, such that it selects paper to be used and initializes the printer apparatus 2, in accordance with the printer-apparatus control command from the printer-language analyzing portion 4.

Reference numeral 8 represents a status-response processing portion that investigates the corresponding environment of the printer apparatus 2 in accordance with the command for the status response from the printer-language analyzing portion 4. In accordance with the contents of the result, the status-response processing portion 8 processes status response information expressing the contents by means of a format, such as a character string, to transmit the status response information to the data-transmission administration portion 10.

When the data data-transmission administration portion 10 receives the status response information returned from the status-response processing portion 8, the data-transmission administration portion 10 temporarily stores it in the transmitting buffer or the like, followed by returning it to the host computer 1 at the timing determined by the bidirectional interface.

The job administration portion 5 according to the present invention supervises the data-receipt administration portion 3 to check the state where job data, which is being processed, is transmitted from the host computer 1.

If the job data interrupts, time taken from this moment is measured.

The time is measured by referring to time information obtained by a timer administration portion 11 or the like.

The job administration portion 5 checks whether or not the time taken from the job data interruption is longer than a predetermined time.

The predetermined time has been previously set in accordance with a command issued by the host computer 1, or is set by operating the panel of the printer apparatus 2, or is automatically calculated in the printer apparatus 2, or a fixed value has been initially set.

If the predetermined time has passed from the interruption of the job data, the job administration portion 5 discriminates that "the subject job has been completed while neglecting a correct job procedure due to some reason".

In order to omit the interrupted job, a job time-out process is performed and preparations for a forcible job completion process and a next job process are performed.

Simultaneously, the job administration portion 5 according to the present invention instructs the status-response processing portion 8 to issue a status response in order to communicate generation of job time out.

As a result, a character string, such as "STATUS JOB-ID:37 JOB-TIMEOUT", is status-responded to the host computer 1.

When the host computer 1 receives the character string or the like, the host computer 1 recognizes that the job having the administration ID "37", is time out.

If the host computer 1 continues the foregoing job, the job is interrupted in accordance with the time out in the printer apparatus 2.

As an alternative to this, prior to transmitting following job data to the printer apparatus 2, a procedure is issued, such as a declaration for starting a new job, resetting of a printer environment or re-registration of a font to be used.

Thus, if job time out has taken place in the printer apparatus 2, also the host computer 1 is able to recognize this. Therefore, erroneous transmission of the interrupted job causing inadequate document output and disorder of following jobs can be prevented.

FIG. 39 is a flow chart showing the operation of the present invention, in which the job administration portion 5 supervises job data so that any process is performed.

The job administration portion 5 supervises a state where job data is received by the data-receipt administration portion 3 (step S1).

The job administration portion 5 checks whether or not job data is being transmitted from the host computer 1 (step S2).

If job data has been transmitted, it is sent to the printer-language analyzing portion 4, and a process for forming and outputting an image, a printer control process, a status response process or a job administration process are performed in accordance with the described contents (step S3).

If no data is transmitted but the job is interrupted, reference to time information of the timer administration portion 11 is performed to measure time passed from start of the job data interruption (step S4).

Then, checking is performed as to whether or not time has been passed by a predetermined time (step S5). The foregoing predetermined time is regulated time serving as a reference for time out discrimination. The predetermined time has been previously set in accordance with a command issued by the host computer 1, or is set by operating the panel of the printer apparatus 2, or is automatically calculated in the printer apparatus 2, or a fixed value has been initially set.

If the time taken from start of interruption of the job data is not longer than the foregoing predetermined time, a discrimination is performed that performing the job time-out put process is too early to be performed, and supervisory of the state, where the job data is received, is again performed (step S1).

If the time taken from it is longer than the predetermined time, a discrimination is performed whether or not a job is being performed (step S6).

The job control is performed when a job control command, such as a job start declaration or a job completion declaration is sent from the host computer 1. The job administration portion 5, which has been instructed by the printer-language analyzing portion 4 as a result of the command analysis, performs execution of the job.

An assumption is performed that the predetermined time has passed from interruption of job data and, as well the job has been completed at the time of the job time out.

Another assumption is performed that the job data is processed in accordance with a formal job description format and all job data items have been received from the host computer 1. The foregoing case is a usual job process.

If new job data has not been supplied at this time, there is a possibility that the data-receipt administration portion 3 is brought to state where it waits for data receipt and the predetermined time passes as a result of checking of the time in which data receipt is waited for.

However, in the foregoing case, the job immediately before has been completed in the formal procedure, and the present state is not a job execution state. Therefore, following job processes are not affected adversely.

Since the necessity of forcibly ending the job by the job time out process can be eliminated as described above if the job is not being performed, supervisory of the state where job data is received is again performed (step S1).

If a job is being performed, the present job must be excluded to arrange the environment of the printer in order to perform a following job-data process as described above.

Accordingly, as the job time out process, the present job is forcibly ended and the environment is arranged for a job which will be sent next (step S7).

As a result of the job completion process, the page, which is being subjected to an image forming process and therefore left in the printer apparatus 2, is discharged as it is or the operation is omitted. Furthermore, a font download from the host computer 1 is deleted or a printer environment set to perform the job is reset.

Then, the job administration portion 5 according to the present invention issues a status response indicating generation of job time out to the host computer 1 in synchronization with the forcible job completion process due to the job time out (step S8).

When the host computer 1 receives the status response indicating the generation of job time out, the host computer 1 recognizes that the job completion process has been forcibly performed in the printer apparatus 2. Thus, the host computer 1 stops the corresponding job to be performed therein or again issues data, such as job start declaration to transmit following data.

As described above, reference to the status response indicating generation of job time out is performed; and the job process in the host computer 1 is changed in synchronization with the forcible ending of the job in the printer apparatus, so that the linkage between the host computer and the printer apparatus is improved so that a job problem in a printing job can be prevented.

Since a job problem can be prevented, the necessity of paying attention to the state where the printer is performing an operation and the state where the host computer is performing an operation can be eliminated, and therefore the job time out can be performed relatively easily.

That is, if job data is interrupted, next data receipt is not, as has been done with the conventional structure, waited for carefully for a long time, but the job time out process can be performed safely in a short time. Thus, in a printing system that must process a plurality of jobs in a large quantity, an efficient job operation can be performed.

Note that the order of the checking whether or not time is longer than the predetermined time in step (5) and the checking whether or not a job is being performed in step (6) may be made contrary.

Since it is usually easy to check whether or not a job is being performed, the processing efficiency can be sometimes improved in a case where step (6) is performed first.

Twelfth Embodiment

A twelfth embodiment of the present invention will now be described with reference to the drawings.

In the twelfth embodiment, if time taken from job data interruption is longer than a predetermined time, the job time out process is not immediately performed, but a status response indicating generation of the job time out is alarmed to the host computer 1.

In response to the job time out alarm, the host computer 1 issues an instruction whether or not job time out may be performed, and following operations are performed in accordance with the foregoing instruction.

The operation of this embodiment will now be described with reference to a flow chart shown in FIG. 40.

Since steps (1) to (6) are the same as those according to the eleventh embodiment, they are omitted from the description.

If time taken from the job data interruption is longer than a predetermined time and, as well a job is being performed, the present job process must be abandoned and the operation proceeds to a next job process to maintain the printing efficiency.

Accordingly, the job time out process is performed. However, the foregoing passing over the predetermined time may be due to a fact that the data processing process in the host computer 1 takes a long time, and therefore data cannot be transmitted as desired.

If the printer apparatus 2 ends the job therein though the host computer 1 has the intention to continue the job, there is a possibility that all ensuing job processes are spoiled as described above.

Accordingly, the job administration portion 5 according to the present invention issues, to the host computer 1, an alarm that job time out has taken place and the present job is forcibly ended by means of a status response, the alarm being issued prior to perform the job time out process.

Then, issue of an instruction from the host computer 1 whether or not the job time out may be performed is waited for (step S7).

The status response of the job time out alarm to be issued at this time is in the form of a character string, such as "STATUS JOB-ID:37 JOB-TIMEOUT OK?".

When the host computer 1 has received the foregoing status response, the host computer 1 discriminates whether or not the foregoing job will be continued. If the job will be continued, "job time out inhibition command" is issued to the printer apparatus 2. If there is no intention to continue the job, "job time out permission command" is issued to the same.

The printer apparatus 2 analyzes the command relating to the job time out to discriminate whether or not the foregoing command permits the job time out (step S8).

If the job time out is not permitted, the printer apparatus 2 discriminates that the host computer 1 has an intention to continue the job, and waits for supply of following job data (step S1).

If the job time out is permitted, the printer apparatus 2 discriminates that the host computer 1 has abandoned continuation of the subject job, and the printer apparatus 2 performs a forcible completion process of this job as a job time out process (step S9).

Then, the foregoing job process is abandoned, and the operation proceeds to a next job process.

As described above, a status response alarming generation of job time out is received from the printer apparatus prior to performing the job time out process; and the host computer 1 issues a command whether or not the job time out process may be performed. Thus, the job is not ended by the printer apparatus, but it can be ended after inquiry of the convenience. As a result, the linkage between the host computer and the printer apparatus is improved so that a job problem in a printing job can be prevented.

Since a job problem can be prevented, the necessity of paying attention to the state where the printer is performing an operation and the state where the host computer is performing an operation can be eliminated, and therefore the job time out can be performed relatively easily.

That is, if job data is interrupted, next data receipt is, as has been done with the conventional structure, waited for carefully for a long time, but the job time out process can be performed safely in a short time. Thus, in a printing system that must process a plurality of jobs in a large quantity, an efficient job operation can be performed.

Thirteenth Embodiment

A thirteenth embodiment of the present invention will now be described with reference to the drawings.

In this embodiment, if time from job data interruption is longer than a predetermined time, the job time out process is not immediately performed, but generation of job time out is alarmed to the host computer 1 by means of a status response.

If no response, for example, following job data, is performed from the host computer 1 though the job time out alarm has been issued, a discrimination is performed that the host computer 1 has no intention to continue the job, and the job time out process is performed.

The operation of this embodiment will now be described with reference to a flow chart shown in FIG. 41.

Since steps (1) to (6) are the same as those of the eleventh embodiment, they are omitted from the description.

If time taken from the job data interruption is longer than a predetermined time and, as well a job is being performed, the present job process must be abandoned and the operation proceeds to a next job process to maintain the printing efficiency.

Accordingly, a job time out process is performed. However, the foregoing passing over the predetermined time may be due to a fact that the data processing process in the host computer 1 takes a long time, and therefore data cannot be transmitted as desired.

If the printer apparatus 2 ends the job therein though the host computer 1 has the intention to continue the job, there is a possibility that all ensuing job processes are spoiled as described above.

Accordingly, the job administration portion 5 according to the present invention issues, to the host computer 1, an alarm that job time out has taken place and the present job is forcibly ended by means of a status response, the alarm being issued prior to perform the job time out process.

Then, issue of a response, such as following job data, from the host computer 1 is waited for (step S7).

The status response of the job time out alarm to be issued at this time is in the form of a character string, such as "STATUS JOB-ID:37 JOB-TIMEOUT OK?".

When the host computer 1 has received the foregoing status response, the host computer 1 discriminates whether or not the foregoing job will be continued. If the job will be continued, following job data is issued, or, in a case where following job data cannot be supplied immediately, information indicating an intention of continuation of the job is issued.

If there is no intention to continue the job, no data is issued.

The printer apparatus 2 discriminates whether or not any response has been made from the host computer 1 to judge whether or not the job is intended to be continued (step S8).

That is, if following job data or any response indicating the intention to continue the job has been sent from the host computer 1, a discrimination is made that the job is intended to be continued, and received data is analyzed, followed by performing a corresponding process (step S3).

If no response has been made from the host computer 1, a discrimination is performed that the host computer 1 has abandoned continuation of the foregoing job and the printer apparatus 2 performs a forcible completion process of this job as a job time out process (step S9).

Then, the foregoing job process is abandoned, and the operation proceeds to a next job process.

Another difference from the twelfth embodiment is that the fact "no response has been made" is used in the thirteenth embodiment to discriminate that the job is not intended to be continued.

In an example case where information cannot be transmitted/supplied to and from the host computer 1 due to disconnection of a communication line for example, no response can be made from the host computer 1 if a job time out alarm is issued.

The thirteenth embodiment is characterized in that the foregoing case can be discriminated as "no intention to continue the job".

As described above, a status response alarming generation of job time out is received from the printer apparatus prior to performing the job time out process; and the host computer 1 transmits following job data or information indicating the continuation intention. Thus, the job is not ended by the printer apparatus, but it can be ended after inquiry of the convenience. As a result, the linkage between the host computer and the printer apparatus is improved so that a job problem in a printing job can be prevented.

Since a job problem can be prevented, the necessity of paying attention to the state where the printer is performing an operation and the state where the host computer is performing an operation can be eliminated, and therefore the job time out can be performed relatively easily.

That is, if job data is interrupted, next data receipt is not, as has been done with the conventional structure, waited for carefully for a long time, but the job time out process can be performed safely in a short time. Thus, in a printing system that must process a plurality of jobs in a large quantity, an efficient job operation can be performed.

As described above, according to the eleventh, twelfth and the thirteenth embodiments, even if a job completion process is forcibly performed due to a job time out process after a predetermined time has passed, generation of the job time out can be, by means of a status response, communicated from the printer apparatus to the host computer; and in accordance with the foregoing information, the host computer is able to continue or abandon or cope with the job process in such a manner that communication is established between the host computer and the printer apparatus in a linkage manner. Thus, the linkage between the host computer and the printer apparatus can be improved so that a job problem in a printing job can be prevented.

Since a job problem can be prevented, the necessity of paying attention to the state where the printer is performing an operation and the state where the host computer is performing an operation can be eliminated, and therefore the job time out can be performed relatively easily.

That is, if job data is interrupted, next data receipt is not, as has been done with the conventional structure, waited for carefully for a long time, but the job time out process can be performed safely in a short time. Thus, in a printing system that must process a plurality of jobs in a large quantity, an efficient job operation can be performed.

Although the invention has been described in its preferred form with a certain degree of particularity, it is understood that the present disclosure of the preferred form can be changed in the details of construction and the combination and arrangement of parts may be resorted to without departing from the spirit and the scope of the invention as hereinafter claimed.

What is claimed is:

1. An external apparatus that transmits a plurality of print jobs to a printing control apparatus via a bi-direction communication line, said external apparatus comprising:
   a generation unit that generates a job;
   a transmitter that transmits the plurality of print jobs generated by said generation unit;
   a first receiver that receives a job identifier which is assigned to each print job by said printing control apparatus, wherein each job identifier is unique and not changed from generation until the print job is completed;
   a memory that stores the job identifier received by said first receiver;
   a second receiver that receives progressing page information indicating how many pages have been finished before a process of the print job is completed from said printing control apparatus, together with the job identifier of the print job; and
   a specifying unit that specifies a particular job's status including the progressing page information in accordance with correspondence between the job identifier received by said second receiver together with the progressing page information and the job identifier stored in said memory.

2. A printing control apparatus that receives a plurality of print jobs sent from an external apparatus via a bi-direction communication line and processes the plurality of print jobs, the external apparatus executes a process related to a certain job's status during processing the other job, said printing control apparatus comprising:
   a storage device that stores the plurality of print jobs;
   an assigner that assigns a job identifier to each print job stored in said storage device in response to receiving the print job, wherein each job identifier is unique and not changed from generation until the print job is completed; and
   a transmitter that transmits to the external apparatus progressing page information indicating how many pages have been finished before the process of the print job is completed, together with the job identifier of the print job,
   wherein said transmitter transmits the progressing page information to make the external apparatus, which has the job identifier stored in a memory, specify the certain job's status, including the progressing page information, in accordance with correspondence between the job identifier transmitted by said transmitter together with the progressing page information and the job identifier stored in the memory.

3. A printing control apparatus that receives a plurality of print jobs sent from an external apparatus via a bi-direction communication line and processes the plurality of print jobs, the external apparatus executes a process related to a certain job's status during processing the other job, stores a job identifier in a memory, specifies the certain job's status including progressing page information in accordance with correspondence between a job identifier transmitted by said printing control apparatus together with the progressing page information and the job identifier stored in the memory, said printing control apparatus comprising:
   a storage device that stores the plurality of print jobs;
   an assigner that assigns the job identifier to each print job stored in said storage device in response to receiving the print job, wherein each job identifier is unique and not changed from generation until the print job is completed; and
   a transmitter that transmits to the external apparatus the progressing page information indicating how many pages have been finished before process of the print job is completed, together with the job identifier of the print job.

* * * * *

UNITED STATES PATENT AND TRADEMARK OFFICE
CERTIFICATE OF CORRECTION

PATENT NO. : 7,310,164 B2
APPLICATION NO. : 11/590825
DATED : December 18, 2007
INVENTOR(S) : Toru Matoba It is certified that error appears in the above-identified patent and that said Letters Patent is hereby corrected as shown below:

IN THE DRAWINGS:
Sheet No. 4, Figure 4, "PESPONSE" should read --RESPONSE--.
Sheet No. 32, Figure 32, "WHI" should read --WHI- --.
Sheet No. 32, Figure 32, "PROCE" should read --PROCE- --.
Sheet No. 35, Figure 35, "TIPE" should read --TYPE--.
Sheet No. 37, Figure 37, "PROCE" should read --PROCE- --.

COLUMN 10:
Line 10, "as well" should read --as well as--.
Line 31, "rises" should read --arises--.

COLUMN 17:
Line 14, "is block" should read --is a block--.

COLUMN 19:
Line 17, "commands. The" should read --commands. ¶ The--.

COLUMN 29:
Line 22, "(step S 12)." should read --(step S112)--.

COLUMN 31:
Line 66, "cods" should read --codes--.

COLUMN 32:
Line 9, "made" should read --made to--.

COLUMN 33:
Line 35, "The," should read --Then,--.

COLUMN 36:
Line 34, "or all" should read --or not all--.

COLUMN 40:
Line 21, "IDs" should read --ID--.

UNITED STATES PATENT AND TRADEMARK OFFICE
CERTIFICATE OF CORRECTION

PATENT NO. : 7,310,164 B2
APPLICATION NO. : 11/590825
DATED : December 18, 2007
INVENTOR(S) : Toru Matoba It is certified that error appears in the above-identified patent and that said Letters Patent is hereby corrected as shown below:

COLUMN 45:
Line 3, "as well" should read --as well as--.

COLUMN 46:
Line 66, "the job," should read --to the job--.

COLUMN 53:
Line 34, "state" should read --a state--.

COLUMN 58:
Line 14, "processing" should read --processing of--.
Line 40, "processing" should read --processing of--.

Signed and Sealed this

Seventeenth Day of February, 2009

JOHN DOLL
*Acting Director of the United States Patent and Trademark Office*